US009923626B2

(12) United States Patent
Loomis et al.

(10) Patent No.: US 9,923,626 B2
(45) Date of Patent: Mar. 20, 2018

(54) MOBILE IONOSPHERIC DATA CAPTURE SYSTEM

(71) Applicant: Trimble Inc., Sunnyvale, CA (US)

(72) Inventors: Peter Van Wyck Loomis, Sunnyvale, CA (US); Gregory Craig Wallace, Arvada, CO (US); Shawn D. Weisenburger, Denver, CO (US); James M. Janky, Los Altos, CA (US)

(73) Assignee: Trimble Inc., Sunnyvale, CA (US)

( * ) Notice: Subject to any disclaimer, the term of this patent is extended or adjusted under 35 U.S.C. 154(b) by 224 days.

(21) Appl. No.: 14/882,267

(22) Filed: Oct. 13, 2015

(65) Prior Publication Data

US 2016/0036519 A1    Feb. 4, 2016

Related U.S. Application Data

(63) Continuation-in-part of application No. 14/304,822, filed on Jun. 13, 2014.

(51) Int. Cl.
*H04B 7/22* (2006.01)
*G01S 19/41* (2010.01)
(Continued)

(52) U.S. Cl.
CPC ........... *H04B 7/22* (2013.01); *G01S 19/41* (2013.01); *G01S 19/43* (2013.01); *H04B 7/18513* (2013.01)

(58) Field of Classification Search
CPC ...................................................... H04B 7/18
See application file for complete search history.

(56) References Cited

U.S. PATENT DOCUMENTS

| 5,225,842 A | 7/1993 | Brown et al. |
| 5,345,244 A | 9/1994 | Gildea et al. |

(Continued)

FOREIGN PATENT DOCUMENTS

| EP | 0508405 | 10/1992 |
| EP | 1729145 A1 | 12/2006 |

(Continued)

OTHER PUBLICATIONS

International Search Report of the International Searching Authority for PCT Application No. PCT/US2015/052370 dated Jan. 8, 2016, 6 pages.

(Continued)

*Primary Examiner* — Xavier Szewai Wong
(74) *Attorney, Agent, or Firm* — Kilpatrick Townsend & Stockton LLP

(57) ABSTRACT

A method for capturing ionospheric data is disclosed. In accordance with one embodiment, a plurality of phase-coherent signals transmitted by at least one Global Navigation Satellite System (GNSS) satellite is received via a mobile multi-frequency GNSS receiver. Respective code phase data and carrier phase data for each of said plurality of phase-coherent signals are derived using a software defined GNSS receiver operating on a processor of a first communication device of the multi-frequency GNSS receiver. Respective code phase data and carrier phase data for each of the plurality of phase-coherent signals is stored in a data storage device. The respective code phase data and carrier phase data is appended with a respective time-stamp and position fix. An ionospheric sample based upon respective code phase data and carrier phase data of said plurality of phase-coherent signals is wirelessly transmitted to a second location.

31 Claims, 27 Drawing Sheets

(51) Int. Cl.
*G01S 19/43* (2010.01)
*H04B 7/185* (2006.01)

(56) References Cited

U.S. PATENT DOCUMENTS

| | | | |
|---|---|---|---|
| 5,379,224 A | 1/1995 | Brown et al. | |
| 5,450,448 A * | 9/1995 | Sheynblat | G01S 19/07 342/358 |
| 5,471,217 A | 11/1995 | Hatch et al. | |
| 5,477,228 A | 12/1995 | Tiwari et al. | |
| 5,523,761 A | 6/1996 | Gildea | |
| 5,594,454 A | 1/1997 | Devereux et al. | |
| 5,621,416 A | 4/1997 | Lennen | |
| 5,740,048 A | 4/1998 | Abel et al. | |
| 5,805,108 A | 9/1998 | Lennen | |
| 5,862,501 A | 1/1999 | Talbot et al. | |
| 5,867,411 A * | 2/1999 | Kumar | G01S 19/04 375/232 |
| 5,899,957 A | 5/1999 | Loomis | |
| 5,903,235 A | 5/1999 | Nichols | |
| 5,913,170 A | 6/1999 | Wortham | |
| 6,067,046 A | 5/2000 | Nichols | |
| 6,072,431 A | 6/2000 | Froeberg | |
| 6,249,245 B1 | 6/2001 | Watters et al. | |
| 6,324,473 B1 | 11/2001 | Eschenbach | |
| 6,408,178 B1 | 6/2002 | Wickstrom et al. | |
| 6,429,808 B1 | 8/2002 | King et al. | |
| 6,430,503 B1 | 8/2002 | McBurney et al. | |
| 6,473,030 B1 | 10/2002 | McBurney et al. | |
| 6,507,738 B1 | 1/2003 | Allison et al. | |
| 6,510,387 B2 | 1/2003 | Fuchs et al. | |
| 6,564,144 B1 | 5/2003 | Cherverny | |
| 6,590,525 B2 | 7/2003 | Yule et al. | |
| 6,711,293 B1 | 3/2004 | Lowe | |
| 6,853,909 B2 | 2/2005 | Scherzinger | |
| 7,003,112 B1 | 2/2006 | Froeberg | |
| 7,043,364 B2 | 5/2006 | Scherzinger | |
| 7,151,489 B2 | 12/2006 | Pande et al. | |
| 7,191,097 B1 | 3/2007 | Lee et al. | |
| 7,336,814 B2 | 2/2008 | Boca et al. | |
| 7,480,511 B2 | 1/2009 | O'Meagher | |
| 7,541,974 B2 | 6/2009 | Scherzinger | |
| 7,570,204 B1 | 8/2009 | McGraw et al. | |
| 7,908,106 B2 | 3/2011 | Cho et al. | |
| 7,961,141 B2 | 6/2011 | Dai et al. | |
| 8,024,144 B2 | 9/2011 | Kludas et al. | |
| 8,032,152 B2 | 10/2011 | Manson et al. | |
| 8,044,852 B2 | 10/2011 | Green et al. | |
| 8,068,848 B2 | 11/2011 | Manson et al. | |
| 8,068,849 B2 | 11/2011 | Manson et al. | |
| 8,078,192 B2 | 12/2011 | Wirola et al. | |
| 8,081,987 B2 | 12/2011 | Manson et al. | |
| 8,081,988 B2 | 12/2011 | Manson et al. | |
| 8,081,989 B2 | 12/2011 | Manson et al. | |
| 8,085,196 B2 | 12/2011 | Whitehead | |
| 8,085,387 B2 | 12/2011 | Kludas et al. | |
| 8,095,149 B2 | 1/2012 | Manson et al. | |
| 8,134,497 B2 | 3/2012 | Janky et al. | |
| 8,136,545 B2 | 3/2012 | Jablonski | |
| 8,242,956 B2 | 8/2012 | Lamance et al. | |
| 8,339,311 B2 | 12/2012 | Walley et al. | |
| 8,368,875 B2 | 2/2013 | Kludas et al. | |
| 8,447,519 B2 | 5/2013 | Basnayake et al. | |
| 8,699,409 B2 | 4/2014 | Aryan et al. | |
| 8,719,188 B2 | 5/2014 | Kuhn et al. | |
| 8,760,344 B2 * | 6/2014 | Mercier | G01S 19/07 342/357.44 |
| 9,037,527 B2 | 5/2015 | Kuhn et al. | |
| 2001/0017599 A1 | 8/2001 | Yule et al. | |
| 2002/0072854 A1 | 6/2002 | Fuchs et al. | |
| 2002/0186180 A1 | 12/2002 | Duda | |
| 2003/0067409 A1 * | 4/2003 | Murphy | G01S 19/00 342/357.21 |
| 2003/0083804 A1 | 5/2003 | Pilley et al. | |
| 2003/0114984 A1 | 6/2003 | Scherzinger | |
| 2005/0064878 A1 | 3/2005 | O'Meagher et al. | |
| 2005/0104774 A1 | 5/2005 | Pande et al. | |
| 2006/0146136 A1 | 7/2006 | Cho et al. | |
| 2007/0139262 A1 | 6/2007 | Scherzinger | |
| 2008/0025386 A1 * | 1/2008 | Desset | H03K 9/04 375/239 |
| 2008/0263097 A1 | 10/2008 | Manson et al. | |
| 2008/0319664 A1 | 12/2008 | Kremin et al. | |
| 2009/0024325 A1 | 1/2009 | Scherzinger | |
| 2009/0083430 A1 | 3/2009 | Edge et al. | |
| 2009/0093959 A1 | 4/2009 | Scherzinger et al. | |
| 2009/0189804 A1 | 7/2009 | Ashjaee et al. | |
| 2009/0262016 A1 | 10/2009 | Wirola et al. | |
| 2009/0295633 A1 * | 12/2009 | Pinto | G01S 19/47 342/357.29 |
| 2010/0057359 A1 | 3/2010 | Caballero et al. | |
| 2010/0063733 A1 | 3/2010 | Yunck | |
| 2010/0079333 A1 | 4/2010 | Janky et al. | |
| 2010/0141510 A1 | 6/2010 | Dai et al. | |
| 2010/0231443 A1 | 9/2010 | Whitehead | |
| 2010/0260150 A1 | 10/2010 | Aryan et al. | |
| 2011/0018761 A1 | 1/2011 | Walley et al. | |
| 2011/0064312 A1 | 3/2011 | Janky et al. | |
| 2011/0109506 A1 * | 5/2011 | Humphreys | G01S 19/215 342/357.68 |
| 2011/0163914 A1 | 7/2011 | Seymour et al. | |
| 2011/0187590 A1 | 8/2011 | Leandro | |
| 2011/0195687 A1 | 8/2011 | Das et al. | |
| 2011/0267230 A1 | 11/2011 | Lamance et al. | |
| 2011/0285587 A1 | 11/2011 | Vollath et al. | |
| 2012/0116676 A1 | 5/2012 | Basnayake et al. | |
| 2012/0163656 A1 | 6/2012 | Wang et al. | |
| 2012/0166137 A1 | 6/2012 | Grässer et al. | |
| 2012/0330601 A1 | 12/2012 | Soubra et al. | |
| 2013/0027246 A1 | 1/2013 | Hadef et al. | |
| 2013/0243250 A1 | 9/2013 | France et al. | |
| 2014/0081571 A1 | 3/2014 | Briggs et al. | |
| 2014/0184442 A1 | 7/2014 | Large et al. | |
| 2014/0187193 A1 | 7/2014 | Rudow et al. | |
| 2014/0240170 A1 | 8/2014 | Rudow et al. | |
| 2014/0253375 A1 | 9/2014 | Rudow et al. | |
| 2014/0292569 A1 | 10/2014 | Wallace et al. | |
| 2014/0292570 A1 | 10/2014 | Wallace et al. | |
| 2014/0375493 A1 | 12/2014 | Weisenburger et al. | |
| 2014/0378170 A1 | 12/2014 | Rudow et al. | |
| 2014/0378171 A1 | 12/2014 | Rudow et al. | |
| 2015/0009067 A1 | 1/2015 | Rudow et al. | |
| 2015/0043012 A1 | 2/2015 | Rudow et al. | |
| 2015/0045058 A1 | 2/2015 | Rudow et al. | |
| 2015/0045059 A1 | 2/2015 | Rudow et al. | |
| 2015/0050907 A1 | 2/2015 | Rudow et al. | |
| 2015/0057028 A1 | 2/2015 | Rudow et al. | |
| 2015/0289097 A1 | 10/2015 | Rudow et al. | |

FOREIGN PATENT DOCUMENTS

| | | |
|---|---|---|
| EP | 2275778 A1 | 1/2011 |
| EP | 2 722 647 A1 | 4/2014 |
| KR | 20110085744 | 7/2011 |
| KR | 101241171 B1 | 3/2013 |
| WO | 2005/045458 | 5/2005 |
| WO | 2008089792 A1 | 7/2008 |
| WO | 2009074654 A1 | 6/2009 |
| WO | 2011120141 A1 | 10/2011 |

OTHER PUBLICATIONS

International Written Opinion of the International Searching Authority for PCT Application No. PCT/US2015/052370 dated Jan. 8, 2016, 7 pages.
"PCT/US2015/035328 International Search Report", dated Oct. 15, 2015, pp. 1-13.
"PCT/US2015/035346 International Search Report", dated Oct. 13, 2015, pp. 1-12.
Afzal, "Design Methodology for a Dual Frequency Configurable GPS Receiver", Proceedings of the 23rd International Technical Meeting of the Satellite Division of the Institute of Navigation (ION GNSS 2010), Sep. 24, 2010, pp. 2892-2900.

(56) References Cited

OTHER PUBLICATIONS

Guixens, et al., "System Aspects and Practical Results for Precise Car Navigation with Modern Civil Signals Using a Software Receiver", Proceedings of the 21st International Technical Meeting of the Satellite Division of the Institute of Navigation (ION GNSS 2008), Sep. 19, 2008, pp. 2280-2292.
Haak, "A Multi-Purpose Software GNSS Receiver for Automotive Applications", Proceedings of the 23rd International Technical Meeting of the Satellite Division of the Institute of Navigation (ION GNSS 2010), Sep. 24, 2010, pp. 1869-1874.
Hatch, "The Synergism of GPS Code and Carrier Measurements", Proceedings of the Third International Geodetic Symposium on Satellite Doppler Positioning, 1982, 1213-1232.
Landau, et al., "Virtual Reference Stations Versus Broadcast Solutions in Network RTK", GNSS 2003, Graz, Austria, Apr. 2003, 15 pages.
Ruegamer, et al., "A Flexible and Portable Multiband GNSS Front-end System", Proceedings of the 25th International Technical Meeting of the Satellite Division of the Institute of Navigation (ION GNSS 2012), Sep. 21, 2012, pp. 2378-2389.
Thipparthi, "Imporving Prositional Accuracy Using Carrier Smoothing Techniques in Inexpensive GPS Receivers", MSEE Thesis, New Menixo State University, Las Cruces, NM, Feb. 2004, 101 Pages.
"Comparison of Photogrammetry Software", http://en.wikipedia.org/wiki/Comparison_of_photogrammetry_software, Jul. 8, 2015, 4 pages.
"DS00 Laser Range Finder—Product Maunal Revision 0", www.lightware.com, 2012, 45 Pages.
"PCT/US2013/078125 International Search Report and Written Opinion", Apr. 23, 2014, 25 pages.
"Photogrammetry", http://en.wikipedia.org/wiki/Photogrammetry, Jun. 25, 2015, 5 pages.
"Pi Pelican Imaging: Life in 3D", http://www.pelicanimaging.com, 2015, 3 pages.
"RTK Bridge-E", Intuicom, Inc. www.intuicom.com, 2 pages.
"Spirit Level with bubble", https://play.google.com/store/apps/details?id=com.zabaanapps.android.level, Mar. 25, 2014, 2 Pages.
"Technical Tips from Inland GPS", Trimble TSC2—RTK over internet—establishing IP Connection, Jun. 14, 2011, 8 pages.
"Theodolite", Hunter Research & Technology, Mar. 24, 2014, 1 Page.
"Tilt Measurement Using a Low-G 3-Axis Accelerometer", AN3182 Application Note. DOC ID 17289 Rev 1, Apr. 2010, 18 Pages.
"Trimble S8 Total Station Datasheet", Trimble Navigation Limited, 2013, 4 Pages.
"Wireless RTK Bridge—Cellular User Guide", Revision 1.4, 2009, 47 pages.
Afzal, "Design Methodology for Dual Frequency Configurable GPD Receiver", ION GNSS 2010, Session E5, Portland, OR, Sep. 21-24, 2010, 9 Pages.
Brown, "TIDGET Mayday System for Motorists", Presented at IEEE Position Location and Navigation Symposium (PLANS) '94 Las Vegas, NV, Apr. 1994, 7 pages.
Church, "Close Range Photogrammetry vs. 3D Scanning of Archeological Documentation", http://ncptt.nps.gov/blog/close-range-photogrammetry-vs-3d-scanning-for-archaeological-documentation/, Nov. 6, 2012, 10 pages.
Engels, et al., "Buncle Adjustment Rules", Center for Visualization and Virtual Environments, Department of Computer Science, University of Kentucky, Sep. 1, 2006, 266-271.
Grussenmeyer, et al., "A comparison of photogrammetry software packages for the documentation of buildings", http://halshs.archives-ouvertes.fr/docs/00/28/12/54/PDF/grussenmeyer_alkhalil_FIG2000.PDF, May 21, 2008, 9 pages.
Ike, "Spike: Laser Accurate Measurement & Modeling on Smartphones", https://www.kickstarter.com/projects/ikegps/spike-laser-accurate-measurement-and-modelling-on?ref=nav_search, Oct. 2, 2013, 14 Pages.
Mouragnon, et al., "Real Time Localization and 3D Reconstruction", Proceedings of the 2006 IEEE Computer Society Conference on Computer Vision and Pattern Recognition, Jan. 1, 2006, 363-370.
Rho, "Dual-Frequency GPS Precise Point Positioning with WADGPS Corrections", Department of Geodesy and Geomatics Engineering, University of new Brunswick, Fredericton, N.B. Canada, Sep. 13-16, 2005, 1470-1482.
Scaramuzza, et al., "Visual Odometry", Part 1: The First 30 Years and Fundamentals, Dec. 8, 2011, 80-92.

\* cited by examiner

MOBILE IONOSPHERIC DATA CAPTURE SYSTEM

CROSS-REFERENCE TO RELATED APPLICATIONS (CONTINUATION-IN-PART)

This application claims priority to and is a continuation-in-part application of co-pending U.S. patent application Ser. No. 14/304,822, filed on Jun. 13, 2014, entitled, "GLOBAL NAVIGATION SATELLITE SYSTEM RECEIVER SYSTEM WITH RADIO FREQUENCY HARDWARE COMPONENT," by Wallace et al., and assigned to the assignee of the present application.

BACKGROUND

The ionosphere is defined as the layer of the Earth's atmosphere that is ionized by solar and cosmic radiation. It lies 75-1000 km (46-621 miles) above the Earth. During the day, energy from the Sun ionizes, or strip the atoms in this area of one or more of their electrons to create positively charged atoms. The ionized electrons behave as free particles. Only half the Earth's ionosphere is being ionized by the Sun at any time (e.g., during daylight hours). During the night, without interference from the Sun, cosmic rays ionize the ionosphere, though the effect is not a pronounced as during the day. Thus the ionosphere is much less charged during the nighttime due to the lack of sunlight, but is still present due to the effect of cosmic rays. The ionosphere has major importance to us because, among other functions, it influences radio propagation to distant places on the Earth, and between satellites and Earth. The ionosphere is a very dynamic region in that the distance of the bottom layer and the top layer above the Earth varies and changes throughout the day. Furthermore, the electron density of the ionosphere varies. In addition to this, local variations in the ionosphere can travel in a manner similar to waves through the ionosphere. These local variations can span an area as small as a few miles and are difficult to predict.

The ionosphere has major importance to us because, among other functions, it influences radio propagation to distant places on the Earth, and between satellites and Earth. Because of the influence of the ionosphere on radio propagation between satellites and the Earth, timely and accurate modeling of the ionosphere is important in the field of satellite navigation. More specifically, the ionosphere slows down radio signals from orbiting navigation satellites, resulting in a timing error causing the pseudorange to appear to be longer than it really is, and so the precision in determining the location of a navigation receiver is diminished. Also, because the Sun's angle relative to the ionosphere affects the amount of energy available for ionizing atoms, the diurnal (e.g., time of day) and seasonal effects on the ionosphere are important variables to model. Additionally, as described above, local variations, which have a spatial variation and temporal duration that only extend over short times and distances, make it difficult to create accurate models of the ionosphere.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope of the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise, as apparent from the following discussions, it is appreciated that throughout the description of embodiments, discussions utilizing terms such as "receiving," "using," "storing," "deriving," "transmitting," "enabling," "appending," "determining," "deriving," "suspending," and "preventing" refer to the actions and processes used to transform the state of a computer system, data storage system, storage system controller, microcontroller, hardware processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Figure 1A:
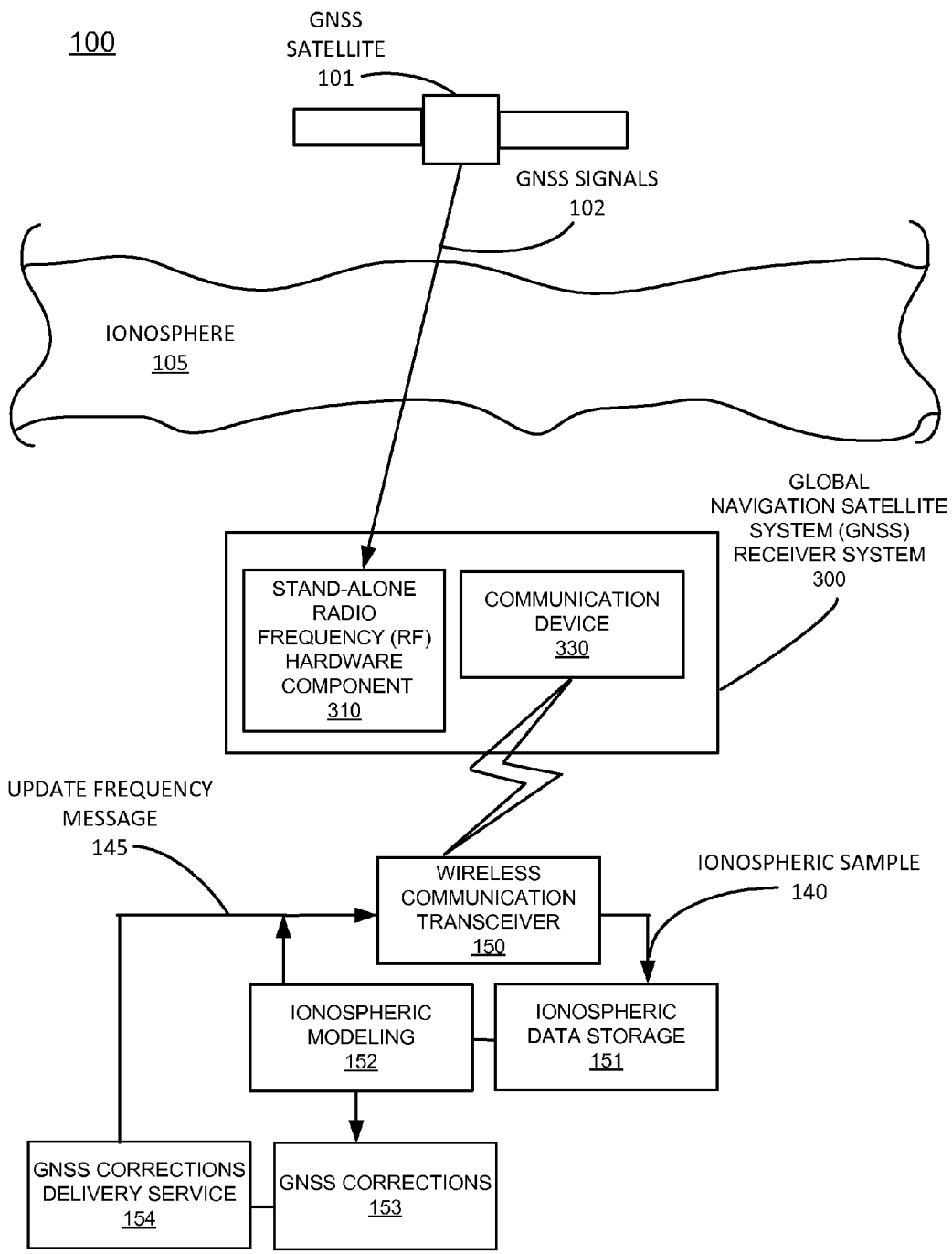
FIG. 1A is a block diagram of components of a system for capturing ionospheric data in accordance with various embodiments.

FIG. 1A is a block diagram of components of a system for capturing relative code and carrier phase data from which one of the error components in pseudoranges, the ionospheric delay, can be estimated, in accordance with various embodiments. For the sake of simplicity, herein we refer to relative code and carrier phase measurements for two coherent frequencies as "ionospheric data" or "ionospheric sample." Relative code and carrier phase means that the carrier phase estimate for the L1 signal is subtracted from the carrier phase estimate from the carrier phase estimate for the L2C signal or L5 signal, or vice versa. The same subtraction occurs between code phase estimates for L1, L2C, and L5. Alternatively, an ionospheric sample can comprise unprocessed carrier phase and code phase measurements of the L1, L2C, and L5 signals, or equivalent GNSS signals. In FIG. 1A, GNSS signals 102 are sent from at least one GNSS satellite 101 and are received by a GNSS receiver system 300, according to various embodiments. As will be discussed in greater detail below, GNSS receiver system 300 comprises an RF hardware component 310 and a communication device 330, which are communicatively coupled to one another. In accordance with various embodiments, the communicative coupling between RF hardware component 310 and communication device 330 can be implemented as a wireline, or wireless, communication coupling. RF hardware component 310 comprises a plurality of GNSS antennas which are configured for receiving GNSS signals via multiple frequencies (e.g., the L1 GPS, L2 GPS, and L5 GPS frequencies). Again, it is noted that equivalent phase-coherent radio signals implemented by other satellite navigation systems (e.g., GLONASS, BeiDou, and Galileo satellite navigation systems) can be use as well, or instead of the GPS radio signals discussed above. In particular, RF hardware component 310 uses higher quality radio antennas than is typically found in many handheld devices such as cellphones, laptops, tablet computers, or the like. Better antennas provide better signal to noise ratios, and this facilitates greater precision in determining a position fix for the antennas of RF hardware component 310. RF hardware component 310 further comprises a digitizer configured to convert digitally sampled L1/L2C/L5 signals, or other GNSS equivalents to a digital signal and a serializer for converting the digitized L1/L2C/L5 signals to a serial signal. This serial signal of L1/L2C/L5 signals is then conveyed to communication device 330 via a wireline, or wireless, communication coupling. Communication device 330 is a handheld mobile device that is capable of two-way RF communication and may be a device such as, but not limited to, a cellular telephone, a tablet computer, a two-way non-cellular radio, a dedicated short range communication (DSRC) radio, or a software defined radio, or combinations thereof. In one embodiment, the DSRC radio complies with Institute of Electrical and Electronics Engineers (IEEE) 802.11p standards. In one embodiment, the DSRC radio may be implemented as a software defined radio compliant with IEEE 802.11p standard and running on one or more processors. In accordance with various embodiments RF hardware component 310 and communication device 330 may be stand-alone physical entities that are removably communicatively coupled by wireline or else wirelessly communicatively coupled, one or both may not have a housing, or may they may be integrated with one another.

As discussed above, RF hardware device 310 improves the performance of communication device 330 in receiving signals, and thus determining a more precise position fix, than the GNSS antennas typically found in handheld devices which are selected and placed according to the budget and space constraints found in a given device. Additionally, as communication device 330 can receive corrections for satellite ephemeris, clock errors, and atmospheric bias such as ionospheric and tropospheric effects upon satellite navigation radio signals. Because GNSS receiver system 300 is a mobile system, multi-path errors will tend to cancel out over time as the signal paths will change as GNSS receiver system 300 moves from location to location.

Typically, when GNSS signals 102 pass through the ionosphere 105, they are slowed due to the ionized particles present. This delay in turn, causes a GNSS receiver to derive an inaccurate pseudorange between itself and the GNSS satellite from which it is receiving signals. In accordance with various embodiments, RF hardware component 310 passes the L1/L2C/L5 GNSS signals, or their GNSS equivalents, to communication device 330. In the field of satellite navigation systems, the use of two or more GNSS frequencies from the same satellite facilitates determining ionospheric effects which delays code phase signals, but advances carrier phase signals, from the GNSS satellites and impede accurately determining the satellite-receiver distance. It is known in the art that the time between epochs for accurate distance estimation is dependent on how stable the ionosphere is. Furthermore, these ionospheric effects are in part dependent upon the radio frequency which is broadcast/received. In accordance with various embodiments, the GNSS signals on various frequencies from the same satellite are phase locked or phase coherent (e.g., in phase with each other) as the same clock signal is used at the broadcasting satellite to modulate the broadcast signals. As a result, the timing difference between the reception of two or more GNSS signals (e.g., an L1 signal and an L2C signal, or an L5 signal) is largely a function of the broadcast frequencies of the two or more signals. Thus, the difference in the time the broadcast signals were received at their various frequencies to determine the electron density of the ionosphere.

In accordance with various embodiments, GNSS receiver system 300 derives respective code phase and carrier phase data from the GNSS signals 102 from each satellite in view of RF hardware component 310. GNSS receiver system 300 then stores the respective code phase and carrier phase data in a data storage device (e.g., in storage 332 of communication device 330, or data storage unit 1312 of FIG. 13). This code phase and carrier phase data is also time-stamped with the time that the respective code phase and carrier phase data (e.g., GNSS signals 102) was received by GNSS receiver system 300 and is appended with data specifying the position fix at which GNSS receiver system 300 was located when the respective code phase and carrier phase data (e.g., GNSS signals 102) were received. Furthermore, an identification of which GNSS satellite 101 transmitted the respective GNSS signals 102 is appended with the respective code phase and carrier phase data.

In accordance with various embodiments, GNSS receiver system 300 then wirelessly transmits an ionospheric sample 140 to a wireless communication transceiver 150. As will be described in greater detail below, GNSS receiver system 300 is configured to communicate via a wireless communication network and to send ionospheric sample 140 which is then used in creating a model of ionospheric conditions. In accordance with various embodiments, the term "ionospheric sample" in accordance with various embodiments is based upon the respective code phase and carrier phase data from each GNSS satellite 101 from which GNSS receiver system 300 has received signals. More specifically, in accordance with various embodiments, the ionospheric sample sent from GNSS receiver system 300 comprises code-minus-code and carrier-minus-carrier calculations derived from the respective code phase and carrier phase data stored by GNSS receiver system 300. As an example, when software defined GNSS receiver 333 of GNSS receiver system 300 receives GNSS signals 102 from a given GNSS satellite 101, it derives respective code phase data from the L1 and L2C, and/or L5, signals transmitted by the GNSS satellite 101. As described above, these respective code phase and carrier phase measurements are stored by GNSS receiver system 300. From this respective code phase and carrier phase data, GNSS receiver system 300 will derive a code-minus-code sample in which the measured code phase of the received L2C or L5 signal is subtracted from the measured code phase of the received L1 signal from that same GNSS satellite 101. In accordance with one embodiment, deriving a code-minus-code sample is performed by software defined GNSS receiver 333 of GNSS receiver system 300. Similarly, GNSS receiver system 300 will derive a carrier-minus-carrier sample in which the measured carrier phase of the received L2C signal or L5 signal is subtracted from the measured carrier phase of the received L1 signal from that same GNSS satellite 101. In accordance with one embodiment, deriving a carrier-minus-carrier sample is performed by software defined GNSS receiver 333 of GNSS receiver system 300. In accordance with various embodiments, this ionospheric sample 140 (e.g., code-minus-code and carrier-minus-carrier calculations) is sent along and appended with the position fix, GNSS time-stamp, and satellite identification of the GNSS satellite 101 from which the code phase and carrier phase data was derived.

In accordance with various embodiments, in addition to the data described above, a unique identification of the particular GNSS receiver system 300 may be included with the ionospheric sample 140 sent by GNSS receiver system 300. This is to account for the phenomenon known as "interfrequency bias" which is unique to every GNSS transmitter and receiver. Interfrequency bias occurs due to the small differences in the analog path that signals follow through an electrical device. They are unique to each device and can be measured and known in advance. This device-specific bias can then be applied to the ionospheric sample 140 to account for this effect to determine more precisely the code phase and carrier phase derived from respective GNSS signals. Due to privacy concerns, the unique identification of GNSS receiver system 300 is encrypted or hashed in various embodiments so that the identity and location of a user, or a device associated with a user, is not conveyed in ionospheric sample 140.

In accordance with various embodiments, communication device 330 is configured to determine when a wireless communication link is available for wirelessly transmitting ionospheric sample 140. More specifically, internal GNSS receiver chipset 337 is configured to determine when a communication link is available for wirelessly transmitting ionospheric sample 140 in accordance with various embodiments. In response to determining that a wireless communication link is available for wirelessly transmitting ionospheric sample 140, internal GNSS receiver chipset 337 enables the transmission of ionospheric sample 140 to a second location. Upon transmitting ionospheric sample 140 to a second location (e.g., ionospheric data storage 151), internal GNSS receiver chipset 337 can mark that data to be overwritten by, or deleted from storage 332 of communication device 330.

The data conveyed in ionospheric sample 140 can be used for modeling the ionosphere with greater granularity than is now possible. Currently, the data used to model the ionosphere is received from a network of ground stations scattered around the Earth. However, the cost of these ground stations limits the density of the network which in turn limits the number of data points collected for use in modelling the ionosphere. As described above, the ionosphere is a dynamic environment which changes quickly over short periods and distances. However, the sparseness of the ground station network used to collect ionospheric data limits the precision with which the ionospheric conditions can be modelled. Additionally, the sparseness of the ground station network means that less than optimal measurements are relied upon to derive the ionospheric model. Preferably, the GNSS satellite should be directly over the station collecting the ionospheric data. This is because the GNSS signals 102 can be refracted when the GNSS satellite 101 which originated the signal is lower with respect to the horizon than a GNSS satellite which is directly overhead.

Implementing the embodiments described above can mitigate some of these problems. For example, using GNSS receiver system 300 permits the implementation of a denser reporting network for generating data points for modelling ionospheric conditions. As a result, a more accurate collection of the short-term spatio-temporal ionospheric conditions can be performed than is possibly using the more widely scattered ground stations described above. Additionally, a denser reporting network means that it is more likely that GNSS satellites will be directly overhead, or at least higher with respect to the horizon, of at least one of GNSS receiver system 300 than is possible using the more widely-scattered ground stations described above. Thus, as shown in FIG. 1A, ionospheric sample 140 is sent to an ionospheric data storage 151 via wireless communication transceiver 150. From there, it can be accessed by an ionospheric modeling system 152. An example of an ionospheric modeling system 152 which utilizes a greater density of ionospheric data points is described in U.S. patent application Ser. No. 14/101,110, filed Dec. 9, 2013, titled "Method for Generating Accuracy Information on an Ionosphere Model for Satellite Navigation Applications," by Ralf Drescher and Xiaoming Chen. Another example is titled "Medium-scale 4-D ionospheric Tomography Using a Dense GPS Network," by M. M. J. L. van de Kamp, which was published Jan. 10, 2013 in the Annales Geophysicae. Using the data contained in ionospheric sample 140, ionospheric modeling system 152 can implement one of the above methods to dynamically model the current ionospheric conditions in both time and space. Again, using GNSS receiver system 300 provides both greater granularity and better data sources (e.g., GNSS satellites 101 which are directly overhead) than is possible using ground station reporting networks alone. This higher-fidelity ionospheric model can then be used by a GNSS corrections service 153 to generate GNSS corrections for GNSS receivers in its coverage area. The GNSS corrections can be passed to a GNSS corrections delivery service 154 which then delivers the GNSS corrections to subscribers in the coverage area. It is noted that ionospheric data storage 151, ionospheric modeling system 152, GNSS corrections service 153, and GNSS corrections delivery service 154 are shown as a representation of how the ionospheric sample 140 sent by GNSS receiver system 300 can be used and is not to be interpreted as a component of the present technology.

Additionally, in various embodiments, ionospheric modeling system 152 and/or GNSS corrections service 153 may send an update frequency message 145 to GNSS receiver system 300. For example, in accordance with various embodiments, GNSS receiver system 300 will send ionospheric sample 140 periodically according to a pre-determined reporting interval (e.g., once every minute). However, in some instances, it may desired that GNSS receiver system 300 will increase or decrease its reporting interval. For example, when GNSS receiver system 300 is located, or moving through, a region in which there is a low density of conventional ground stations, the frequency of the reporting interval of ionospheric samples 140 from GNSS receiver system 300 can be increased (e.g., to every 30 seconds) to provide a greater set of data from that region. It is noted that the frequency of the reporting interval of ionospheric samples 140 can range from fractions of a second to minutes in accordance with various embodiments. In some cases, it may desirable to lower frequency of reporting ionospheric samples 140 such as when there is a greater number of GNSS receiver systems 300 in a given area so as to not overwhelm ionospheric modeling system 152 with superfluous data. Another example in which changing the reporting interval from GNSS receiver system 300 is when an event or perturbance of the ionosphere is detected and a greater amount of data is desired to provide timely modeling of the ionosphere. Alternatively, at night the ionosphere is relatively stable compared to daylight hours and less data is required by ionospheric modeling system 152 to accurately model ionospheric conditions. It is noted that while the same wireless communication transceiver 150 is shown receiving ionospheric sample 140 and sending update frequency message 145, that those messages can be sent and received via separate wireless communication networks in accordance with various embodiments. The use of a mobile GNSS receiver to capture ionospheric data is advantageous because the existing infrastructure for collecting ionospheric data relies upon expensive high-precision GNSS receivers which are positioned at fixed locations. The geographic coordinates for these fixed GNSS receivers, or more specifically for their antennas, are precisely known because in the past this was a requirement for modeling the ionosphere more precisely. Embodiments of the present technology facilitate gathering a cloud of ionospheric data which can then be processed to create a precise ionospheric model. Furthermore, as will be explained in greater detail below, there is no requirement for the mobile multi-frequency GNSS receiver (e.g., GNSS receiver system 300 of FIGS. 1A, 3A, 3B, 3C, 3D, and 3E, vehicle navigation system 170 of FIG. 1B, or vehicle controller 181 of FIG. 1C) described herein to be stationary when receiving the GNSS signals which it processes, or when sending the respective code phase data and/or carrier phase data from these respective GNSS signals.

Figure 1B:
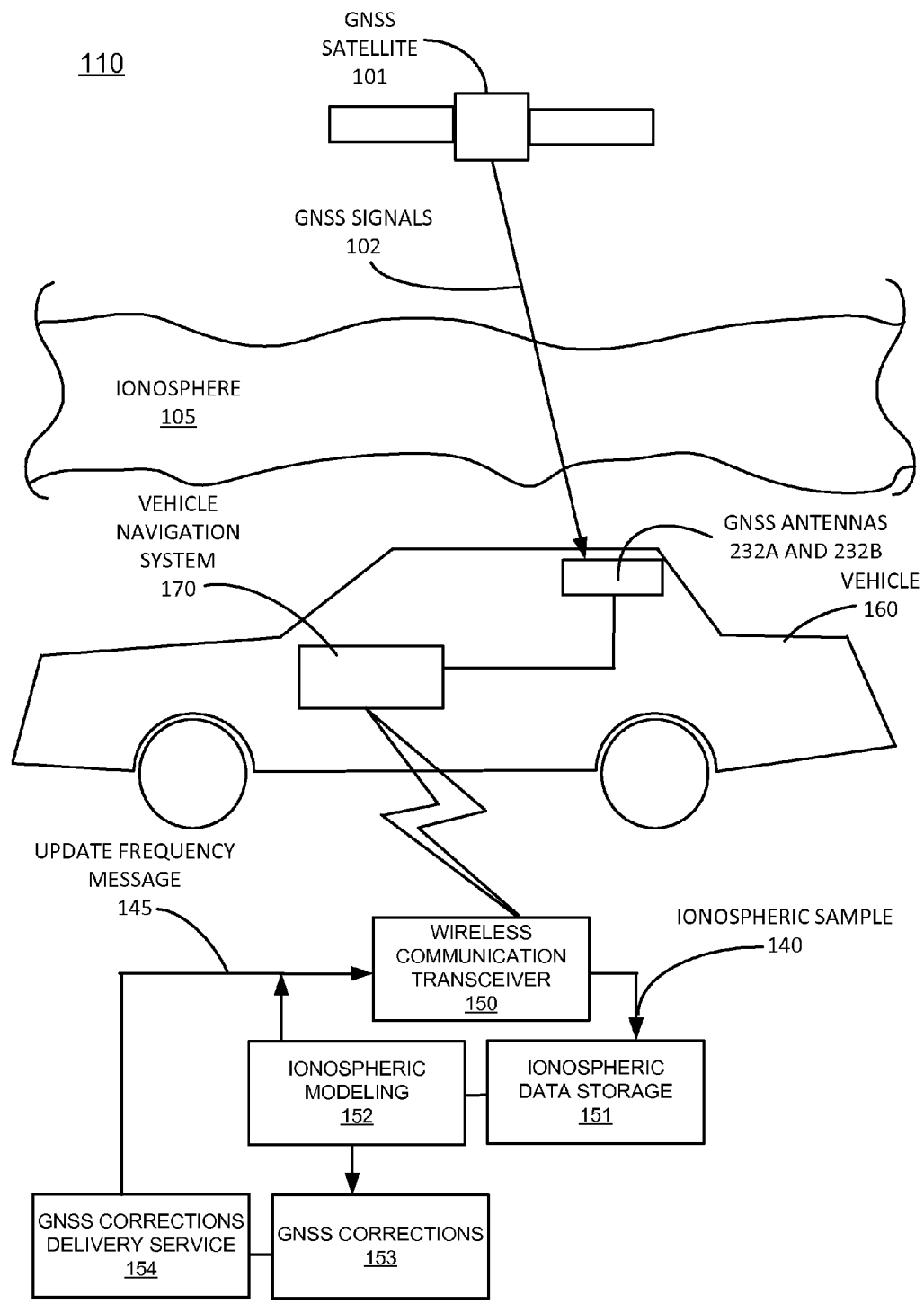
FIG. 1B is a block diagram of components of a system for capturing ionospheric data in accordance with various embodiments.

FIG. 1B is a block diagram of components of a system 110 for capturing ionospheric data in accordance with various embodiments. In accordance with various embodiments, a vehicle 160 is equipped with a vehicle navigation system 170 and GNSS antennas 232A and 232B. In accordance with various embodiments, vehicle 160 comprises a motor vehicle, a passenger vehicle, a sports utility vehicle (SUV), a truck, a delivery vehicle, a long-haul truck-trailer, an unmanned aerial vehicle (UAV), an unmanned vehicle, a passenger airplane, a transport airplane, an ocean-going ship, a river boat, a passenger train, a freight train, or a motorcycle. Components of vehicle navigation system 170 can be implemented as a typical vehicle navigation system configured for displaying the geographic position of vehicle 160 upon a map and for generating instructions, alerts, and warnings based upon the position of vehicle 160 and other data. It is noted that in accordance with various embodiments, vehicle navigation system 170 comprises a digital map which detects the presence of various structures and features (e.g., buildings, bridges, roads, etc.) based upon the geographic position of vehicle 160. In accordance with another embodiment, vehicle navigation system 170 can be implemented as a telematics box which is used for collecting and reporting various metrics of vehicle/operator performance as well. In accordance with at least one embodiment, vehicle navigation system 170 comprises a software defined GNSS receiver (e.g., 333 as described below with reference to FIGS. 3A-3E). In accordance with at least one embodiment, vehicle 160 can be an autonomous vehicle which is operated without human supervision or input. For the purpose of brevity, the components described above with reference to FIG. 1A will not be repeated in the present discussion.

In accordance with various embodiments, vehicle navigation system 170 derives respective code phase and carrier phase data from the GNSS signals 102 from each satellite in view of GNSS antennas 232A and 232B. Vehicle navigation system 170 then stores the respective code phase and carrier phase data in a data storage device (e.g., in data storage unit 1312 of FIG. 13). This code phase and carrier phase data is also time-stamped with the time that the respective code phase and carrier phase data (e.g., GNSS signals 102) was received by vehicle navigation system 170 and is appended with data specifying the position fix at which vehicle navigation system 170 was located when the respective code phase and carrier phase data (e.g., GNSS signals 102) were received. Furthermore, an identification of which GNSS satellite 101 transmitted the respective GNSS signals 102 is appended with the respective code phase and carrier phase data.

In accordance with various embodiments, vehicle navigation system 170 then wirelessly transmits an ionospheric sample 140 to a wireless communication transceiver 150. As will be described in greater detail below, vehicle navigation system 170 is configured to communicate via a wireless communication network and to send ionospheric sample 140 which is then used in creating a model of ionospheric conditions. In accordance with various embodiments, the term "ionospheric sample" in accordance with various embodiments is based upon the respective code phase and carrier phase data from each GNSS satellite 101 from which vehicle navigation system 170 has received signals. More specifically, in accordance with various embodiments, the ionospheric sample sent from vehicle navigation system 170 comprises code-minus-code and carrier-minus-carrier calculations derived from the respective code phase and carrier phase data stored by vehicle navigation system 170. As an example, when vehicle navigation system 170 receives GNSS signals 102 from a given GNSS satellite 101, it derives respective code phase data from the L1 and L2C, and/or L5, signals transmitted by the GNSS satellite 101. In accordance with various embodiments, this derivation of respective code phase data and carrier phase data is performed by a software defined GNSS receiver (e.g., software defined GNSS receiver 333 of FIGS. 3A-3E). Additionally, the calculation of code-minus-code data as well as carrier-minus-carrier data is performed by a software defined GNSS receiver (e.g., software defined GNSS receiver 333 of FIGS. 3A-3E). As described above, these respective code phase and carrier phase measurements are stored by vehicle navigation system 170. From this respective code phase and carrier phase data, vehicle navigation system 170 will derive a code-minus-code sample in which the measured code phase of the received L2C signal or L5 signal is subtracted from the measured code phase of the received L1 signal from that same GNSS satellite 101. Similarly, vehicle navigation system 170 will derive a carrier-minus-carrier sample in which the measured carrier phase of the received L2C signal or L5 signal is subtracted from the measured carrier phase of the received L1 signal from that same GNSS satellite 101. In accordance with various embodiments, this ionospheric sample 140 (e.g., code-minus-code and carrier-minus-carrier calculations) is sent along with the appended position fix, GNSS time-stamp, and satellite identification of the GNSS satellite 101 from which the code phase and carrier phase data was derived.

In accordance with various embodiments, in addition to the data described above, a unique identification of the particular GNSS receiver 200 used by vehicle navigation system 170 may be included with the ionospheric sample 140 sent by vehicle navigation system 170. This is to account for the inter-frequency bias described above. Inter-frequency bias occurs due to the small differences in the analog path that signals follow through an electrical device. They are unique to each device and can be measured and known in advance. This device-specific bias can then be applied to the ionospheric sample 140 to account for this effect to determine more precisely the code phase and carrier phase derived from respective GNSS signals. Due to privacy concerns, the unique identification of the GNSS receiver 200 used by vehicle navigation system 170 is encrypted or hashed in various embodiments so that the identity and location of a user, or a device associated with a user, is not conveyed in ionospheric sample 140.

In accordance with various embodiments, vehicle navigation system 170 is configured to determine when a wireless communication link is available for wirelessly transmitting ionospheric sample 140. More specifically, GNSS processor 254 (e.g., of GNSS receiver 200 described below) is configured to determine when a communication link is available for wirelessly transmitting ionospheric sample 140 in accordance with various embodiments. In response to determining that a wireless communication link is available for wirelessly transmitting ionospheric sample 140, GNSS processor 254 enables the transmission of ionospheric sample 140 to a second location. Upon transmitting ionospheric sample 140 to a second location (e.g., data storage device 1312), GNSS processor 254 can mark that data to be overwritten by, or deleted from data storage device 1312 of computer system 1300.

As described above with reference to FIG. 1A, in accordance with various embodiments, vehicle navigation system 170 will send ionospheric sample 140 periodically according to a pre-determined reporting interval (e.g., once every minute). However, in some instances, it may desired that vehicle navigation system 170 will increase or decrease its reporting interval. Thus, in various embodiments, ionospheric modeling system 152 and/or GNSS corrections service 153 may send an update frequency message 145 to vehicle navigation system 170 to cause vehicle navigation system 170 to change its reporting interval.

Figure 1C:
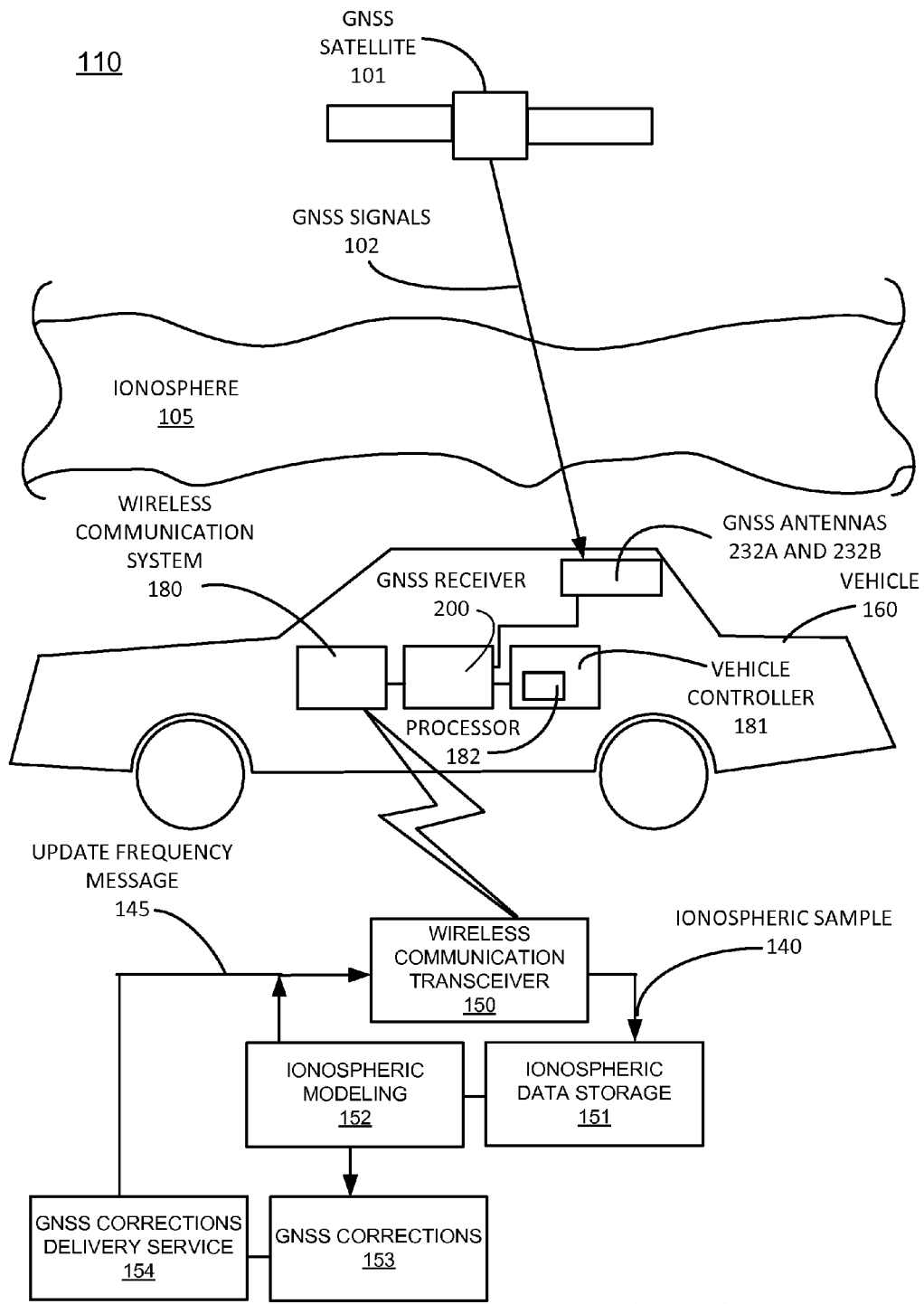
FIG. 1C is a block diagram of components of a system for capturing ionospheric data in accordance with various embodiments.

FIG. 1C is a block diagram of components of a system for capturing ionospheric data in accordance with various embodiments. For the purpose of brevity, the components described above with reference to FIGS. 1A and 1B will not be repeated in the present discussion. In FIG. 1C, vehicle 160 is equipped with GNSS antennas 232A and 232B and a GNSS receiver 200 as described in greater detail below. In accordance with at least one embodiment, GNSS receiver 200 comprises a software defined GNSS receiver (e.g., 333 as described below with reference to FIGS. 3A-3E). Vehicle 160 is also equipped with a wireless communication system 180. Examples of communication networks used by wireless communication system 180 include, but are not limited to Global System for Mobile Communications (GSM) cellular networks, General Packet Radio Service (GPRS) cellular networks, Code Division Multiple Access (CDMA) cellular networks, and Enhanced Data rates for GSM Evolution (EDGE) cellular networks. In accordance with other embodiments, wireless communication system 180 is a radio-frequency transceiver compliant with, but not limited to, Wi-Fi, WiMAX, implementations of the Institute of Electrical and Electronics Engineers (IEEE) 802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard) including Bluetooth Low Energy (BLE) implementations, implementations of the IEEE 1902.1 (RuBee) specification, implementations of IEEE 802.15 (ZigBee) standard, etc. It is noted that wireless communication system 180 may be configured to utilize multiple wireless communication transceivers operable in separate and distinct wireless communication networks.

Vehicle 160 is also equipped with a vehicle controller 181. In accordance with various embodiments, vehicle controller 181 comprises a variety of sensors, decision making algorithms, and control devices used to autonomously operate vehicle 160. Examples, of sensors include cameras and distance/ranging devices such as radar, light detection and ranging (LIDAR), ultra-sonic detectors, and the like for detecting nearby objects. It is noted that in accordance with various embodiments, vehicle controller 181 comprises a digital map which detects the presence of various structures and features (e.g., buildings, bridges, roads, etc.) based upon the geographic position of vehicle 160. Using this information, as well as navigation information received from GNSS receiver 200, the decision making algorithms of vehicle controller 181 generates commands to various controls which operate the brakes, throttle, steering, lights, and horn of vehicle 160. It is noted that in FIG. 1C vehicle controller 181 comprises a processor 182. Processor 182 is configured to derive the ionospheric sample 140. In accordance with one embodiment, processor 182 uses the unprocessed code phase and carrier phase measurements of the L1, L2C, and L5 signals 102 sent from GNSS satellite 101 as the ionospheric sample 140. Alternatively, processor 182 subtracts the carrier phase estimate of one of signals 102 from the carrier phase estimate of another of signals 102 from GNSS satellite 101. As an example, processor 182 will subtract a carrier phase estimate of the L1 signals from GNSS satellite 101 from a carrier phase estimate of the L2C signals, or L5 signals, from GNSS satellite 101 which is then sent as ionospheric sample 140. Alternatively, processor 182 will subtract a carrier phase estimate of the L2C signals, or L5 signals, from GNSS satellite 101 from a carrier phase estimate of the L1 signals from GNSS satellite 101 which is then sent as ionospheric sample 140. Similarly, processor 182 can subtract a code phase estimate of the L1 signals from GNSS satellite 101 from a code phase estimate of the L2C signals, or L5 signals, from GNSS satellite 101 which is then sent as ionospheric sample 140, or subtract a code phase estimate of the L2C signals, or L5 signals, from GNSS satellite 101 from a code phase estimate of the L1 signals from GNSS satellite 101 which is then sent as ionospheric sample 140. It is noted that ionospheric sample 140 can include any combination of the above discussed sets of data as ionospheric sample 140. For example, processor 182 may send the difference derived from subtracting the code phase and carrier phase estimates of the L1 signal from the L2C signal or L5 signal, as well as optionally sending the unprocessed code phase and carrier phase measurements of the L1, L2C, and L5 signals as ionospheric sample 140.

The use of autonomously operated vehicles is increasingly common for various activities such as collecting images of streets, polling of smart devices, etc. It is likely that the use of autonomously operated vehicles (e.g., vehicle 160) for hauling freight will be allowed. In accordance with various embodiments, vehicle 160 may be a vehicle configured for one of these purposes (e.g., hauling freight) but which is also configured for capturing and reporting ionospheric data as described above. Alternatively, vehicle 160 may be intended primarily, or exclusively, as a mobile system for capturing and reporting ionospheric data.

In accordance with various embodiments, filtering of ionospheric samples can be performed to unweight suspected poor-quality data. This can be performed either by, for example, ionospheric modeling component 152 of FIGS. 1A-1C, or by the mobile multi-frequency GNSS receiver (e.g., GNSS receiver system 300 of FIGS. 1A, 3A, 3B, 3C, 3D, and 3E, vehicle navigation system 170 of FIG. 1B, or vehicle controller 181 of FIG. 1C). For example, when it is determined that the mobile GNSS receiver (e.g., 300, 170, and/or 181) is in a high multi-path reception area such as an urban area with tall buildings, ionospheric modeling component 152 may assign a lower weighting to the data received, or discard it entirely, due to the fact that multi-path error may have corrupted the data when GNSS signals are received by the mobile GNSS receiver (e.g., 300, 170, and/or 181). Alternatively, the mobile GNSS receiver (e.g., 300, 170, and/or 181) may determine that it is located in a high multi-path reception area and autonomously suspend the processing of the GNSS signals received at that location. For the purpose of the present technology, the term "suspend" means that processing of received GNSS signals is not initiated to determine code phase data and/or carrier phase data, or, if processing of the received GNSS signals is being performed, that processing is terminated. In accordance with another embodiment, the multi-frequency receiver (e.g., 300, 170, and/or 181) will prevent the transmission of ionospheric sample and/or the respective code phase data and carrier phase data to ionospheric modeling component 152 if it is determined that it is located in a high multi-path reception area. The use of a digital map is useful in determining when the mobile GNSS receiver (e.g., 300, 170, and/or 181) is located in a high multi-path reception area.

In accordance with various embodiments, the mobile multi-frequency GNSS receiver (e.g., 300, 170, and/or 181) can append data, along with the code phase data and carrier phase data, indicating whether the multi-frequency receiver (e.g., 300, 170, and/or 181) is moving or not moving while the GNSS signals are or were received. This information can be provided using a motion sensor (e.g., sensor 1340 of FIG. 13, or motion sensor 1329 of FIG. 13). As described below various devices such as cellular telephones, tablet computers, etc., as well as vehicle navigation/control systems, may be equipped with motion sensors to detect when a device is in motion, or the orientation of the device with respect to the Earth. This information can be used to filter whether data is to be processed by the multi-frequency receiver (e.g., 300, 170, and/or 181), or reported. This information can also be useful in weighting the data which is collected by the mobile multi-frequency GNSS receiver (e.g., 300, 170, and/or 181). For example, in a high multi-path reception area it is more desired to receive GNSS signals by a moving antenna as the multi-path error is reduced. This is due to the fact that the signal phase from a given multi-path reflection source is reversed as the GNSS antenna moves 10-20 cm. Thus, even if the mobile multi-frequency GNSS receiver (e.g., 300, 170, and/or 181) is located in a multi-path reception area, its data may still be useful if it is in motion when the signals are received. Alternatively, the mobile multi-frequency GNSS receiver (e.g., 300, 170, and/or 181) can be configured to collect and send code phase data and carrier phase data only when it is determined that it is not in motion (e.g., when vehicle 160 is parked or at a stoplight). Data collected and reported when the mobile multi-frequency GNSS receiver (e.g., 300, 170, and/or 181) is stationary can be statistically useful depending upon the post-processing that is performed. Thus, the appended motion state information regarding the mobile multi-frequency GNSS receiver (e.g., 300, 170, and/or 181) can be used to improve the quality of post-processing applied to the code phase data and carrier phase data.

Global Navigation Satellite Systems

A Global Navigation Satellite System (GNSS) is a navigation system that makes use of a constellation of satellites orbiting the earth to provide signals to a receiver, such as 200 of FIG. 2, or 300A, 300B, 300C, and 300D of FIGS. 3A, 3B, 3C, 3D, and 3E respectively, which estimates its position relative to the earth from those signals. Examples of such satellite systems are the NAVSTAR Global Positioning System (GPS) deployed and maintained by the United States, the GLObal NAvigation Satellite System (GLONASS) deployed by the Soviet Union and maintained by the Russian Federation, the BeiDou Satellite Navigation System currently deployed by China, and the GALILEO system currently being deployed by the European Union (EU). Table 1 below shows equivalent frequency bands of various satellite navigation systems which are equivalent to the L1, L2C, and L5 discussed above with reference to various embodiments. Thus, while various embodiments specifically cite the L1, L2C, and L5 GPS signals, equivalent GLONASS L1 and L2 signals can be used in various embodiments. Similarly, for the Galileo satellite navigation system, the E1, E5, and E6 signals can be used in various embodiments. Also, for the BeiDou satellite navigation system, the B1 and B2 signals can be used in various embodiments.

which is encrypted for use by authorized users. A receiver, such as GNSS receiver systems 200 and/or 300A-D, designed for precision positioning contains multiple channels, each of which can track the signals on the L1, L2C, and L5 frequencies from a GPS satellite in view above the horizon at the receiver antenna(s), and from these computes the observables for that satellite comprising the L1 pseudorange, possibly the L2C and/or L5 pseudorange and the coherent L1, L2C, and/or L5 carrier phases. The term "pseudorange" refers to the range from each satellite to the antenna(s) of a GNSS receiver (e.g., 232A and 232B of FIG. 2, or 311, 312, and 318 of FIGS. 3A-3E) which is derived from difference of the timing signal conveyed via the L1, L2C, and L5 signals and a corresponding internal clock signal of the GNSS receiver. The pseudorange differs the true satellite-receiver range (e.g., the true distance from the satellite(s) to the receiver's antenna(s)) due to a variety of error contributions including: satellite clock error, receiver clock error, satellite orbital position error, ionospheric delay error, tropospheric delay error, multi-path error, etc. Coherent phase tracking implies that the carrier phases from two channels assigned to the same satellite and frequency will differ only by an integer number of cycles. It is noted that in accordance with various embodiments, continuous tracking of the L2C and/or L5 signal is not necessary.

Each GLONASS satellite conventionally transmits continuously using two radio frequency bands in the L-band, also referred to as L1 and L2. Each satellite transmits on one of multiple frequencies within the L1 and L2 bands respectively centered at frequencies of 1602.0 MHz and 1246.0 MHz respectively. The code and carrier signal structure is

TABLE 1

| | System | | | |
|---|---|---|---|---|
| Owner | GPS<br>United States | GLONASS<br>Russian Federation | BeiDou<br>China | Galileo<br>European Union |
| Frequency | 1.57542 GHz<br>(L1 signal)<br>1.2276 GHz<br>(L2/L2C signal)<br>1.1765 GHz<br>(L5 signal) | Around 1.602 GHz<br>(SP)<br>Around 1.246 GHz<br>(SP) | 1.561098 GHz (B1)<br>1.589742 GHz (B1-2)<br>1.20714 GHz (B2)<br>1.26852 GHz (B3)<br>1.1765 GHz (B2) | 1.559-1.592 GHz<br>(E2-L1-E11)<br>1.260-1.300 GHz<br>(E6)<br>1.164-1.215 GHz<br>(E5a and E5b) |

Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the United States Department of Defense (DoD). One signal is transmitted on L2, intended only for DoD-authorized users. Each GPS signal has a carrier at the L1 and L2 frequencies, a pseudo-random number (PRN) code, and satellite navigation data. Recently, a second civilian GPS signal, the L2C signal, has been added to provide greater precision in determining positions in commercial applications. Like the L2 signal, the L2C is also broadcast in the 1227.60 MHz frequency band. A third civilian GPS signal, the L5 signal has also been added which has a bandwidth of 24 MHz and is broadcast at a frequency of 1176.45 MHz. The L5 signal is intended mainly for aircraft navigation but is available for all civil users as well. As a result, civilian users having multi-frequency GNSS receivers can benefit from faster acquisition, enhanced reliability, greater operating range, and greater precision.

Two different PRN codes are transmitted by each satellite: A coarse acquisition (C/A) code and a precision (P/Y) code similar to that of NAVSTAR. A GNSS receiver designed for precision positioning contains multiple channels each of which can track the signals from both GPS and GLONASS satellites on their respective L1, L2, L2C frequencies, and the GPS L5 frequency, and generate pseudorange and carrier phase observables from these. Future generations of GNSS receivers will include the ability to track signals from all deployed GNSSs. It should be noted that in the near future a modernized L1 Glonass signal will be added that is centered at 1575.42 MHz, the same center frequency as L1 GPS. Additionally, this modernized Glonass signal will be in a code division multiple access (CDMA) format rather than in a frequency division multiple access (FDMA) like its conventional counterpart that is centered at 1602.0 MHz.

The basic accuracy in determining a position fix of a GPS receiver that processes only the code phase information without any further corrections is on the order of several-to-many meters. This is partially due to the inherent level of accuracy available via code phase, plus many more kinds of error contributions to the GPS signal. Since GPS is at its core a timing system, the resolution of a time-based measurement available with the fundamental GPS signal using only code phase is on the order of 10 nanoseconds at best, which translates to 10 feet of uncertainty with a resulting position fix error of a similar magnitude. Time ranging using the C/A Code phase has an inherent uncertainty related to the wavelength of the C/A code, which is about 300 meters (e.g., 1 sec/(1023000)=1000 nanoseconds, or a thousand feet of radio wave propagation). Current resolution methods only can achieve about $\frac{1}{100}$ of the code phase wavelength, or approximately 3 meters. Additionally, external error sources can greatly increase this level of uncertainty such as ionospheric and tropospheric delay, receiver clock errors, satellite clock errors, and satellite orbital position errors. However, the GPS radio signal wavelength is 19 cm (wavelength=c/f, or $3 \times 10^8 / 1.57542 \times 10^9$). Ideally, if one could determine the exact number of wavelengths between receiver and each satellite, the error can be reduced to some fraction of a wavelength, which is on the order of a few centimeters. By measuring the phase of the carrier frequency, sub-centimeter accuracies may be obtained. If the carrier phase can be measured to within a few degrees, such as 5 degrees, then the accuracy is improved to $19 \times 5/360$, or 0.263 cm, which is much less than any of the other error contributions after correction. So measuring carrier phase is among the most important of the GPS receiver performance enhancements yet developed. The exact number of wavelengths of the GPS signal between the receiver and the various satellites is desired, plus the fraction of a wavelength as measured by the carrier phase.

Unfortunately, knowing the precise number of wavelengths to each satellite is difficult (cf. "Integer Ambiguity Resolution on Undifferenced GPS phase measurements and its application to PPP and satellite precise orbit determination", D. Laurichesse et al., NAVIGATION, Vol. 56, No. 2, Summer 2009). However, there are well-known techniques that can easily and quickly infer the precise number of wavelengths between two receivers commonly referred to as the RTK process, and thus lead to a determination of their relative position. Determining the number of wavelengths between two receivers is referred to as the "integer ambiguity resolution process," so named because the integer number of wavelengths is not knowable from just carrier phase measurements directly, since it can only determine a specific portion of a single wavelength.

One method of resolving integer ambiguity in accordance with various embodiments is described in U.S. Pat. No. 5,442,363 to Benjamin Remondi. The method originally was used to determine the coordinates of a receiver using received L1 and L2 GNSS signals and is described in U.S. Pat. No. 5,442,363. The method determines the relative position of a remote GPS receiver/antenna(s) with respect to the location of a reference GPS receiver/antenna(s). GPS code and carrier range measurements made by both the reference and the remote receivers are used in the ambiguity resolution process. After the lane ambiguities are resolved, only double differenced carrier phase measurements are used in the computation of the precise (e.g., centimeter level) positions. Both carrier measurements and code measurements are used to determine centimeter-level-accuracy positions.

The major steps performed are: (1) the meter-level differential GPS initial approximate solution, (2) establishing the grid for candidates, and (3) the resolution of the carrier range integer ambiguities. Although the method can use just L1 code and carrier and has been demonstrated using L1 code and carrier plus codeless L2-squared carrier measurements, the preferred observation set for the invention is full-wavelength L1, L2C, and L5 carrier ranges and at least one code range (usually L1 C/A code). Improved performance is achieved with additional code ranges. For simplicity the ambiguity resolution step will be described assuming only these three observation types. In practice more observation types can be used when available. Additionally, lane resolution using single frequency can be used by the invention's method, L2/L2C/L5-squared and full-wavelength L2/L2C/L5 modes are typically the preferred modes. By determining the number of carrier-phase wavelengths between a GNSS antenna(s) (e.g., 232A and 232B of FIG. 2) and the satellite sending the signal, the time of flight of the signal is determined. This is multiplied by the speed of light to derive a satellite-receiver distance.

Achieving the desired reduction in error or uncertainty in the path length between the satellites and the receiver has been the main goal of a variety of improvement techniques. There are two basic ways to improve accuracy. The first method is to perform carrier phase tracking of the GPS signal, which improves the timing resolution over the code phase results by several orders of magnitude and could get to a centimeter level estimate of the distance between a receiver and the satellites, if the integer ambiguity issue is resolved, and if there were no other kinds of errors. In another process, known as "wide-laning", the L2C signal or L5 signal (e.g., 1227.60 MHz or 1176.45 MHz respectively) is subtracted from the L1 signal (e.g., 1575.42 MHz) which results in a third signal with a frequency of 347.82 MHz when the L2C signal is used and a frequency of 398.45 MHz when the L5 signal is used. This lower frequency signal has a correspondingly longer wavelength. As a result, it is easier to narrow the field of candidate code phase phases which are then processed to determine the corresponding carrier phase. In accordance with various embodiments, wide-laning is used to expedite re-acquisition the L1 carrier phase signal. It is noted that both the L2C and/or L5 signals are both candidate carrier frequencies for performing wide-laning operations. In another embodiment, a process known as "tri-laning" can be performed in which separate operations are performed in which the L2C signal is subtracted from the L1 signal and the L5 signal is subtracted from the L1 signal. The respective lower frequency signals which result overlap to some extent and this allows narrowing the field of candidate code phase phases which are then processed to determine the corresponding carrier phase. Another method is to eliminate known errors that corrupt the estimate of the distance to the satellites, by various processing techniques. One method of error correction to eliminate known errors is known as Differential GPS, but this method only gets to meter-level accuracy, and cannot get to centimeter level accuracy. Another kind of error correction to eliminate known errors employs specific, different types of correction schemes in a pair of receivers and does not rely on any other external correction methods. This method has become known as, and is referred to herein, as the Real Time Kinematic method.

A third kind of error correction to eliminate known errors makes use of the GPS satellite system's network-wide corrections determined by a network of observation stations which are used to synthesize a broadcast correction data set that provides corrections for satellite clock and orbital position errors, along with other items. This is referred to herein as a Precise Positioning Point (PPP) correction system, such as the RTX system from Trimble Navigation Limited, and the data is available as a service to subscribers in select parts of the world, usually under a license agreement. Operation of the RTK method together with a PPP correction system may yield the best performance. However, implementing the RTK method alone has the advantage of no fees, licenses, or other additional costs. Additionally, RTK implementation is much more widespread and may achieve 2-5 cm accuracy or better.

Differential Global Positioning System (DGPS)

Differential GPS (DGPS) utilizes a reference station which is located at a surveyed position to gather data and deduce corrections for the various error contributions which reduce the precision of determining a position fix. For example, as the GPS signals pass through the ionosphere and troposphere, propagation delays may occur. Other factors which may reduce the precision of determining a position fix may include satellite clock errors, GPS receiver clock errors, and satellite position errors (ephemerides). The reference station receives essentially the same GPS signals as a separate receiver which may also be operating in the area. However, instead of using the timing signals from the GPS satellites to calculate its position, it uses its known position to calculate timing. In other words, the reference station determines what the timing signals from the GPS satellites should be in order to calculate the position at which the reference station is known to be. The difference in timing can be expressed in terms of pseudorange lengths, in meters. The difference between the received GPS signals and what they optimally should be is used as an error correction factor for other GPS receivers in the area. Typically, the reference station broadcasts the error correction to, for example, a rover unit which can use this data to determine its position more precisely. Alternatively, the error corrections may be stored for later retrieval and correction via post-processing techniques.

DGPS corrections cover errors caused by satellite clocks, ephemeris, and the atmosphere in the form of ionosphere errors and troposphere errors. The nearer a DGPS reference station is to the rover unit receiving the broadcast error correction the more useful the DGPS corrections from that reference station will be.

The system is called DGPS when GPS is the only constellation used for Differential GNSS. DGPS provides an accuracy on the order of 1 meter or 1 sigma for users in a range that is approximately in a few tens of kilometers (kms) from the reference station and growing at the rate of 1 m per 150 km of separation. DGPS is one type of Differential GNSS (DGNSS) technique. There are other types of DGNSS techniques, such as RTK and Wide Area RTK (WARTK), that can be used by high-precision applications for navigation or surveying that can be based on using carrier phase measurements. It should be appreciated that other DGNSS which may utilize signals from other constellations besides the GPS constellation or from combinations of constellations. Embodiments described herein may be employed with other DGNSS techniques besides DGPS.

A variety of different techniques may be used to deliver differential corrections that are used for DGNSS techniques. In one example, DGNSS corrections are broadcast over an FM subcarrier. U.S. Pat. No. 5,477,228 by Tiwari et al. describes a system for delivering differential corrections via FM subcarrier broadcast method.

Real-Time Kinematic System

An improvement to DGPS methods is referred to as Real-time Kinematic (RTK). As in the DGPS method, the RTK method, utilizes a reference station located at a determined or surveyed point. The reference station collects data from the same set of satellites in view by the GNSS receiver systems 200 and/or 300A-D in the area. Measurements of GPS signal errors taken at the reference station (e.g., dual-frequency pseudorange signal errors) and broadcast to one or more GNSS receiver systems 200 and/or 300A-D working in the area. The one or more GNSS receiver systems 200 and/or 300A-D combine the reference station data with locally collected position measurements to estimate local carrier-phase ambiguities, thus allowing a more precise determination of the position of GNSS receiver systems 200 and/or 300A-D. The RTK method is different from DGPS methods in that the vector from a reference station to one of GNSS receiver systems 200 and/or 300A-D is determined (e.g., using the single differences or double differences methods). In DGPS methods, reference stations are used to calculate the changes needed in each pseudorange for a given satellite in view of the reference station, and the GNSS receiver systems 200 and/or 300A-D, to correct for the various error contributions. Thus, DGPS systems broadcast pseudorange correction numbers second-by-second for each satellite in view, or store the data for later retrieval as described above.

RTK allows surveyors to determine a true surveyed data point in real time, while taking the data. However, the range of useful corrections with a single reference station is typically limited to about 70 km because the variable in propagation delay (increase in apparent path length from satellite to a receiver of the GNSS receiver systems 200 and/or 300A-D, or pseudo range) changes significantly for separation distances beyond 70 km. This is because the ionosphere is typically not homogeneous in its density of electrons, and because the electron density may change based on, for example, the sun's position and therefore time of day.

Thus for surveying or other positioning systems which must work over larger regions, the surveyor must either place additional base stations in the regions of interest, or move his base stations from place to place. This range limitation has led to the development of more complex enhancements that have superseded the normal RTK operations described above, and in some cases eliminated the need for a base station GPS receiver altogether. This enhancement is referred to as the "Network RTK" or "Virtual Reference Station" (VRS) system and method.

In an example implementation of using reference station data, inputs to a rover unit are reference station network, or VRS, corrections, GNSS pseudorange plus carrier phase information from its local GPS receiver. Reference corrections and data from the GPS receiver are synchronized and corrections are applied to the GNSS data for atmospheric models and so on. The output is synchronized GNSS data. Carrier phase ambiguities in floating point, and nuisance parameters are estimated. The output is user position plus carrier phase ambiguities in floating point. Improved user-position estimates are generated based upon the above output using the integer-nature of carrier phase ambiguities. In a typical implementation to determine a position of a rover unit with greater precision, this results in the output of an RTK position solution, which can be used according to various embodiments.

In accordance with various embodiments, an open-source RTK program package can be used to implement RTK processing of GPS observables. One such RTK algorithm is an open-source software package published by T. Takasu via the Internet found at www.RTKLIB.com. Another example is described in U.S. Pat. No. 5,519,620 titled "Centimeter Accurate Global Position System Receiver for On-the-fly Real-time Kinematic Measurement and Control," to Talbot et al. In accordance with various embodiments, an RTK algorithm can be implemented by, for example, vehicle navigation system 170 of FIG. 1B, processor 182 of FIG. 1C, processor 331 of FIGS. 3A-3E, and processor(s) 1330A-1330C of FIG. 13.

Network RTK

Network RTK typically uses three or more GPS reference stations to collect GPS data and extract information about the atmospheric and satellite ephemeris errors affecting signals within the network coverage region. Data from all the various reference stations is transmitted to a central processing facility, or control center for Network RTK. Suitable software at the control center processes the reference station data to infer how atmospheric and/or satellite ephemeris errors vary over the region covered by the network.

The control center computer processor then applies a process which interpolates the atmospheric and/or satellite ephemeris errors at any given point within the network coverage area and generates a pseudo range correction comprising the actual pseudo ranges that can be used to create a virtual reference station. The control center then performs a series of calculations and creates a set of correction models that provide a rover unit with the means to estimate the ionospheric path delay from each satellite in view from the rover unit, and to take account other error contributions for those same satellites at the current instant in time for the rover unit's location.

The rover unit sends its approximate position, based on raw GPS data from the satellites in view without any corrections, to the control center. Typically, this approximate position is accurate to approximately 4-7 meters. The user then requests a set of "modeled observables" for the specific location of the rover unit. The control center performs a series of calculations and creates a set of correction models that provide the rover unit with the means to estimate the ionospheric path delay from each satellite in view from the rover unit, and to take into account other error contributions for those same satellites at the current instant in time for the rover unit's location. In other words, the corrections for a specific rover unit at a specific location are determined on command by the central processor at the control center and a corrected data stream is sent from the control center to the rover unit. Alternatively, the control center may instead send atmospheric and ephemeris corrections to the rover unit which then uses that information to determine its position more precisely.

These corrections are now sufficiently precise that the high performance position accuracy standard of 2-3 cm may be determined, in real time, for any arbitrary rover unit's position. Thus a GPS enabled rover unit's raw GPS data fix can be corrected to a degree that makes it behave as if it were a surveyed reference location; hence the terminology "virtual reference station." An example of a network RTK system is described in U.S. Pat. No. 5,899,957, entitled "Carrier Phase Differential GPS Corrections Network," by Peter Loomis, assigned to the assignee of the present application.

The Virtual Reference Station method extends the allowable distance from any reference station to the rover unit. Reference stations may now be located hundreds of miles apart, and corrections can be generated for any point within an area surrounded by reference stations. However, there are many construction projects where cellular coverage is not available over the entire physical area under construction and survey.

Virtual Reference Stations

To achieve very accurate positioning (to several centimeters or less) of a terrestrial mobile platform of a rover unit, relative or differential positioning methods are commonly employed. These methods use a GNSS reference receiver located at a known position, in addition to the data from a GNSS receiver (e.g., a rover unit) on a mobile platform, to compute the estimated position of the mobile platform relative to the reference receiver.

The most accurate known method uses relative GNSS carrier phase interferometry between the rover unit's receiver and GNSS reference receiver antennas plus resolution of integer wavelength ambiguities in the differential phases to achieve centimeter-level positioning accuracies. These differential GNSS methods are predicated on the near exact correlation of several common errors in the rover unit and reference observables. They include ionosphere and troposphere signal delay errors, satellite orbit and clock errors, and receiver clock errors.

When the baseline length between the mobile platform and the reference receiver does not exceed 10 kilometers, which is normally considered a short baseline condition, the ionosphere and troposphere signal delay errors in the observables from the rover unit and reference receivers are almost exactly the same. Furthermore, these errors are consistent and repeatable when rover unit is moved from one position to another to record the position of various features which are being measured for some short period of time, typically less than 1 hour for less precise distance measurement, or a few minutes for a more precise (e.g., centimeter level precision) measurement of distance. These atmospheric delay errors therefore cancel in the rover unit's reference differential GNSS observables, and the carrier phase ambiguity resolution process required for achieving centimeter-level relative positioning accuracy is not perturbed by them. If the baseline length increases beyond 10 kilometers (considered a long baseline condition), these errors at the rover unit and reference receiver antennas become increasingly different, so that their presence in the rover unit's-reference differential GNSS observables and their influence on the ambiguity resolution process increases. Ambiguity resolution on single rover unit's reference receiver baselines beyond 10 kilometers becomes increasingly unreliable. This attribute limits the precise resolution of a mobile platform with respect to a single reference receiver, and essentially makes it unusable on a mobile mapping platform that covers large distances as part of its mission, such as an aircraft.

A network GNSS method computes the estimated position of a rover unit's antenna(s) (e.g., 232A and 232B of FIG. 2 and/or 311, 312, and 318 of FIGS. 3A-3E and 4A-4H) using reference observables from three or more reference receivers that approximately surround the rover unit's receiver trajectory. This implies that the rover unit's receiver trajectory is mostly contained by a closed polygon whose vertices are the reference receiver antennas. The rover unit can move a few kilometers outside this polygon without significant loss of positioning accuracy. A network GNSS algorithm calibrates the ionosphere and troposphere signal delays at each reference receiver position and then interpolates and possibly extrapolates these to the rover unit's position to achieve better signal delay cancellation on long baselines than could be had with a single reference receiver. Various methods of signal processing can be used, however they all yield essentially the same performance improvement on long baselines.

Kinematic ambiguity resolution (KAR) satellite navigation is a technique used in numerous applications requiring high position accuracy. KAR is based on the use of carrier phase measurements of satellite positioning system signals, where a single reference station provides the real-time corrections with high accuracy. KAR combines the L1 and L2 carrier phases from the rover unit and reference receivers so as to establish a relative phase interferometry position of the rover unit's antenna(s) with respect to the reference antenna. A coherent L1 or L2 carrier phase observable can be represented as a precise pseudorange scaled by the carrier wavelength and biased by an integer number of unknown cycles known as cycle ambiguities. Differential combinations of carrier phases from the rover unit and reference receivers result in the cancellation of all common mode range errors except the integer ambiguities. An ambiguity resolution algorithm uses redundant carrier phase observables from the rover unit and reference receivers, and the known reference antenna position, to estimate and thereby resolve these ambiguities.

Once the integer cycle ambiguities are known, the rover unit's GNSS receiver can compute its antenna(s) position with accuracies generally on the order of a few centimeters, provided that the rover unit and reference antennas are not separated by more than 10 kilometers. This method of precise positioning performed in real-time is commonly referred to as real-time kinematic (RTK) positioning. The separation between a rover unit and reference antennas shall be referred to as "device reference separation."

The reason for the device-reference separation constraint is that KAR positioning relies on near exact correlation of atmospheric signal delay errors between the rover unit and reference receiver observables, so that they cancel in the rover unit's reference observables combinations (for example, differences between rover unit and reference observables per satellite). As discussed above, the largest error in carrier-phase positioning solutions is introduced by the ionosphere, a layer of free electrons from the components of the atmosphere caused by solar radiation, surrounding the earth. When the signals radiated from the satellites penetrate the ionosphere on their way to the ground-based receivers, they experience delays in their signal travel times and shifts in their carrier phases. A second significant source of error is the troposphere delay. When the signals radiated from the satellites penetrate the troposphere on their way to the ground-based receivers, they experience delays in their signal travel times that are dependent on the temperature, pressure and humidity of the atmosphere along the signal paths. Fast and reliable positioning requires good models of the spatial-temporal correlations of the ionosphere and troposphere to correct for these non-geometric influences.

When the rover unit reference separation exceeds 10 kilometers, as maybe the case when the rover unit has a GNSS receiver that is a LEO satellite receiver, the atmospheric delay errors become de-correlated and do not cancel exactly. The residual errors can now interfere with the ambiguity resolution process and thereby make correct ambiguity resolution and precise positioning less reliable.

The rover unit's reference separation constraint has made KAR positioning with a single reference receiver unsuitable for certain mobile positioning applications where the mission of the mobile platform of the rover unit will typically exceed this constraint. One solution is to set up multiple reference receivers along the mobile platform's path so that at least one reference receiver falls within a 10 km radius of the mobile platform's estimated position.

Network GNSS methods using multiple reference stations of known location allow correction terms to be extracted from the signal measurements. Those corrections can be interpolated to all locations within the network. Network KAR is a technique that can achieve centimeter-level positioning accuracy on large project areas using a network of reference GNSS receivers. This technique operated in real-time is commonly referred to as network RTK. The network KAR algorithm combines the pseudorange and carrier phase observables from the reference receivers as well as their known positions to compute calibrated spatial and temporal models of the ionosphere and troposphere signal delays over the project area. These calibrated models provide corrections to the observables from the rover unit's receiver, so that the rover unit's receiver can perform reliable ambiguity resolution on combinations of carrier phase observables from the rover unit and some or all reference receivers. The number of reference receivers required to instrument a large project area is significantly less than what would be required to compute reliable single baseline KAR solutions at any point in the project area. See, for example, U.S. Pat. No. 5,477,458, "Network for Carrier Phase Differential GPS Corrections," and U.S. Pat. No. 5,899,957, "Carrier Phase Differential GPS Corrections Network". See also Liwen Dai et al., "Comparison of Interpolation Algorithms in Network-Based GPS Techniques," Journal of the Institute of Navigation, Vol. 50, No. 4 (Winter 1003-1004) for a comparison of different network GNSS implementations and comparisons of their respective performances.

A virtual reference station (VRS) network method is a particular implementation of a network GNSS method that is characterized by the method by which it computes corrective data for the purpose of rover unit's position accuracy improvement. A VRS network method comprises a VRS corrections generator and a single-baseline differential GNSS position generator such as a GNSS receiver with differential GNSS capability. The VRS corrections generator has as input data the pseudorange and carrier phase observables on two or more frequencies from N reference receivers, each tracking signals from M GNSS satellites. The VRS corrections generator outputs a single set of M pseudorange and carrier phase observables that appear to originate from a virtual reference receiver at a specified position (hereafter called the VRS position) within the boundaries of the network defined by a polygon (or projected polygon) having all or some of the N reference receivers as vertices. The dominant observables errors comprising a receiver clock error, satellite clock errors, ionosphere and troposphere signal delay errors and noise all appear to be consistent with the VRS position. The single-baseline differential GNSS position generator implements a single-baseline differential GNSS position algorithm, of which numerous examples have been described in the literature. B. Hofmann-Wellenhof et al., Global Positioning System: Theory and Practice, 5th Edition, 1001 (hereinafter "Hofmann-Wellenhof [1001]"), gives comprehensive descriptions of different methods of differential GNSS position computation, ranging in accuracies from one meter to a few centimeters. The single-baseline differential GNSS position algorithm typically computes differences between the rover unit and reference receiver observables to cancel atmospheric delay errors and other common mode errors such as orbital and satellite clock errors. The VRS position is usually specified to be close to or the same as the roving receiver's estimated position so that the actual atmospheric errors in the rover unit receiver observables approximately cancel the estimated atmospheric errors in the VRS observables in the rovers reference observables differences.

The VRS corrections generator computes the synthetic observables at each sampling epoch (typically once per second) from the geometric ranges between the VRS position and the M satellite positions as computed using well-known algorithms such as those given in IS-GPS-200G interface specification tilted "Naystar GPS Space Segment/Navigation User Interfaces," and dated 5 Sep. 2012. It estimates the typical pseudorange and phase errors comprising receiver clock error, satellite clock errors, ionospheric and tropospheric signal delay errors and noise, applicable at the VRS position from the N sets of M observables generated by the reference receivers, and adds these to the synthetic observables.

A network RTK system operated in real time requires each GNSS reference receiver to transmit its observables to a network server computer that computes and transmits the corrections and other relevant data to the rover unit's receiver. The GNSS reference receivers, plus hardware to assemble and broadcast observables, are typically designed for this purpose and are installed specifically for the purpose of implementing the network. Consequently, those receivers are called dedicated (network) reference receivers An example of a VRS network is designed and manufactured by Trimble Navigation Limited, of Sunnyvale, Calif. The VRS network as delivered by Trimble includes a number of dedicated reference stations, a VRS server, multiple server-reference receiver bi-directional communication channels, and multiple server-cellular-device-bi-directional data communication channels. Each server-cellular device bi-directional communication channel serves one rover unit. The reference stations provide their observables to the VRS server via the server-reference receiver bi-directional communication channels. These channels can be implemented by a public network such as the Internet. The bi-directional server-cellular-device communication channels can be radio modems or cellular telephone links, depending on the location of the server with respect to the rover unit.

The VRS server combines the observables from the dedicated reference receivers to compute a set of synthetic observables at the VRS position and broadcasts these plus the VRS position in a standard differential GNSS (DGNSS) message format, such as one of the RTCM (Radio Technical Commission for Maritime Services) formats, an RTCA (Radio Technical Commission for Aeronautics) format or a proprietary format such as the CMR (Compact Measurement Report) or CMR+ format which are messaging system communication formats employed by Trimble Navigation Limited. Descriptions for numerous of such formats are widely available. For example, RTCM Standard 10403.1 for DGNSS Services-Version 3, published Oct. 26, 2006 (and Amendment 2 to the same, published Aug. 31, 2007) is available from the Radio Technical Commission for Maritime Services, 1800 N. Kent St., Suite 1060, Arlington, Va., 22209. The synthetic observables are the observables that a reference receiver located at the VRS position would measure. The VRS position is selected to be close to the rover unit's estimated position so that the rover unit's VRS separation is less than a maximum separation considered acceptable for the application. Consequently, the rover unit must periodically transmit its approximate position to the VRS server. The main reason for this particular implementation of a real-time network RTK system is compatibility with RTK survey GNSS receivers that are designed to operate with a single reference receiver.

Descriptions of the VRS technique are provided in U.S. Pat. No. 6,324,473 of (hereinafter "Eschenbach") (see particularly col. 7, line 21 et seq.) and U.S. Patent application publication no. 2005/0064878, of B. O'Meagher (hereinafter "O'Meagher"), which are assigned to Trimble Navigation Limited; and in H. Landau et al., Virtual Reference Stations versus Broadcast Solutions in Network RTK, GNSS 2003 Proceedings, Graz, Austria (2003).

The term "VRS", as used henceforth in this document, is used as shorthand to refer to any system or technique which has the characteristics and functionality of VRS described or referenced herein and is not necessarily limited to a system from Trimble Navigation Ltd. Hence, the term "VRS" is used in this document merely to facilitate description and is used without derogation to any trademark rights of Trimble Navigation Ltd. or any subsidiary thereof or other related entity.

Precise Positioning Point (PPP)

Descriptions of a Precise Point Positioning (PPP) technique are provided in U.S. Pat. No. 8,587,475, of Leandro, which is assigned to Trimble Navigation Limited. Trimble Navigation Limited has commercialized a version of PPP corrections which it calls RTX™. PPP corrections can be any collection of data that provides corrections from a satellite in space, clock errors, ionosphere or troposphere, or a combination thereof. According to one embodiment, PPP corrections can be used in instead of WAAS or RTX™.

The term Precise Point Positioning (PPP), as used henceforth in this document, is used as shorthand to refer to any system or technique which has the characteristics and functionality of PPP described or referenced herein and is not necessarily limited to a system from Trimble Navigation Ltd. Hence, the term "PPP" is used in this document merely to facilitate description and is used without derogation to any trademark rights of Trimble Navigation Ltd. or any subsidiary thereof or other related entity. Techniques for generating PPP corrections are well known in the art. In general, a PPP system utilizes a network (which may be global) of GNSS reference receivers tracking navigation satellites such as GPS and GLONASS satellites and feeding data back to a centralized location for processing. At the centralized location, the precise orbits and precise clocks of all of the tracked navigation satellites are generated and updated in real time. A correction stream is produced by the central location; the correction stream contains the orbit and clock information. This correction stream is broadcast or otherwise provided to GNSS receivers, such as a GNSS receiver 200, or 300A-300D, in the field (conventionally by satellite service or cellular link) Corrections processors in the GNSS receivers utilize the corrections to produce centimeter level positions after a short convergence time (e.g., less than 30 minutes). A main difference between PPP and VRS is that PPP networks of reference receivers are typically global while VRS networks may be regional or localized with shorter spacing between the reference stations in a VRS network.

Wide Area Augmentation System (WAAS)

Wide Area Augmentation System (WAAS) corrections are corrections of satellite position and their behavior. WAAS was developed by the Federal Aviation Administration (FAA). WAAS includes a network of reference stations that are on the ground located in North America and Hawaii. The reference stations transmit their respective measurements to master stations which queue their respective received measurements. The master stations transmit WAAS corrections to geostationary WAAS satellites, which in turn broadcast the WAAS corrections back to earth where cellular devices that include WAAS-enabled GPS receivers can receive the broadcasted WAAS corrections. The WAAS corrections can be used to improve the accuracy of the positions of a receiver by applying the WAAS corrections to extracted pseudoranges. WAAS operation and implementation is well known in the art.

Example GNSS Receiver

Figure 2:
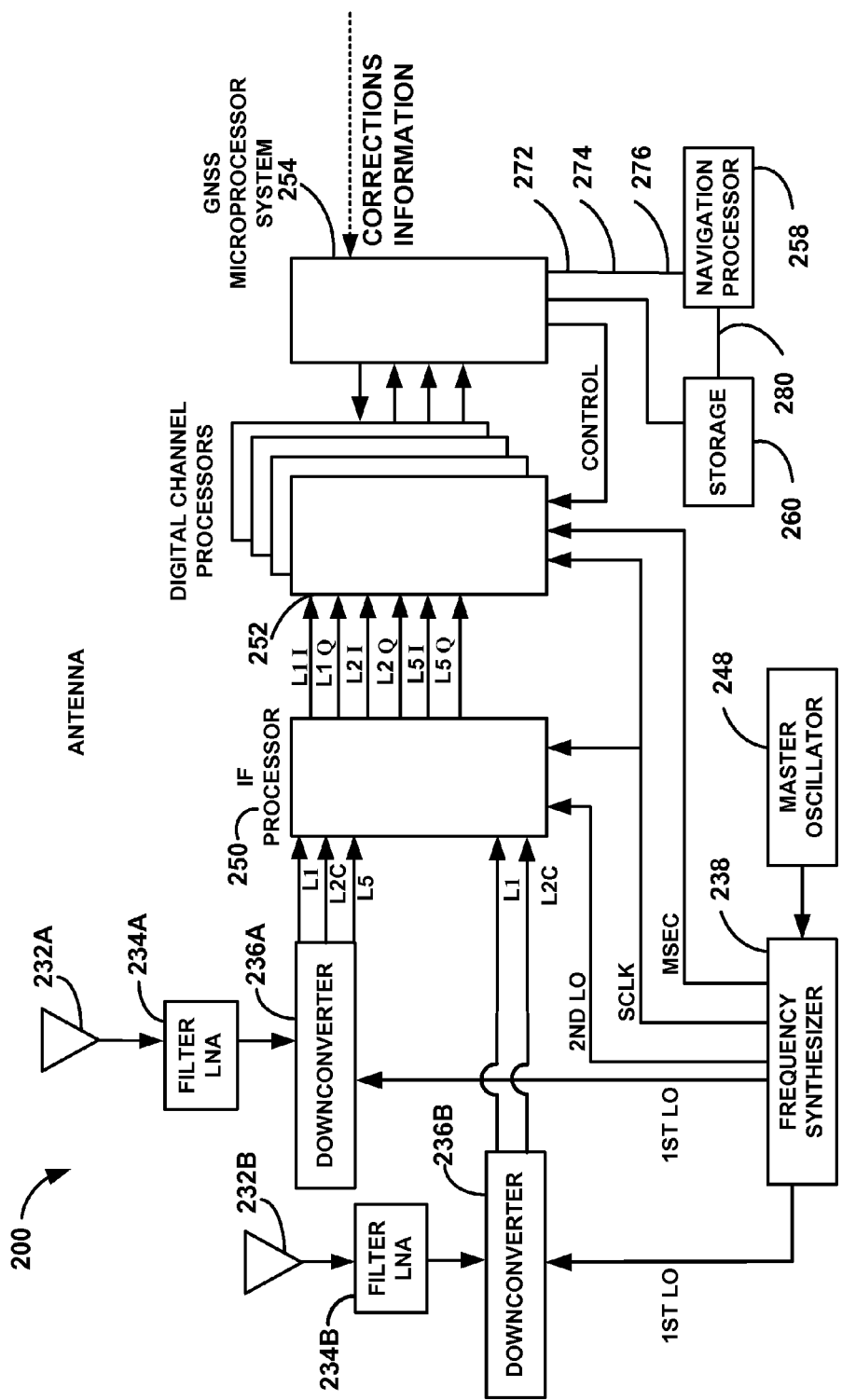
FIG. 2 shows an example Global Navigation Satellite System (GNSS) receiver system used in accordance with various embodiments.

With reference now to FIG. 2, a block diagram is shown of an embodiment of an example GNSS receiver 200 which may be used in accordance with various embodiments described herein. In particular, FIG. 2 illustrates a block diagram of a GNSS receiver 200 in the form of a GPS receiver capable of demodulation of the L1 and/or L2 signal(s) received from one or more GPS satellites. A more detailed discussion of the function of a receiver such as the GPS receiver depicted in FIG. 2 can be found in U.S. Pat. No. 5,621,416, by Gary R. Lennen, is titled "Optimized processing of signals for enhanced cross-correlation in a satellite positioning system receiver," and includes a GPS receiver very similar to GNSS receiver 200 of FIG. 2.

In FIG. 2, received L1, L2C, and L5 signals are generated by at least one GPS satellite. Each GPS satellite generates different signal L1, L2C, and L5 signals and they are processed by different digital channel processors 252 which operate in the same way as one another. FIG. 2 shows GPS signals (L1=1575.42 MHz, L2/L2C=1227.60 MHz, L5=1176.45 MHz) entering GNSS receiver 200 through antennas 232A and 232B. Antennas 232A and 232B may be magnetically mountable models commercially available from Trimble Navigation of Sunnyvale, Calif. It is again noted that antennas 232A and 232BA are configured for receiving other GNSS signals as described above. In accordance with various embodiments, a multi-frequency antenna can be used to receive GNSS signals. Master oscillator 248 provides the reference oscillator which drives all other clocks in the system. Frequency synthesizer 238 takes the output of master oscillator 248 and generates important clock and local oscillator frequencies used throughout the system. For example, in one embodiment frequency synthesizer 238 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

Respective filters/LNA (Low Noise Amplifier) 234A and 234B performs filtering and low noise amplification of the L1, L2C, and L5 signals. The noise figure of GNSS receiver 200 is dictated by the performance of the filter/LNA combination. The respective downconvertors 236A and 236B mix the L1, L2C, and L5 signals in frequency down to approximately 175 MHz and outputs the analog L1, L2C, and L5 signals into an IF (intermediate frequency) processor 250. IF processor 250 takes the analog form L1, L2C, and L5 signals at approximately 175 MHz and converts them into digitally sampled L1, L2C, and L5 in-phase (L1 I, L2 I, and L5 I) and quadrature signals (L1 Q, L2 Q, and L5 Q) at carrier frequencies 420 KHz for L1 and at 2.6 MHz for L2/L2C signals respectively.

At least one digital channel processor 252 inputs the digitally sampled L1, L2C, and L5 in-phase and quadrature signals. All digital channel processors 252 are typically are identical by design and typically operate on identical input samples. Each digital channel processor 252 is designed to digitally track the L1, L2C, and L5 signals produced by one satellite by tracking code and carrier signals and pseudorange measurements in conjunction with the GNSS microprocessor system 254. One digital channel processor 252 is capable of tracking one satellite in the L1, L2C, and L5 channels. In accordance with various embodiments, microprocessor system 254 is implemented by a processor 331 of FIGS. 3A-3E which facilitates tracking and measurements processes, providing pseudorange and carrier phase measurements for a position fix determining logic of navigation processor 258. In one embodiment, microprocessor system 254 provides signals to control the operation of one or more digital channel processors 252. According to one embodiment, the GNSS microprocessor system 254 provides one or more of pseudorange information 272, Doppler Shift information 274, and real Carrier Phase Information 276 to the position fix determining logic of navigation processor 258. One or more of pseudorange information 272, Doppler Shift information 274, and real Carrier Phase Information 276 can also be obtained from storage 260. One or more of the signals 272, 274, 276 can be conveyed to a processor 331 that is external to the GNSS chipset 337 (FIGS. 3A-3E) in accordance with at least one embodiment. Logic of navigation processor 258 performs the higher level function of combining measurements in such a way as to produce position, velocity and time information for the differential and surveying functions, for example, in the form of a position fix 280. Storage 260 is coupled with navigation processor 258 and microprocessor system 254. It is appreciated that storage 260 may comprise a volatile or non-volatile storage such as a RAM or ROM, or some other computer readable memory device or media. In some embodiments, navigation processor 258 performs one or more of the methods of position correction described herein.

In some embodiments, microprocessor 254 and/or navigation processor 258 receive additional inputs for use in receiving corrections information. According to one embodiment, an example of the corrections information is WAAS corrections. According to one embodiment, examples of corrections information are differential GPS corrections, RTK corrections, signals used by the previously referenced Enge-Talbot method, and wide area augmentation system (WAAS) corrections among others.

Although FIG. 2 depicts a GNSS receiver 200 with navigation signals L1I, L1Q, L2I, L2Q, L5 I, and L5 Q various embodiments are well suited different combinations of navigational signals. For example, according to one embodiment, the GNSS receiver 200 may only have an L1I navigational signal. According to one embodiment, the GNSS receiver 110 may only have L1I, L1Q and L2I. It is noted that various implementations of GNSS satellites may not necessarily transmit in-phase and quadrature signals in the L1, L2C, and L5 frequencies and that the quadrature signals may not be available at all times depending upon which satellite system is being received.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments described herein are realized, in some instances, as a series of computer readable instructions (e.g., software program) that reside within non-transitory computer readable storage memory of a GNSS receiver (e.g., 260 of FIG. 2, or 332 of FIGS. 3A-3E) and are executed by a hardware processor. When executed, the instructions cause a computer system to implement the functionality of various embodiments described herein. For example, the instructions can be executed by a central processing unit associated with communication device 330A or communication device 330B. According to one embodiment, the non-transitory computer readable storage medium is tangible.

Figure 12:
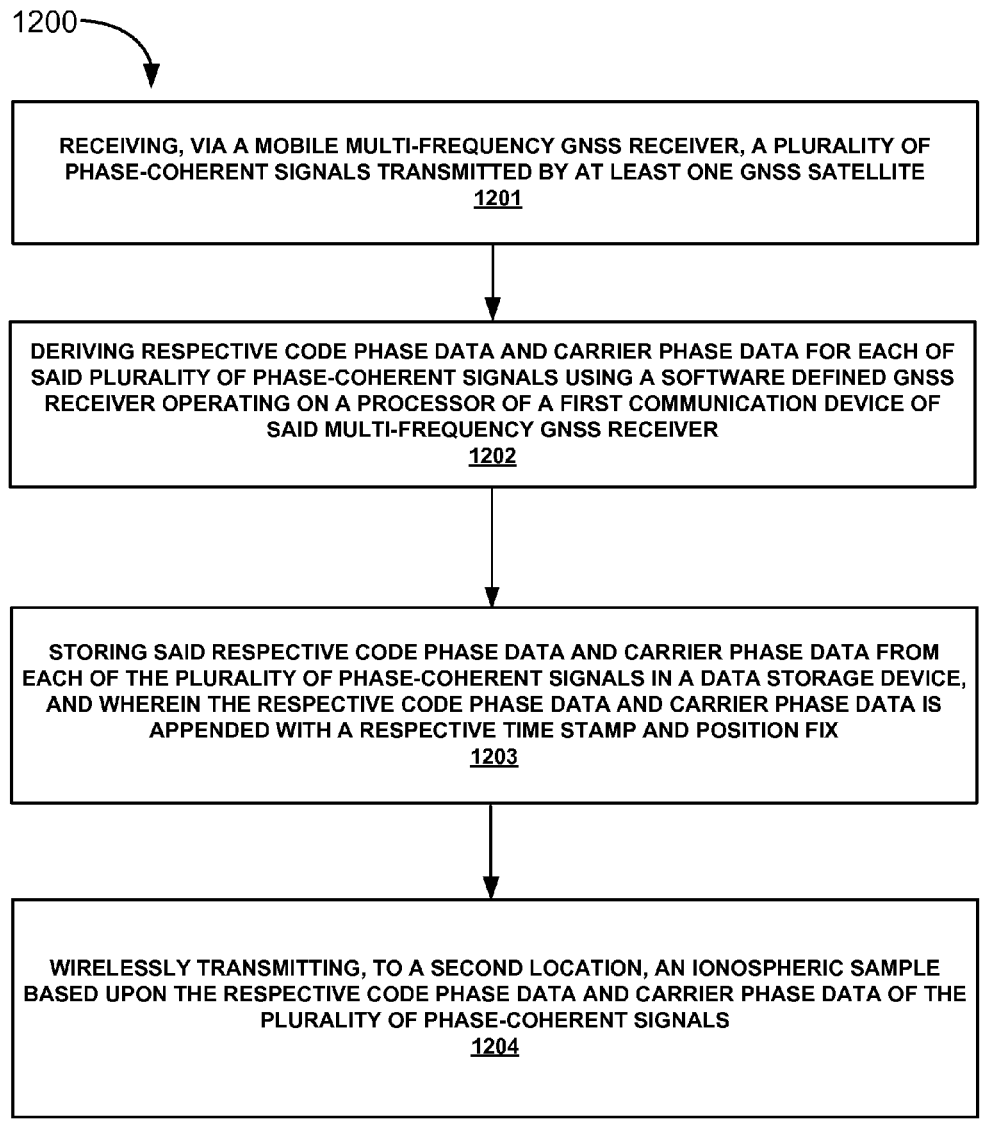
FIG. 12 is a flowchart of a method for capturing ionospheric data in accordance with various embodiments.

Unless otherwise specified, one or more of the various embodiments described herein can be implemented as hardware, such as circuitry, firmware, or computer readable instructions that are stored on non-transitory computer readable storage medium. The computer readable instructions of the various embodiments described herein can be executed by a hardware processor, such as central processing unit, to cause GNSS receiver system(s) 200 and/or 300 to implement the functionality of various embodiments. For example, according to one embodiment, the soft GNSS receiver 333 and the operations of the flowchart 1200 depicted in FIG. 12 are implemented with computer readable instructions that are stored on computer readable storage medium, which can be tangible or non-transitory or a combination thereof, and can be executed by a hardware processor 254 of GNSS receiver 200 331 of a communication device 300A or 300B. According to one embodiment, the non-transitory computer readable storage medium is tangible.

GNSS Receiver System with Radio Frequency (RF) Hardware Component

Figure 3A:
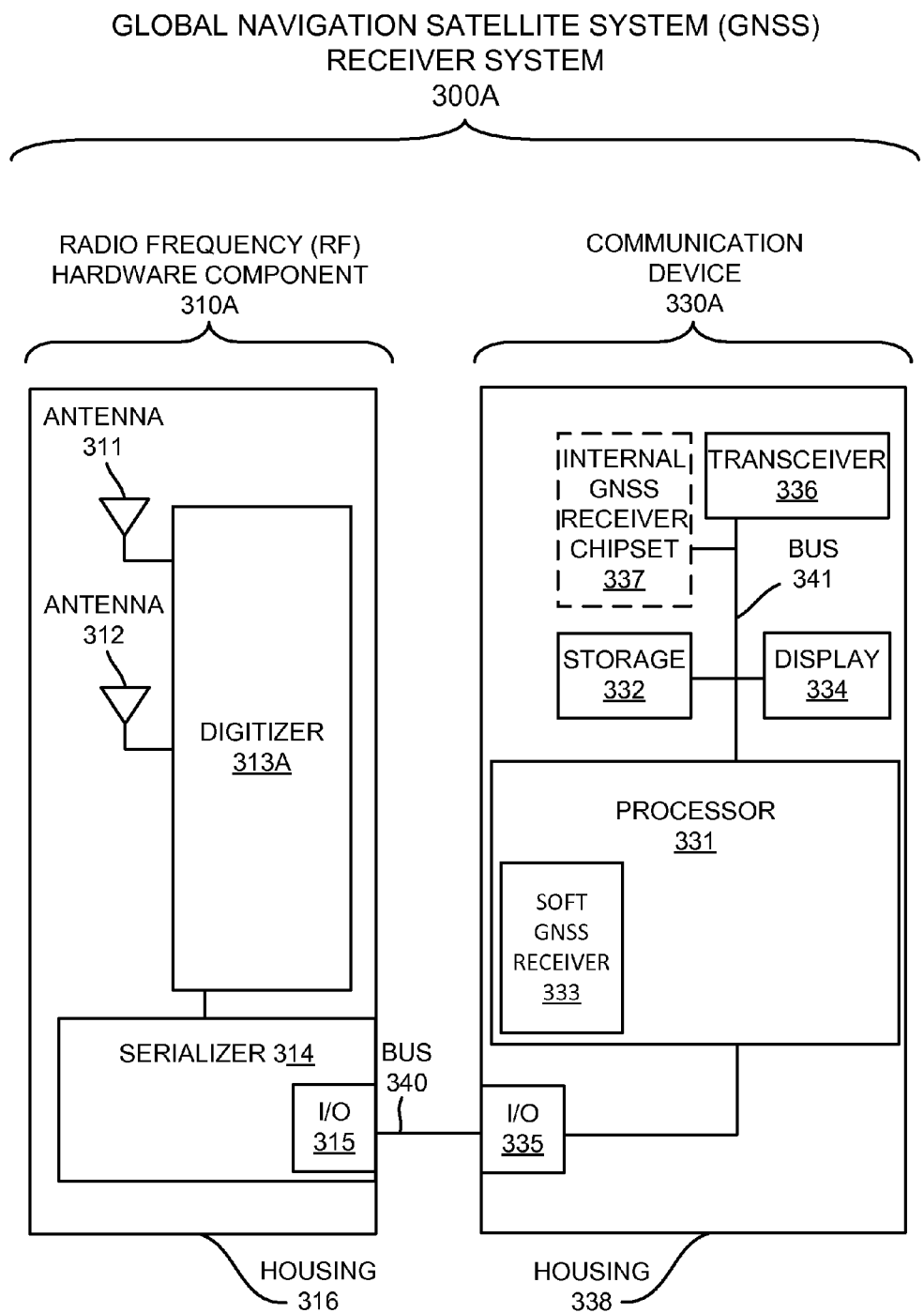
FIG. 3A is a block diagram of a GNSS receiver system, according to various embodiments.

FIG. 3A is a block diagram of a GNSS receiver system 300A, according to various embodiments. GNSS receiver system 300A comprises an RF hardware component 310A and a communication device 330A, which are communicatively coupled to one another. Bus 340 is illustrated as the communicative coupling between RF hardware component 310A and a communication device 330A; however, other wireline and short-range wireless communicative couplings may be utilized.

In some stand-alone embodiments, a stand-alone radio frequency hardware component 310A is disposed inside of a housing 316, as depicted. In some embodiments, RF hardware component 310A includes: a first antenna 311, a second antenna 312, a digitizer 313, a serializer 314, and an input/output (I/O) 315. In some embodiments, where RF hardware component 310A and communication device 330A are more highly integrated allowing serializer 314, I/O 315, bus 340, and I/O 335 to be omitted from the communication path between RF hardware component 310A and communication device 330A. Thus, in various embodiments RF hardware component 310A and communication device 330A may be stand-alone physical entities that are removably communicatively coupled by wireline or else wirelessly communicatively coupled, one or both may not have a housing, or may they may be integrated with one another.

Housing 316 may take any form, but in some embodiments is designed to act as a sleeve which includes a receiving cavity into which a portion of particular communication device 330A snugly fits. In this manner, housing 316 is paired in a convenient form factor with a communication device 330A to which it provides GNSS signals, and also serves a dual-purpose of providing an external protective covering for some portions of the communication device 330A. In other embodiments, housing 316 may take on the form factor of headwear (e.g., disposed in or as part of a helmet, cap, hardhat, or other head wear in the manner previously depicted herein). In yet other embodiments, housing 316 may take on other form factors.

First antenna 311 is a narrow band antenna, and may take any suitable form such including that of a patch antenna or a helical antenna. For example, in accordance with at least one embodiment first antenna 311 comprises a circularly polarized (CP) GNSS antenna typically realized in a flat "patch" configuration, but may also be realized in a quadrifiler helix configuration. There are a variety of antenna designs which can be implemented as first antenna 311 in accordance with various embodiments such as, but not limited to, patch antennas, quadrifiler helix antennas, and planar quadrifiler antennas. First antenna 311 is configured, in one embodiment, for receiving, over-the-air, analog form L2C Global Positioning System (GPS) signals in the 1217-1237 MHz frequency range.

Second antenna 312 is a narrow band antenna, and may take any suitable form including that of a patch antenna or a helical antenna. Again, in accordance with at least one embodiment second antenna 312 comprises a circularly polarized (CP) GNSS antenna typically realized in a flat "patch" configuration, but may also be realized in a quadrifiler helix configuration. There are a variety of antenna designs which can be implemented as second antenna 312 in accordance with various embodiments such as, but not limited to, patch antennas, quadrifiler helix antennas, and planar quadrifiler antennas. Second antenna 312 is configured for receiving, over-the-air, analog form L1 GNSS signals in the 1525-1614 MHz frequency range. In various embodiments, the L1 signals may be analog form L1 GPS signals, or analog form L1 GPS signals and one or more of analog form L1 Galileo signals and analog form pseudolite transmitted GNSS signals in the L1 band. Any received pseudolite signals will be in code division multiple access (CDMA) format like the GPS and Galileo L1 signals (and like the modernized BeiDou and Glonass L1 signals which will be centered 1575.42 MHz). In some embodiments, the first antenna 311 is configured to be able to receive either or both of these modernized BeiDou and Glonass signals when they are available. In some embodiments, first antenna 311 and second antenna 312 may share a common phase center with one another. In other embodiments, first antenna 311 and second antenna 312 may be separated by a known distance between their respective phase centers which is compensated for during position determination.

Digitizer 313A operates to amplify and down-convert the L2C and L1 signals received respectively from antennas 311 and 312, and then perform an analog to digital conversion by digitally sampling the down-converted L1 and L2C signals. The outputs of digitizer 313A are a digitized version of the down-converted L1 signals and a digitized version of the down-converted L2C signals that have been received.

Serializer 314 operates to form the digitized L1 signals and the digitized L2C signals into a serialized output signal which is then output from a stand-alone embodiment of RF hardware component 310A. For example, as illustrated, the serialized output signal can be output via input/output 315 which may be a USB port or some other type of port.

Bus 340 (e.g., a USB cable) coupled to I/O 315 communicatively couples the serialized output signal to an I/O 335 of communication device 330A. Bus 340 illustrates a serial bus, which may comply with a Universal Serial Bus (e.g., USB 2.0 standard) or other communication protocol. In some embodiments, bus 340 is a separate component that is not a part of either RF hardware component 310A or communication device 330A. It is appreciated that other wireline or wireless means for exchanging data over a short distance (less that approximately 7 meters), besides bus 340, may be employed in various embodiments. In some embodiments, bus 340 provides power from communication device 330A to components of an RF hardware component 310; while in other embodiments the RF hardware component 310 uses other internal or external sources of power.

Communication device 330A is disposed inside a housing 338 and, in some embodiments, includes: one or more processors 331, a software defined GNSS ("soft GNSS") receiver 333 as an application running on at least one processor 331, storage 332 (e.g., one or more of random access memory, read only memory, optical storage, and magnetic storage), a display 334, an I/O 335, and a transceiver 336 (e.g., a cellular communication transceiver, Wi-Fi communication transceiver, digital two-way radio transceiver, an L-band satellite receiver, or other RF transceiver). In some embodiments communication device 330A further includes an internal GNSS receiver chipset 337. Storage 332 may hold computer-executable instructions that can be executed by processor 331 to implement the soft GNSS receiver application. In some embodiment where RF hardware component 310A and communication device 330A are integrated they may share a single housing and input/output 315 may be omitted from the communications path between RF hardware component 310A and communication device 330A (and may also be omitted from communication device 330A in some embodiments). In some embodiments, one or more of storage 332, display 334, transceiver 336, and internal GNSS receiver chipset 337 (when included) are communicatively coupled with processor(s) 331, such as via bus 341.

Processor 331 is external to any GNSS chipset of communication device 330A. In some embodiments, processor 331 is a central or host processor of communication device 330A. In other embodiments, processor 331 is a graphics processing unit (GPU), a digital signal processor (DSP), or other microprocessor of a communication device 330A.

Communication device 330A is a device that is capable of two-way RF communication and may be a device such as, but not limited to, a cellular telephone, a tablet computer, a two-way non-cellular radio, a dedicated short range communication (DSRC) radio, a vehicle navigation system, or a software defined radio. In one embodiment, the DSRC radio complies with Institute of Electrical and Electronics Engineers (IEEE) 802.11p standards. In one embodiment, the DSRC radio may be implemented as a software defined radio compliant with IEEE 802.11p standard and running on one or more processors.

Housing 338 may take many sizes shapes and forms, many of which are hand-holdable by a human or wearable by a human. Some forms include the form factor of a cellular telephone, the form factor of a tablet computer, the form factor of a phablet computer (an in-between size between that of a smart phone and a tablet computer), the form factor of headwear (e.g., disposed in or as part of a helmet, cap, hardhat, or other head wear), and the form of eyewear (e.g., Google Glass or similar head-up eyewear communication devices).

Software defined GNSS receiver 333 utilizes L1 and/or L2C signals received via I/O 335 to perform position determination. For example, software defined GNSS receiver 333 decodes first information (e.g., L2C signals) from the first digitized GNSS signal that is included in the serialized output signal from RF hardware component 310A. Software defined GNSS receiver 333 also decodes second information (e.g., L1 I and L1 Q signals) from the second digitized GNSS signal that has been serialized into the serialized output signal from RF hardware component 310A. A combination of the first information and the second information (e.g., L2C GPS signals and L1 GPS signals) is used to perform carrier phase interferometry to correct the carrier phase of the L1 signals for perturbations caused by ionospheric interference. The corrected L1 GPS signals are then used by software defined GNSS receiver 333 to perform position determination. They can be used alone or in combination with other L1 signals that have been decoded from the second digitized GNSS signal that has been serialized into the serialized output signal from RF hardware component 310A. These other L1 signals include one or more of L1 Galileo signals, L1 BeiDou signals, L1 Glonass signals, and L1 pseudolite signals. In some embodiments, the software defined GNSS receiver 333 also receives over its own communication means (e.g., transceiver 336) one or more of WAAS, DGPS, PPP, RTX, RTK, SBAS, and VRS corrections that can be applied while performing the position determination.

Figure 3B:
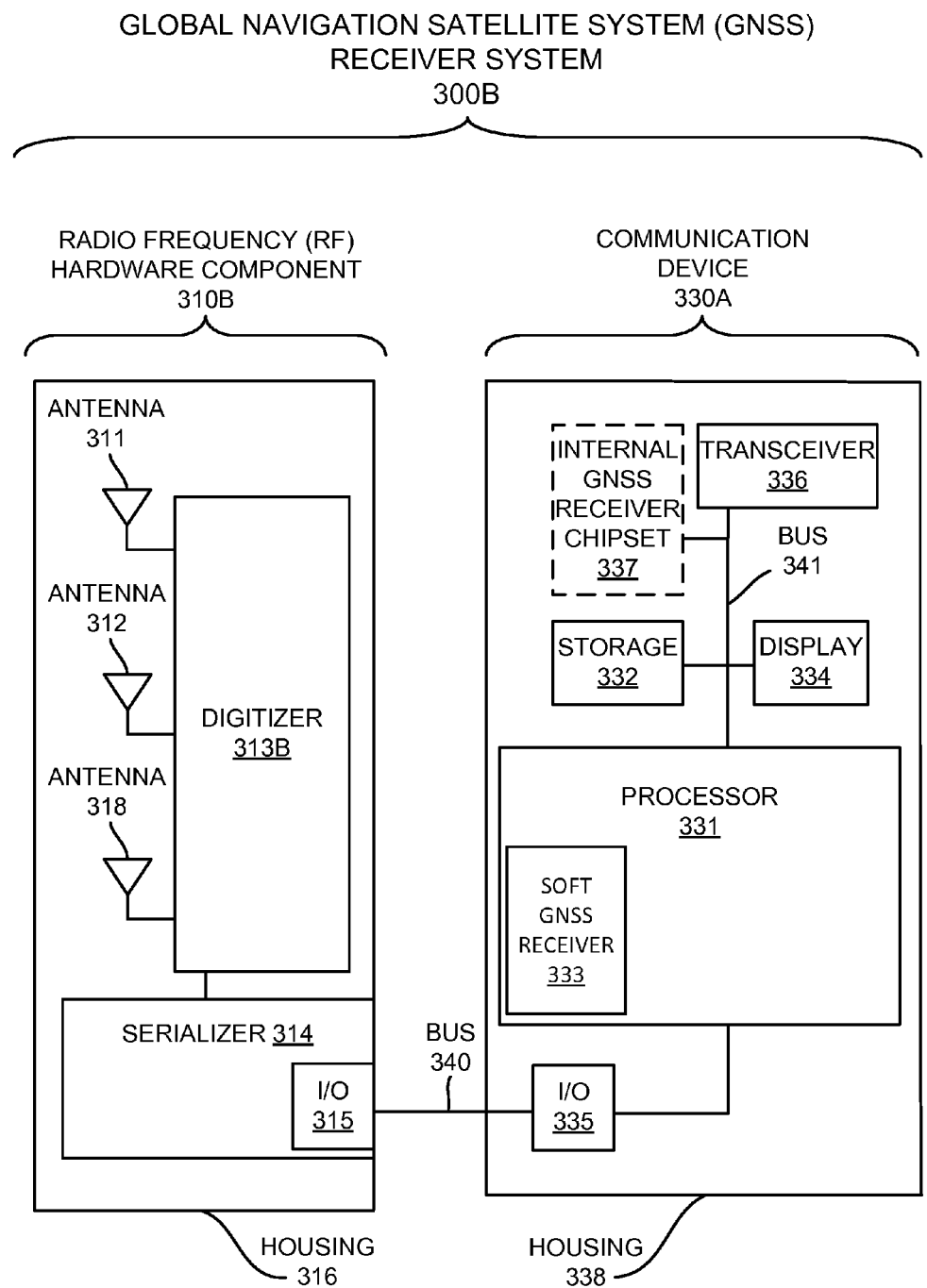
FIG. 3B is a block diagram of a GNSS receiver system, according to various embodiments.

FIG. 3B is a block diagram of a GNSS receiver system 300B, according to various embodiments. GNSS receiver system 300B operates in the same fashion as GNSS receiver system 300A, except for the inclusion of a third antenna, antenna 318, as a portion of RF hardware component 310B (as compared to RF hardware component 310A which includes only two antennas). Third antenna 318 is a narrow band antenna, and may be implemented in any suitable form including as a patch antenna or as a helical antenna. For example, in accordance with at least one embodiment third antenna 318 comprises a circularly polarized (CP) GNSS antenna typically realized in a flat "patch" configuration, but may also be realized in a quadrifiler helix configuration. There are a variety of antenna designs which can be implemented as third antenna 318 in accordance with various embodiments such as, but not limited to, patch antennas, quadrifiler helix antennas, and planar quadrifiler antennas. In one embodiment, third antenna 318 is configured for receiving, over-the-air, L1 GNSS signals which are centered in the 1217-1237 MHz frequency range. In various embodiments, third antenna 318 receives BeiDou L1 signals that are centered at 1561.098 MHz, Glonass L1 signals that are in Frequency Division Multiple Access (FDMA) format and centered at 1602 MHz, and/or L1 signals transmitted by terrestrial pseudolite(s) in the FDMA format. In one embodiment, third antenna 318 is configured for receiving, over-the-air, L5 GNSS signals which are centered in the 1164-1189 MHz frequency range. In various embodiments, the L5 signals may be GPS L5 signals, Galileo L5 signals, BeiDou L5 signals, Glonass L5 signals, or L5 signals transmitted by terrestrial pseudolite(s) in the Frequency Division Multiple Access format. It is appreciated that, in some embodiments, third antenna 318 may be configured to receive, over-the-air, satellite based augmentation system (SBAS) signals that are transmitted from satellites on one or more bands. In one embodiment, third antenna 318 is configured for receiving, over-the-air, Mobile Satellite Services band signals (e.g., from OmniSTAR satellites), which are centered in the 1525-1559 MHz range and provide GNSS corrections. In one embodiment, third antenna 318 is configured for receiving, over-the-air, S-band signals (e.g., IRNSS (Indian Regional Navigation Satellite System) signals or other satellite system signals), which are centered in the 2000-4000 MHz range and provide GNSS corrections. In one embodiment, third antenna 318 shares a common phase center with both of antennas 311 and 312. In one embodiment, one or more of antennas 311, 312, and 318 has a distinct phase center that is not co-located with the phase center of either of the other two antennas. In GNSS receiver system 300B, as with GNSS receiver system 300A, RF hardware component 310B and communication device 330A may be stand-alone physical entities that are removably communicatively coupled by wireline or else wirelessly communicatively coupled, or may they may be integrated with one another. In an integrated embodiment, serializer 314, I/O 315, bus 340, and I/O 335 may be omitted from the communication path between RF hardware component 310B and communication device 330A (and may be omitted entirely in some embodiments).

Digitizer 313B operates similarly to digitizer 313A to amplify and down-convert the L2C and L1 signals received respectively from antennas 311 and 312, and then perform an analog to digital conversion by digitally sampling the down-converted L1 and L2C signals. Digitizer 313B additionally operates to amplify and down-convert the GNSS signals received from antenna 318, and then perform an analog to digital conversion by digitally sampling the down-converted GNSS signals. The outputs of digitizer 313B are digitized versions of the down-converted L1 signals, a digitized version of the down-converted L2C signals, and a digitized version of the down-converted signals from antenna 318.

Serializer 314, when included, operates to form the digitized versions of the signals received via antennas 311, 312, and 318 into a serialized output signal which is then output from RF hardware component 310B. For example, as illustrated, the serialized output signal can be output via input/output 315 which may be a USB port or some other type of port. A bus 340 (e.g., a USB cable) coupled to I/O 315 communicatively couples the serialized output signal to an I/O 335 of communication device 330A.

Software defined GNSS receiver 333 utilizes L1 and/or L2C signals received via I/O 335 to perform position determination in the manner previously described above except that software defined GNSS receiver 333 may additionally utilize L1 or L5 signals received via antenna 318 to assist in performing position determination. As previously described, in some embodiments, the software defined GNSS receiver 333 also receives, over its own communication means, (e.g., transceiver 336) one or more of WAAS, DGPS, PPP, RTX, RTK, SBAS, and VRS corrections that can be applied while performing the position determination.

Figure 3C:
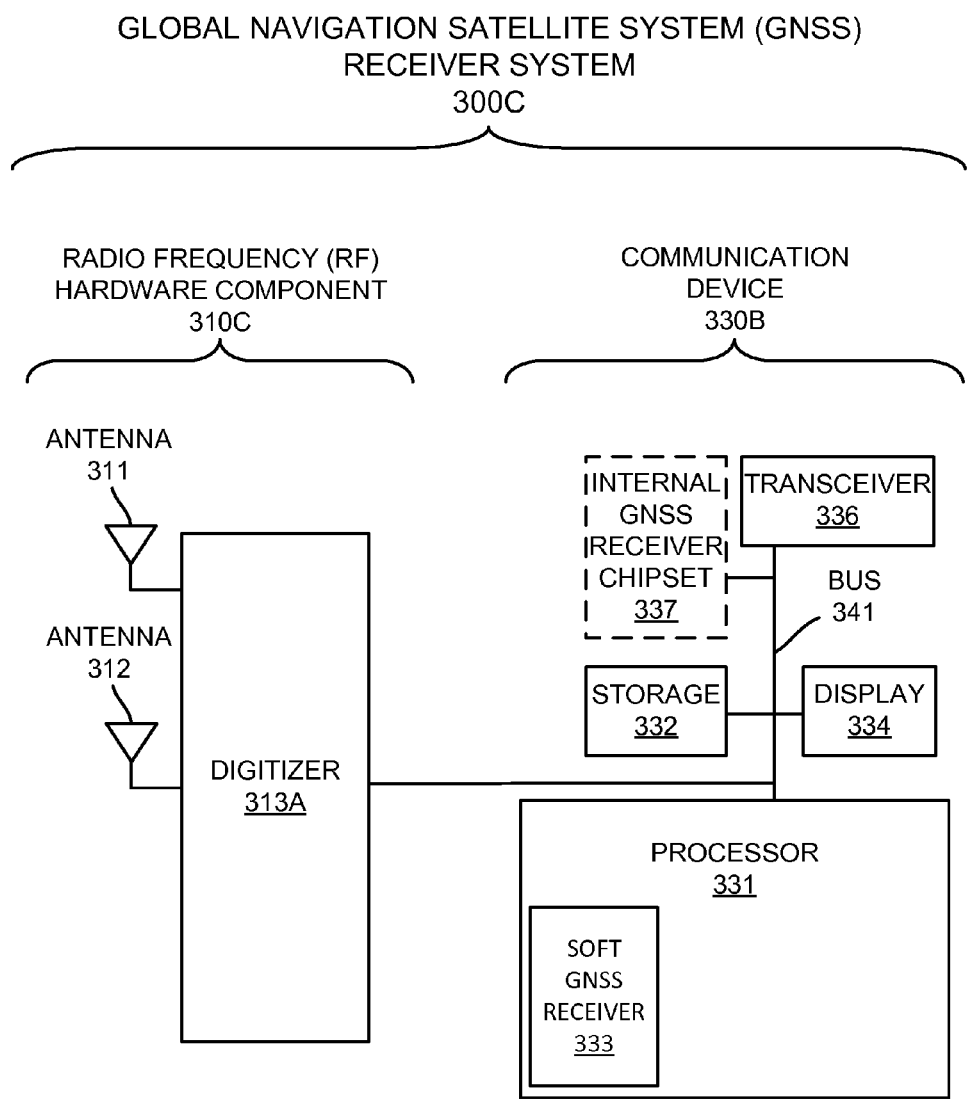
FIG. 3C is a block diagram of a GNSS receiver system, according to various embodiments.

FIG. 3C is a block diagram of a GNSS receiver system 300C, according to various embodiments. In accordance with various embodiments, GNSS receiver system 300C comprises a mobile device(s) and is implemented as described above. GNSS receiver system 300C is similar to GNSS receiver system 300A except that through a higher level of integration, digitized GNSS signals from antennas 311 and 312 are provided via bus 341 to processor 331 and soft GNSS receiver 333. RF hardware component 310C is similar to RF hardware component 310A, except that serializer 314, I/O 315, and housing 316 are omitted. Communication device 330B is similar to communication device 330A except that I/O 335 and housing 338 have been omitted. In some embodiments communication device 330 may be a vehicle subsystem such as a navigation subsystem, a safety subsystem, an infotainment subsystem or the like. In some embodiments, the communication device 330B includes a processor 331 which is operating a software defined DSRC radio (in compliance with IEEE 802.11p standards) and the same processor is also used to implement software defined GNSS receiver 333. Processor 331 is external to any GNSS chipset of communication device 330B. In some embodiments, processor 331 is a central or host processor of communication device 330B. In other embodiments, processor 331 is a graphics processing unit (GPU), a digital signal processor, or other microprocessor of a communication device 330B. In some embodiments, bus 341 provides power from communication device 330 to components of an RF hardware component 310; while in other embodiments the RF hardware component 310 uses other internal or external sources of power.

Figure 3D:
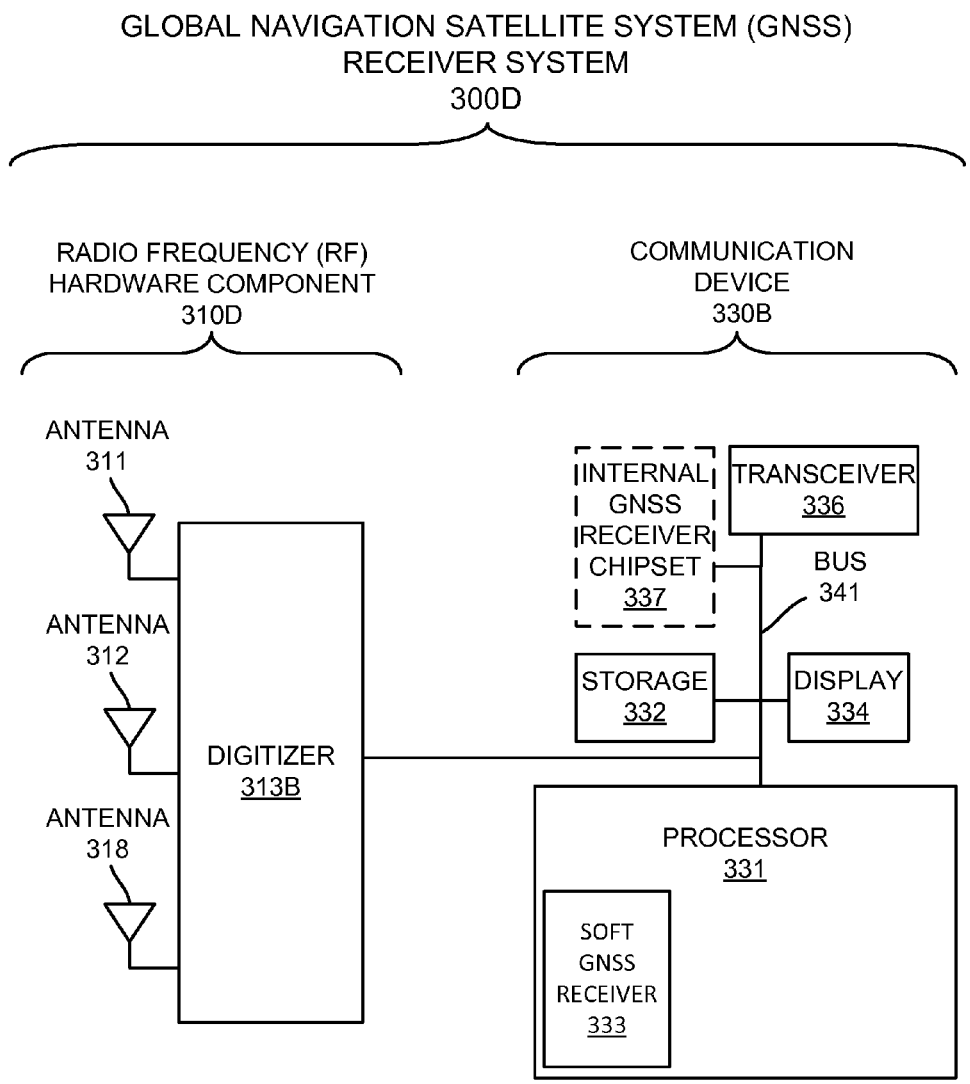
FIG. 3D is a block diagram of a GNSS receiver system, according to various embodiments.

FIG. 3D is a block diagram of a GNSS receiver system 300D, according to various embodiments. In accordance with various embodiments, GNSS receiver system 300D comprises a mobile device(s) and is implemented as described above. GNSS receiver system 300D is similar to GNSS receiver system 300B except that through a higher level of integration, digitized GNSS signals from antennas 311 and 312 are provided via bus 341 to processor 331 and soft GNSS receiver 333. RF hardware component 310D is similar to RF hardware component 310B, except that serializer 314, I/O 315, and housing 316 are omitted. Communication device 330B is similar to communication device 330A except that I/O 335 and housing 338 have been omitted. In some embodiments communication device 330 may be a vehicle subsystem such as a navigation subsystem, a safety subsystem, an infotainment subsystem or the like. In some embodiments, the communication device 330B includes a processor 331 which is operating a software defined DSRC radio (in compliance with IEEE 802.11p standards) and the same processor is also used to implement software defined GNSS receiver 333. Processor 331 is external to any GNSS chipset of communication device 330B. In some embodiments, processor 331 is a central or host processor of communication device 330B. In other embodiments, processor 331 is a graphics processing unit (GPU), a digital signal processor, or other microprocessor of a communication device 330B.

Figure 3E:
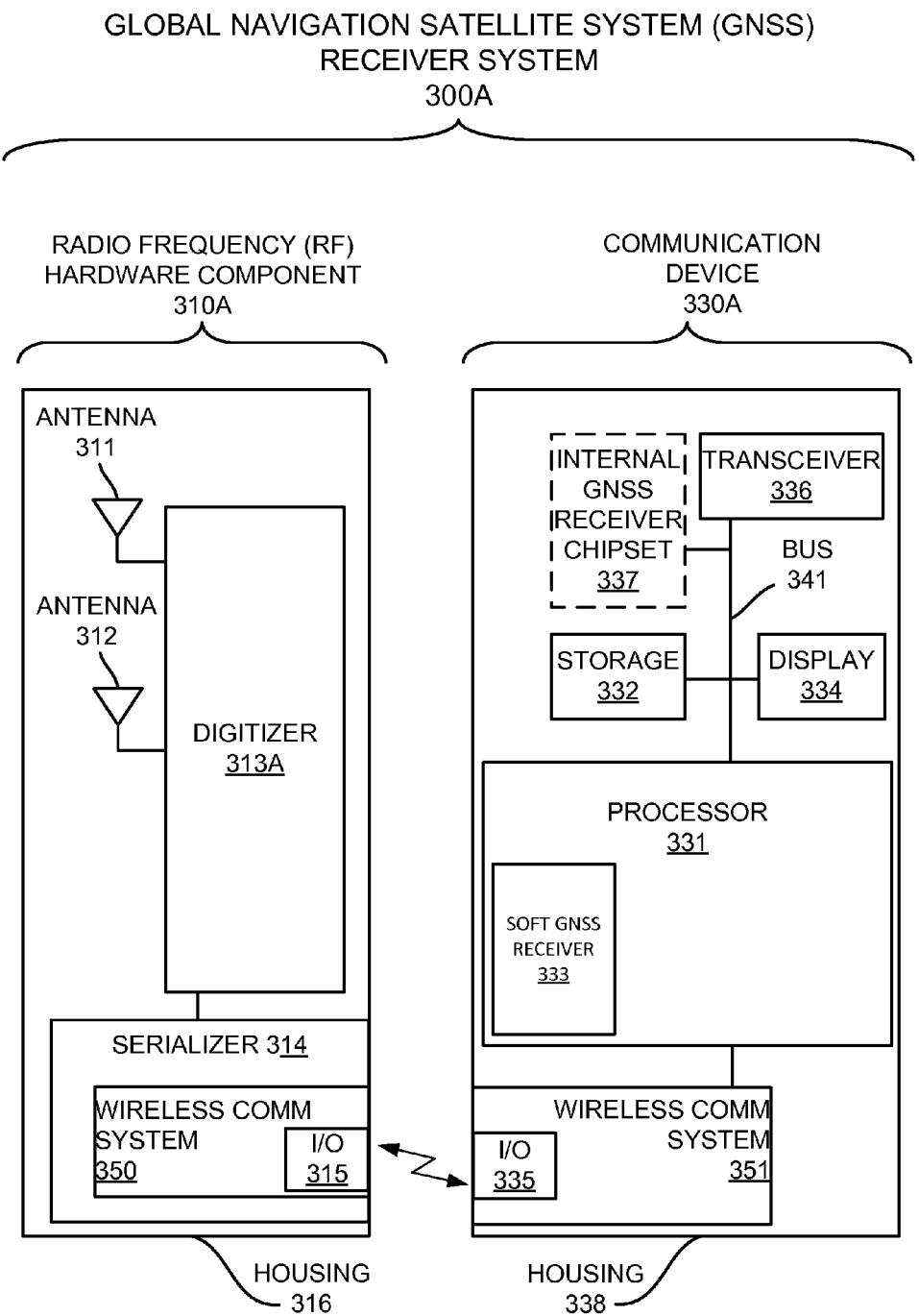
FIG. 3E is a block diagram of a GNSS receiver system, according to various embodiments.

FIG. 3E depicts an embodiment of GNSS receiver system 300E. GNSS receiver system 300E is similar to GNSS receiver system 300A, as described in detail herein. For instance, GNSS receiver system 300E includes RF hardware component 310A which bi-directionally communicates with communication device 330A.

However, RF hardware component 310A includes wireless communication system 350 which wirelessly communicates with wireless communication system 351 of communication device 330A.

In particular, wireless communication system 350 is utilized as a wireless transmitter for wirelessly transmitting digitized GNSS signals, as a serialized output signal, from RF hardware component 310A to communication device 330A.

Moreover, wireless communication system 350 is utilized as a wireless receiver for wirelessly receiving transmitted digitized GNSS signals, as a serialized output signal, from RF hardware component 310A to communication device 330A.

As depicted, serializer 314 includes wireless communication system 350. However, wireless communication system 350 may be separate from serializer 314. Wireless communication system 350 and wireless communication system 351, in one embodiment, are wireless transceivers (e.g., wirelessly transmit data and wirelessly receive data) that operate under the same wireless communication protocol. For example, serialized output data is wirelessly transmitted via I/O 315 of wireless communication system 350, in accordance to a wireless protocol, and is received at I/O 335 of communication device 330A. It is noted that the embodiments shown in FIGS. 3B, 3C, and 3D can similarly be configured to communicate using wireless communication devices 350 and 351 rather than bus 340 in accordance with various embodiments.

Figure 4A:
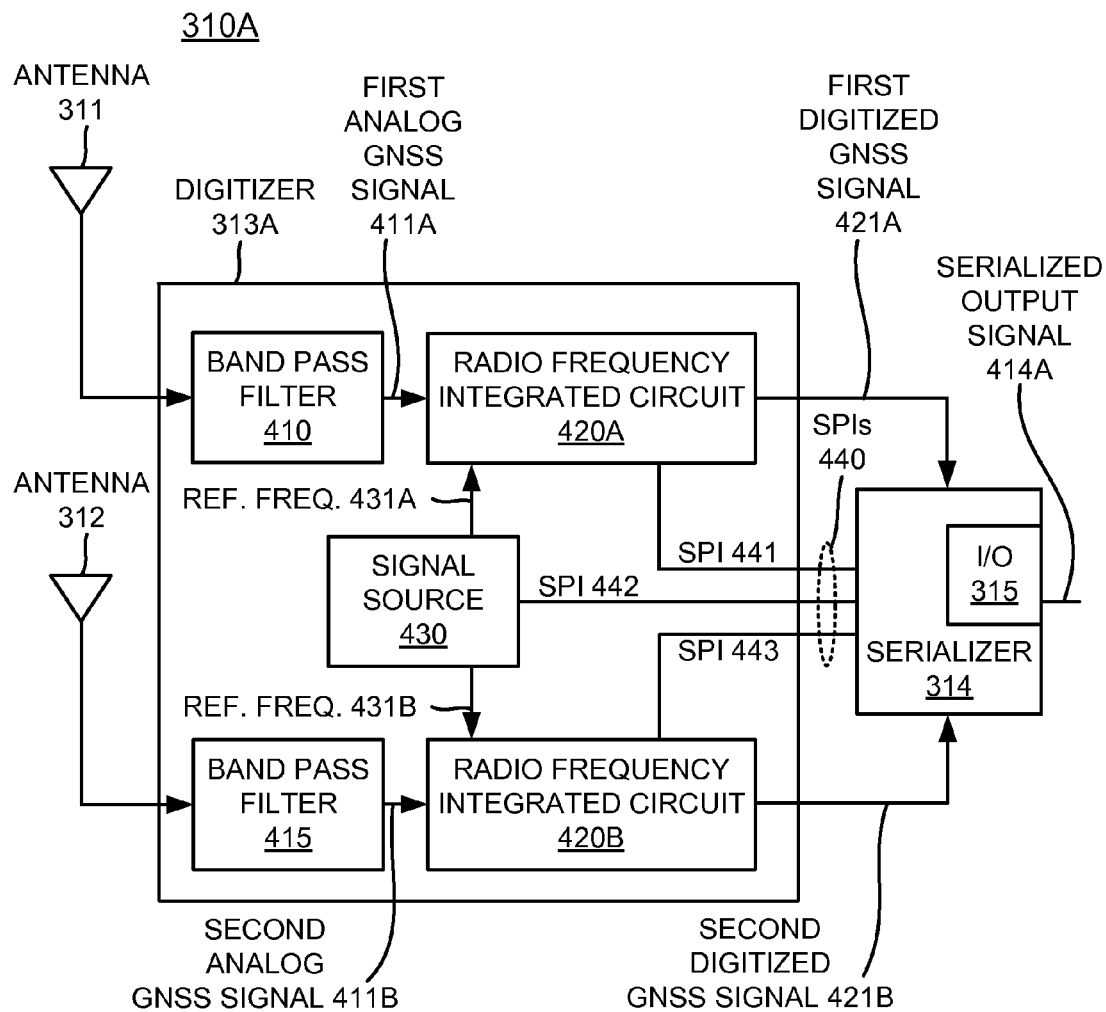
FIG. 4A is a block diagram of a radio frequency hardware component, according to various embodiments.

FIG. 4A is a block diagram of a radio frequency hardware component 310A, according to various embodiments. RF hardware component 310A is shown here with greater detail of digitizer 313A to illustrate signal flow through digitizer 313A according to one embodiment. In one embodiment, digitizer 313 A includes a first band pass filter 410, a second band pass filter 415, a first radio frequency integrated circuit (RFIC) 420A, a second RFIC 420B, and an internal signal source 430.

In operation, in one embodiment, antenna 311 receives L2C GNSS signals over-the-air. Band pass filter 410 operates to pass the band of the L2C signals. In some embodiments, band pass filter 410 is configurable to a particular frequency band and width of frequency passed. In many embodiments, band pass filter 410 is configured to have a frequency width that is similar to or the same as the same sampling rate used for analog-to-digital conversion by RFIC 420A. For example, since the chipping rate of an L2C signal is 1.023 MHz, it may be sampled for analog-to-digital conversion at approximately 2 MHz or twice the chipping rate. In one embodiment, band pass filter 410 may thus be configured to pass a 2 MHz band, with 1 MHz being on each side of the L2C center frequency of 1,227.60 MHz. Band pass filter 410 outputs a first analog GNSS signal 411A (e.g., a filtered L2C signal that has been received over-the-air) to RFIC 420A. RFIC 420A utilizes a reference frequency 431A supplied by signal source 430 (e.g., a fixed frequency or configurable temperature controlled crystal oscillator) to down-convert first analog GNSS signal 411A. The down-converted version of first analog GNSS signal 411A is then sampled, digitized, and output to serializer 314 as a first digitized GNSS signal 421A.

In operation, in one embodiment, antenna 312 receives L1 GNSS signals over-the-air. Band pass filter 415 operates to pass the band of the L1 signals. In some embodiments, band pass filter 415 is configurable to a particular frequency band and width of frequency passed. In many embodiments, band pass filter 415 is configured to have a frequency width that is similar to or the same as the same sampling rate used for analog-to-digital conversion by RFIC 420B. For example, since the chipping rate of an L1 GPS signal is 1.023 MHz, it may be sampled for analog-to-digital conversion at approximately 2 MHz or twice the chipping rate. In one embodiment, band pass filter 415 may thus be configured to pass a 2 MHz band, with 1 MHz being on each side of the L1 GPS center frequency of 1,575.42 MHz. Band pass filter 415 outputs a second analog GNSS signal 411B (e.g., a filtered L1 GPS signal that has been received over-the-air) to RFIC 420B. RFIC 420B utilizes a reference frequency 431B supplied by signal source 430 to down-convert second analog GNSS signal 411B. The down-converted version of second analog GNSS signal 411B is then sampled, digitized, and output to serializer 314 as a second digitized GNSS signal 421B. Serializer 314 operates to serialize the second digitized GNSS signal 421B (i.e., digitized L1 GPS signals) and the first digitized GNSS signal 421A (i.e., digitized L2C signals) into a serialized output signal 414 which is then output from RF hardware component 310A.

I/O 315 and serializer 314 also operate as a serial periphery interface (SPI), in some embodiments, to receive configuration commands from processor 331 of communication device 330A. SPIs 440 includes SPI 441 which provides configuration to RFIC 420A, SPI 442 which provides configuration instruction to signal source 430, and SPI 443 which provides configuration to RFIC 420B. In integrated embodiments where I/O 315 and serializer 314 are not utilized SPIs 440 may be replaced by other communication paths with processor 331.

Figure 4B:
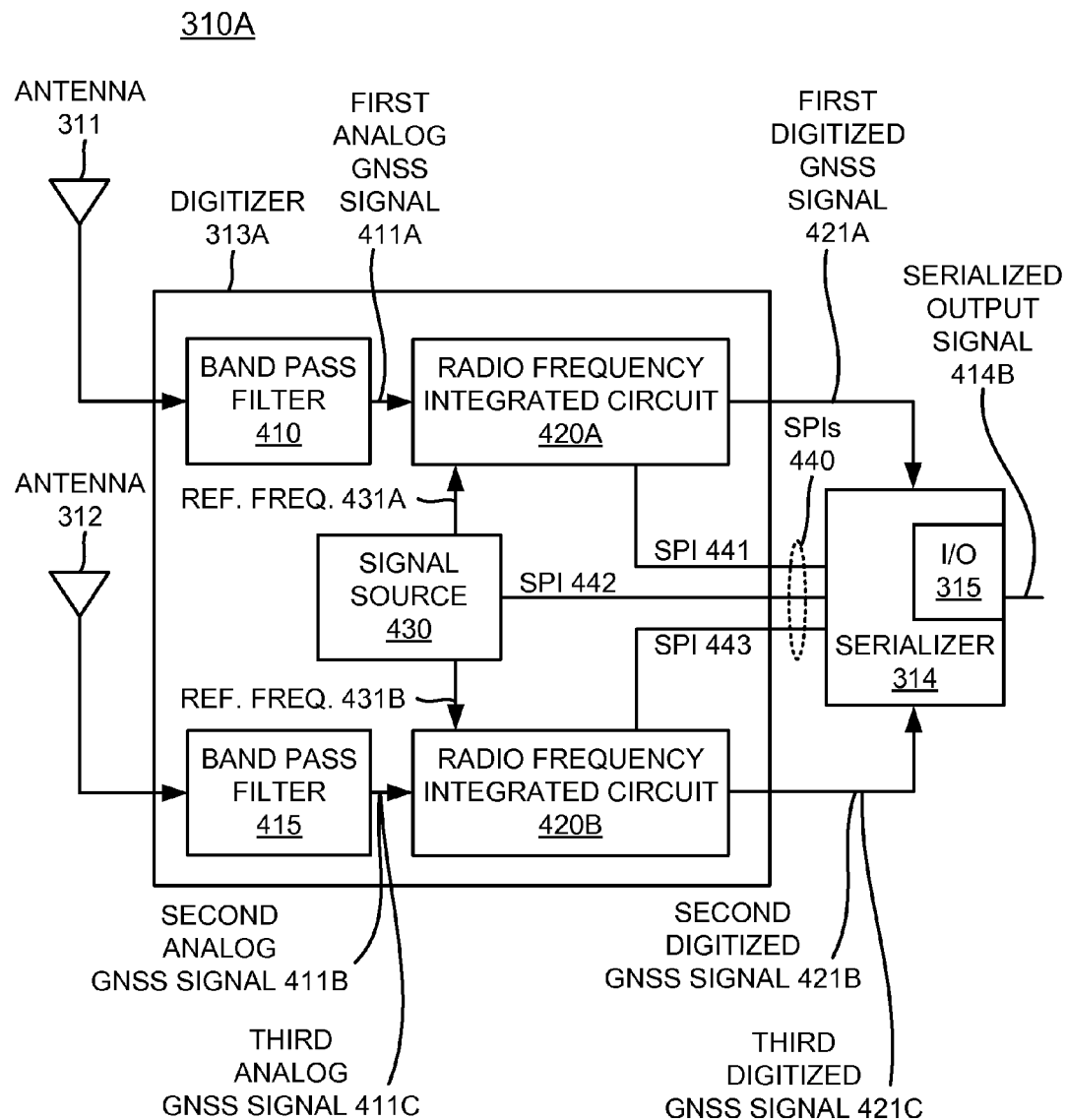
FIG. 4B is a block diagram of a radio frequency hardware component, according to various embodiments.

FIG. 4B is a block diagram of a radio frequency hardware component 310A, according to various embodiments. In operation, RF hardware component 310A of FIGS. 4A and 4B are identical similar except that antenna 312 receives additional L1 GNSS signals over-the-air, which are then filtered, digitized, and serialized. For example, band pass filter 415 operates to pass the band of the L1 signals. In some embodiments, band pass filter 415 is configurable to a particular frequency band and width of frequency passed. In many embodiments, band pass filter 415 is configured to have a frequency width that is similar to or the same as the same sampling rate used for analog-to-digital conversion by RFIC 420B. In radio frequency hardware component 310A, L1 GPS signals are sampled along with a second L1 GNSS signal (e.g., at least one of a Galileo L1 signal, a BeiDou L1 signal, a Glonass L1 signal, or a pseudolite L1 signal). As the chipping rate for the second GNSS signal is also 1.023 MHz, the sampling rate can be doubled to approximately 4 MHz when L1 signals from two disparate GNSS systems are sampled. In one embodiment, band pass filter 415 may thus be configured to pass a 4 MHz band (which may be adjusted upward to include Glonass signals in some embodiments). Band pass filter 415 outputs a second analog GNSS signal 411B (e.g., a filtered GPS L1 signal that has been received over-the-air) and a third analog GNSS signal 411C (e.g., a filtered Galileo L1 signal, and both are provided to RFIC 420B. RFIC 420B utilizes a reference frequency 431B supplied by signal source 430 to down-convert second analog GNSS signal 411B and third analog GNSS signal 411C. The down-converted versions of second analog GNSS signal 411B and third analog GNSS signal 411C are then sampled, digitized, and output as a second digitized GNSS signal 421B and third digitized GNSS signal 421C, respectively, to serializer 314.

Figure 4C:
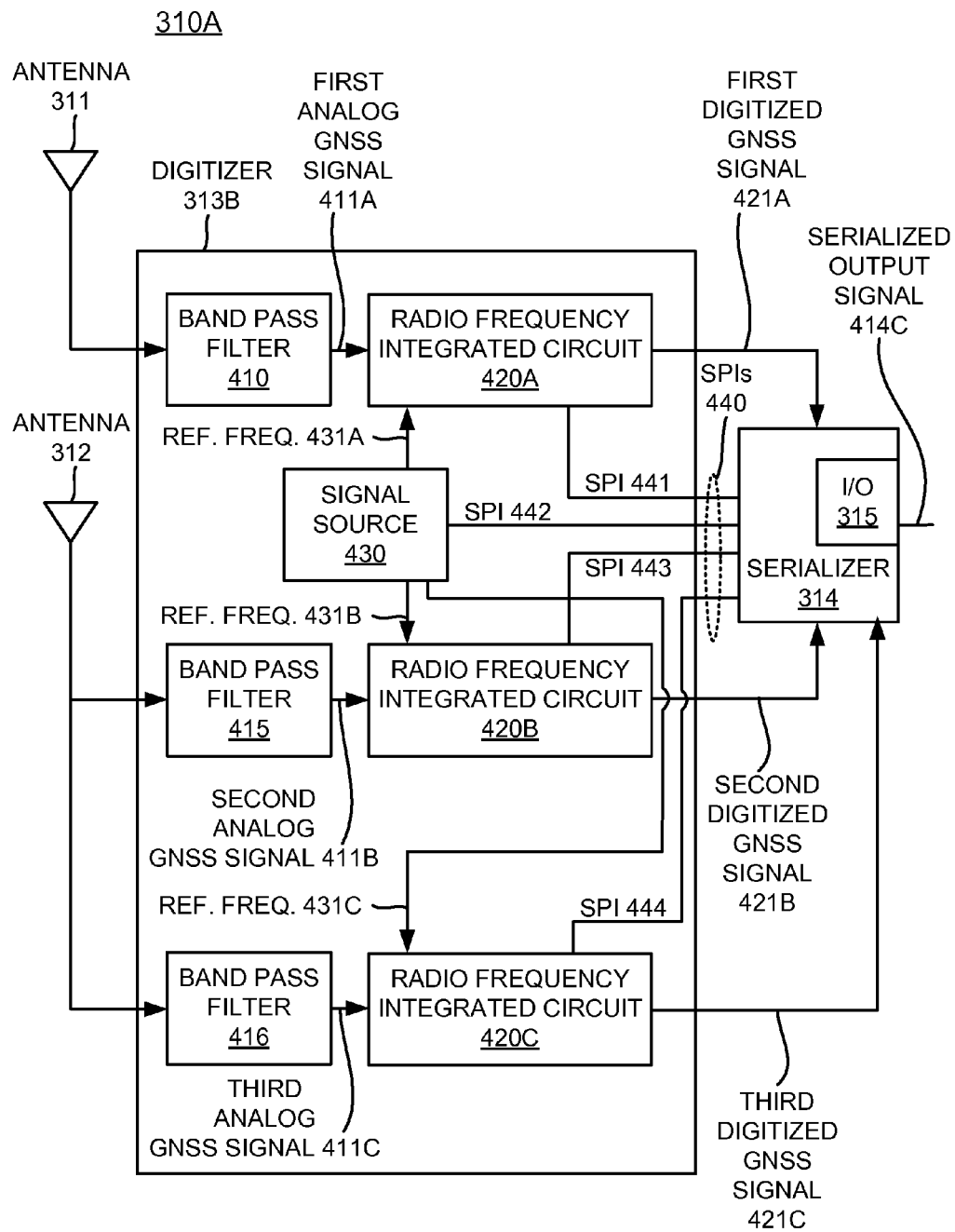
FIG. 4C is a block diagram of a radio frequency hardware component, according to various embodiments.

FIG. 4C is a block diagram of a radio frequency hardware component 310A, according to various embodiments. In operation, RF hardware component 310A of FIGS. 4A and 4C are identical similar except that antenna 312 receives additional L1 GNSS signals over-the-air, which are then filtered, digitized along a separate path. For example, band pass filter 416 operates to pass the band of the L1 signals similar to band pass filter 415 (and may be omitted in some embodiments). In some embodiments, band pass filter 416 is configurable to a particular frequency band and width of frequency passed. In many embodiments, band pass filter 416 is configured to have a frequency width that is similar to or the same as the same sampling rate used for analog-to-digital conversion by RFIC 420C. In radio frequency hardware component 310A of FIG. 4C, L1 GPS signals are sampled in RFIC 420B along with additional L1 GNSS signals being sampled by RFIC 420C (e.g., at least one of a conventional BeiDou L1 signal, a conventional Glonass L1 signal, or a pseudolite FDMA L1 signal). Band pass filter 416 outputs a third analog GNSS signal 411C (e.g., a filtered conventional Glonass L1 signal) which is then provided to RFIC 420C. RFIC 420C utilizes a reference frequency 431C supplied by signal source 430 to down-convert third analog GNSS signal 411C. The down-converted version third analog GNSS signal 411C is then sampled, digitized, and output as third digitized GNSS signal 421C to serializer 314.

Figure 4D:
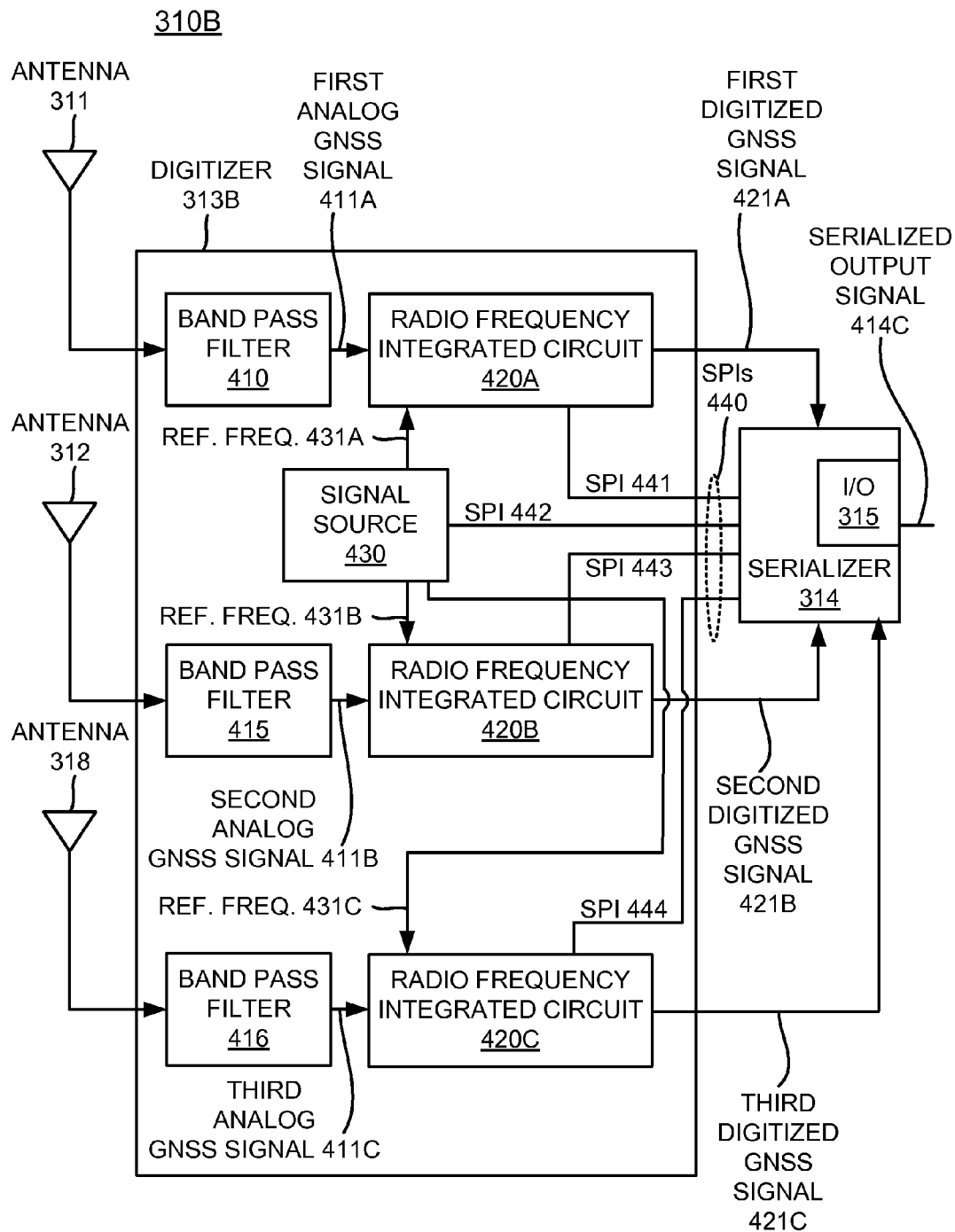
FIG. 4D is a block diagram of a radio frequency hardware component, according to various embodiments.

FIG. 4D is a block diagram of a radio frequency hardware component, according to various embodiments. In operation, RF hardware component 310A and 310B are similar except that additional components: antenna 318, band pass filter 416, and RFIC 420C are included. In one embodiment, antenna 318 receives an L5 GNSS signal over-the-air, which is then filtered, digitized, and serialized. For example, band pass filter 416 operates to pass the band of the L5 signal. In some embodiments, band pass filter 416 is configurable to a particular frequency band and width of frequency passed. In many embodiments, band pass filter 416 is configured to have a frequency width that is similar to or the same as the same sampling rate used for analog-to-digital conversion by RFIC 420C. As the chipping rate for an L5 GNSS signal is 10.23 MHz, the sampling rate can be approximately 10 MHz. In one embodiment, band pass filter 415 may thus be configured to pass a 10 MHz band centered on the L5 GNSS frequency of 1,176.45 MHz Band pass filter 415 outputs a third analog GNSS signal 411C (e.g., a filtered GPS L5 signal that has been received over-the-air). RFIC 420C, may be configured utilizing SPI 444, and utilizes a reference frequency 431C supplied by signal source 430 to down convert third analog GNSS signal 411C. The down-converted version of third analog GNSS signal 411C is then sampled, digitized, and output as a third digitized GNSS signal 421C to serializer 314. In one embodiment, antenna 318 receives an analog Satellite Based Augmentation System (SBAS) signal (e.g., from an OmniSTAR satellite, or other satellite that provides GNSS corrections) over-the-air, which is then filtered, digitized, and serialized in a similar manner as described above with respect to the L5 signal. The digitized SBS signal is then provided to processor 331.

Figure 4E:
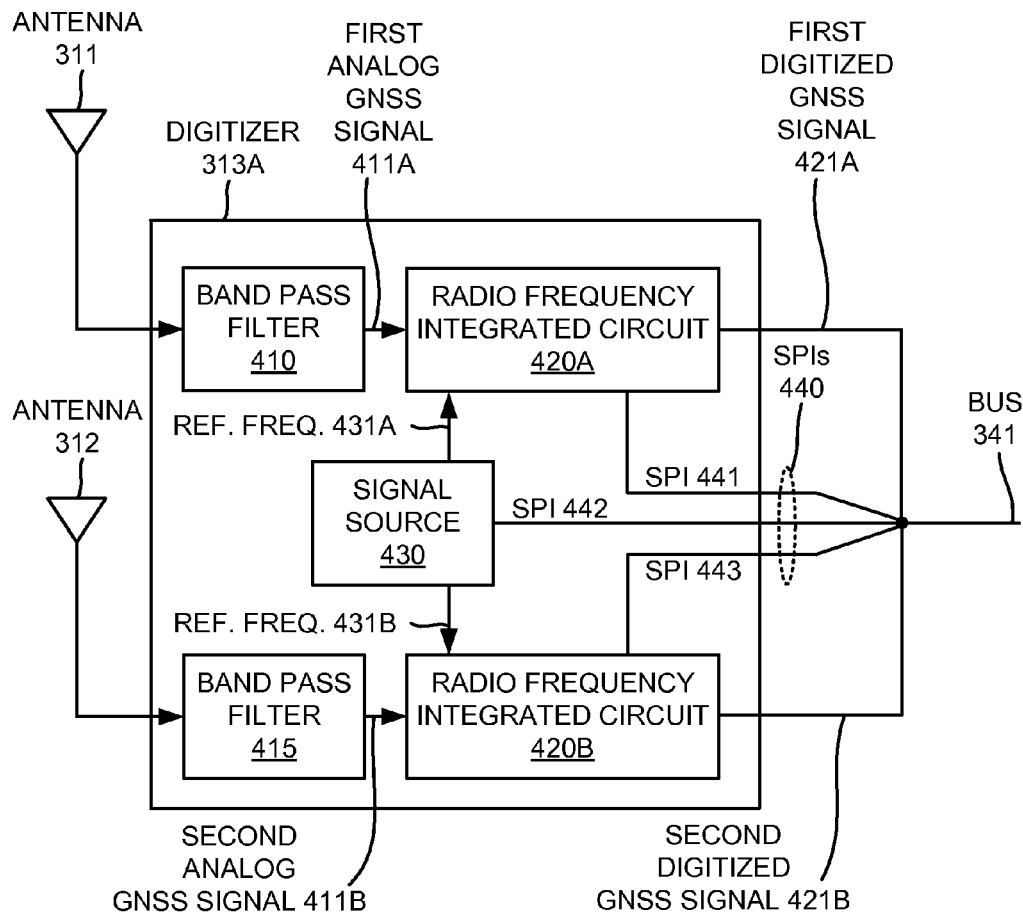
FIG. 4E is a block diagram of a radio frequency hardware component, according to various embodiments.

FIG. 4E is a block diagram of a radio frequency hardware component 310C, according to various embodiments. RF hardware component 310C is similar in operation to RF hardware component 310A of FIG. 4A except that the first digitized GNSS signal 421A and second digitized GNSS signal 421B are coupled over bus 341 or other similar line(s) that couple directly with processor 331 (as illustrated in FIG. 3C) while omitting serializer 314 from the communications path. Similarly, in some embodiments control signals such as SPIs 440 may be coupled received via bus 341 or other communicative coupling with processor 331 that omits serializer 314 from the communications path.

Figure 4F:
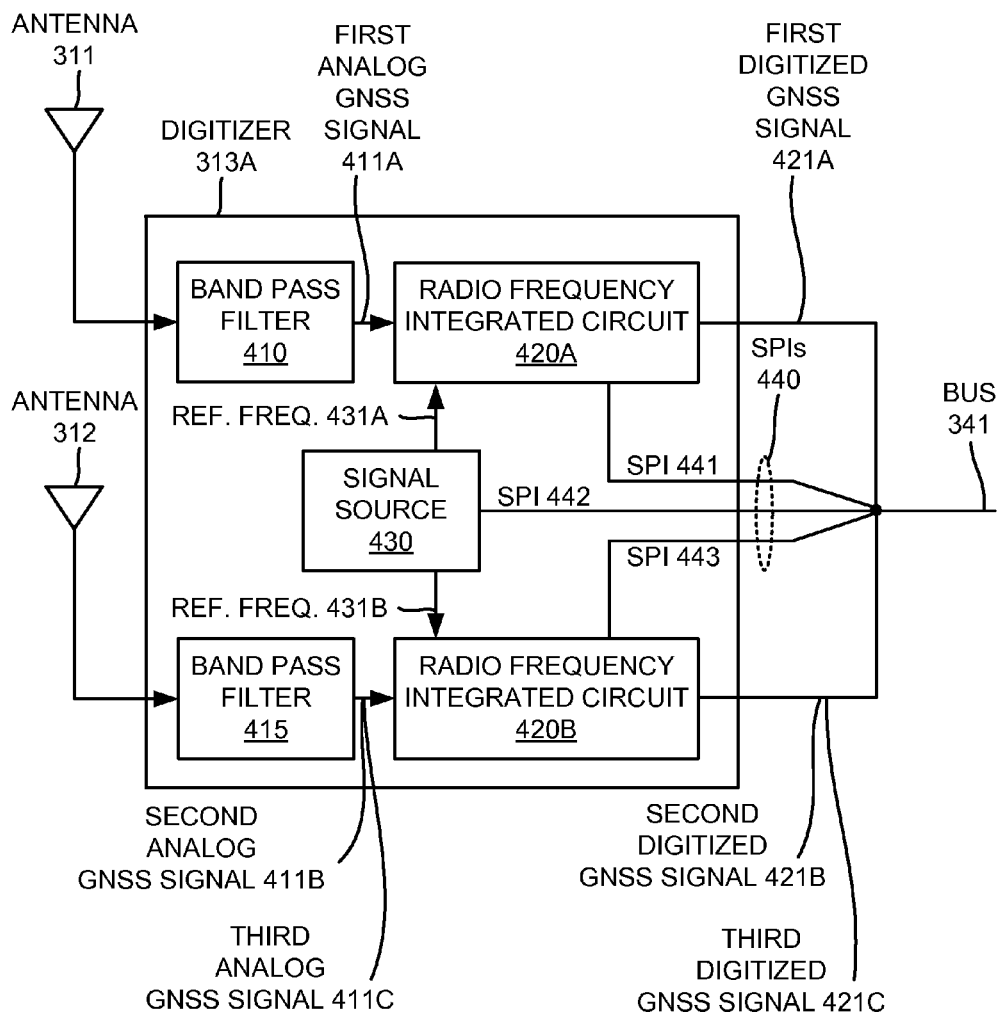
FIG. 4F is a block diagram of a radio frequency hardware component, according to various embodiments.

FIG. 4F is a block diagram of a radio frequency hardware component 310C, according to various embodiments. RF hardware component 310C is similar in operation to RF hardware component 310A of FIG. 4B except that the first digitized GNSS signal 421A, second digitized GNSS signal 421B, and third digitized GNSS signal 421C are coupled over bus 341 or other similar line(s) that couple directly with processor 331 (as illustrated in FIG. 3C) while omitting serializer 314 from the communications path. Similarly, in some embodiments control signals such as SPIs 440 may be coupled received via bus 341 or other communicative coupling with processor 331 that omits serializer 314 from the communications path.

Figure 4G:
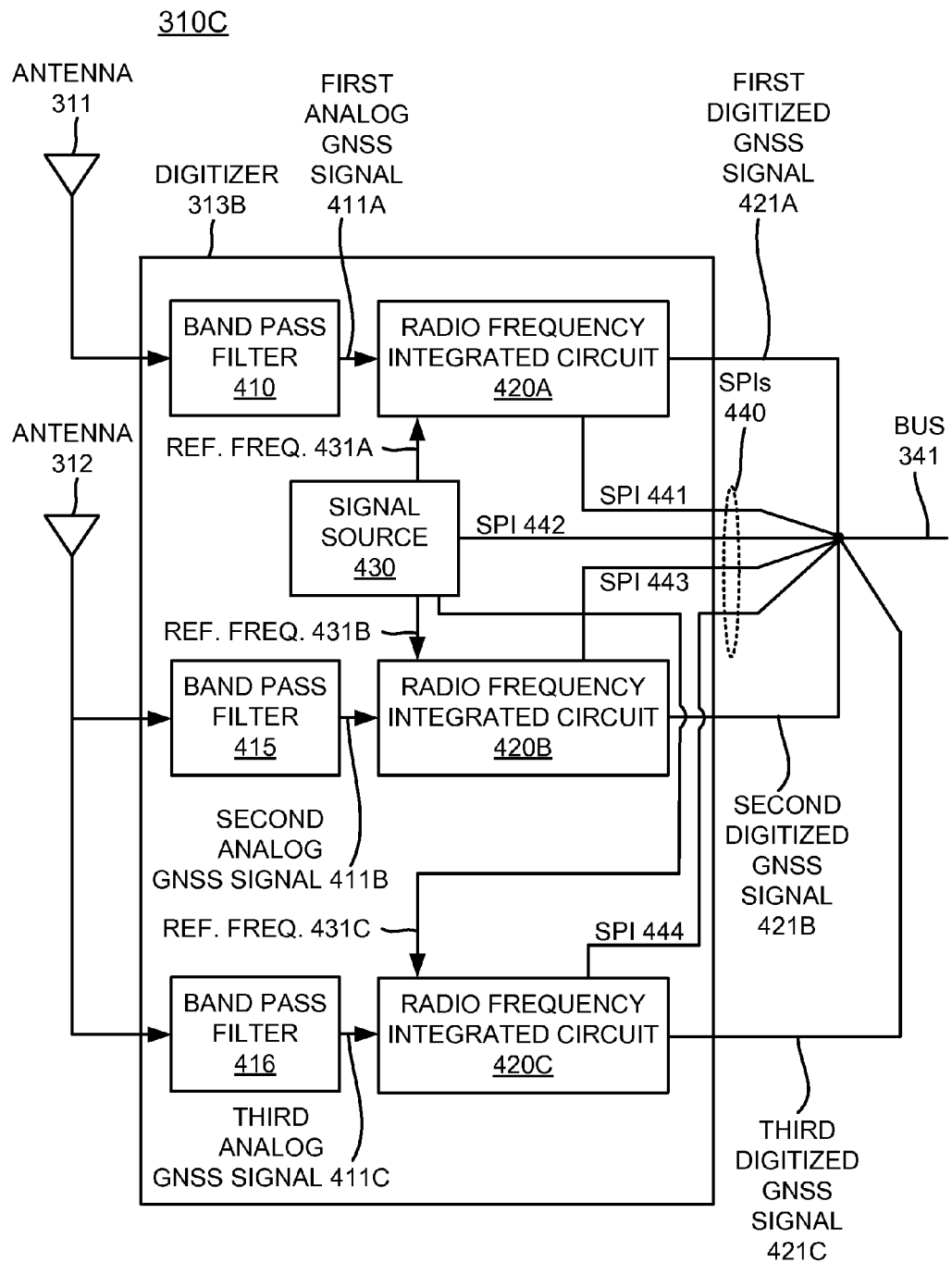
FIG. 4G is a block diagram of a radio frequency hardware component, according to various embodiments.

FIG. 4G is a block diagram of a radio frequency hardware component 310D, according to various embodiments. RF hardware component 310C is similar in operation to RF hardware component 310B of FIG. 4C except that the first digitized GNSS signal 421A, second digitized GNSS signal 421B, and third digitized GNSS signal 421C are coupled over bus 341 or other similar line(s) that couple directly with processor 331 (as illustrated in FIG. 3C) while omitting serializer 314 from the communications path. Similarly, in some embodiments control signals such as SPIs 440 or their equivalents may be coupled via bus 341 or other communicative coupling with processor 331 that omits serializer 314 from the communications path.

Figure 4H:
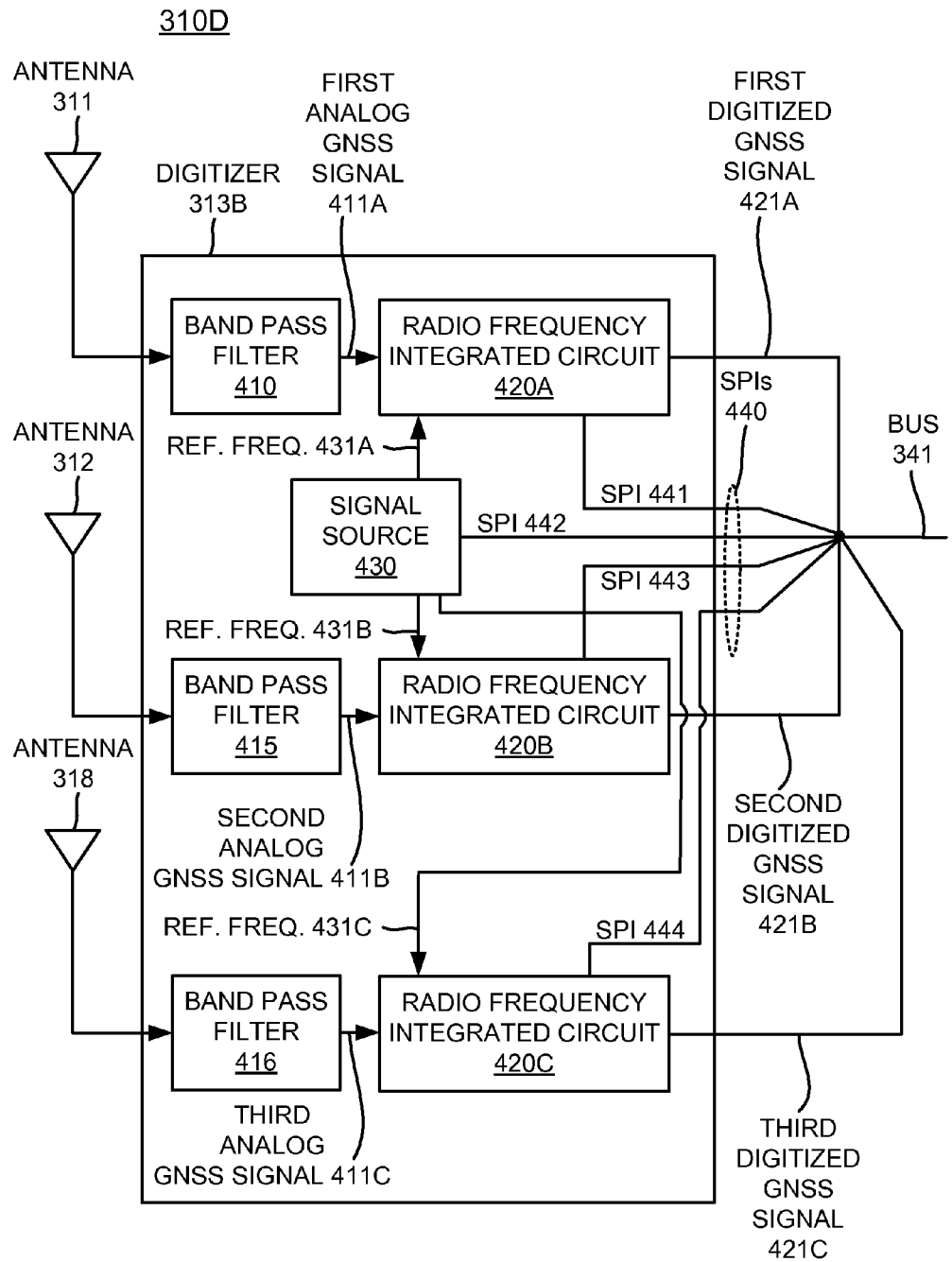
FIG. 4H is a block diagram of a radio frequency hardware component, according to various embodiments.

FIG. 4H is a block diagram of a radio frequency hardware component 310D, according to various embodiments. RF hardware component 310D is similar in operation to RF hardware component 310B of FIG. 4D except that the first digitized GNSS signal 421A, second digitized GNSS signal 421B, and third digitized GNSS signal 421C are coupled over bus 341 or other similar line(s) that couple directly with processor 331 (as illustrated in FIG. 3C) while omitting serializer 314 from the communications path. Similarly, in some embodiments control signals such as SPIs 440 or their equivalents may be coupled via bus 341 or other communicative coupling with processor 331 that omits serializer 314 from the communications path. In an embodiment wherein an analog Satellite Based Augmentation System (SBAS) signal is received, filtered, and digitized, it is coupled over bus 341 or other similar means that couple directly with processor 331 while omitting serializer 314 from the communications path.

Figure 4I:
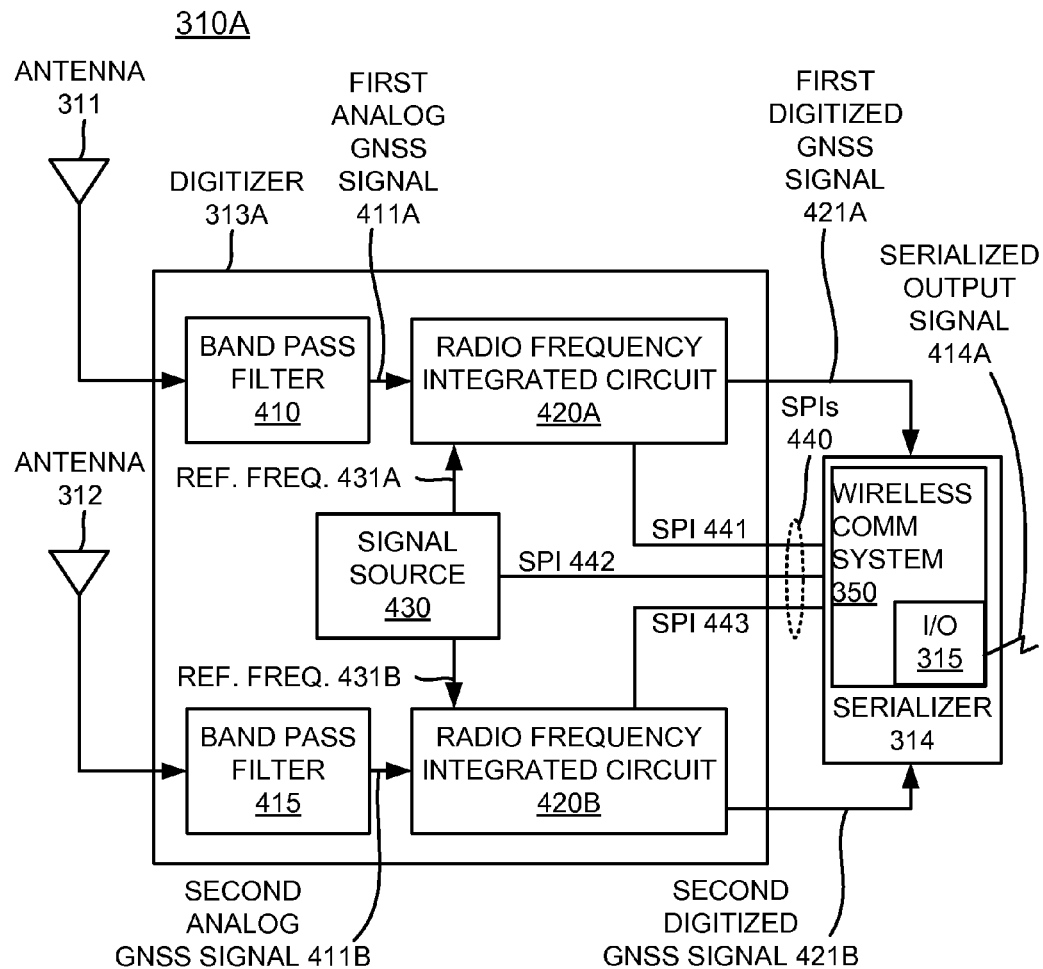
FIG. 4I is a block diagram of a radio frequency hardware component, according to various embodiments.

Referring now to FIG. 4I, it should be appreciated that FIG. 4I is similar to FIG. 4A. However, FIG. 4I illustrates the use of wireless communication system 350 instead of the wireline communication as illustrated in FIGS. 4A-D.

Figure 5:
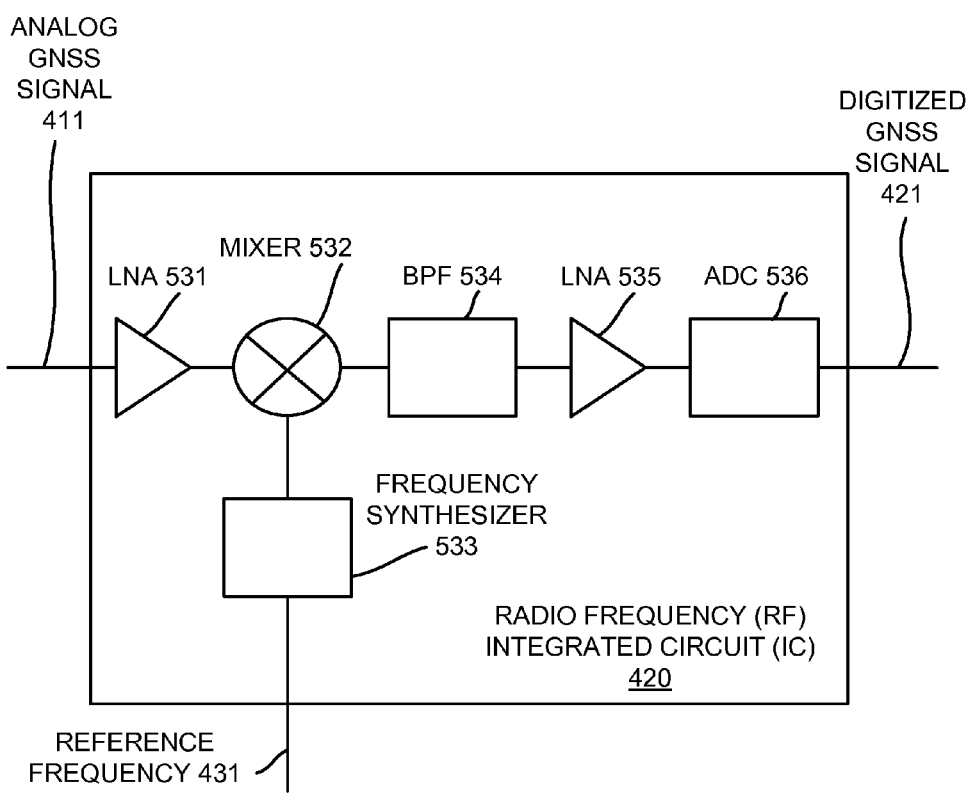
FIG. 5 is a block diagram of a radio frequency integrated circuit, according to various embodiments.

FIG. 5 is a block diagram of a radio frequency integrated circuit 420, according to various embodiments. The depiction in FIG. 5 is generic and may apply to any RFIC 420 (e.g., 420A, 420B, or 420C) described herein. As illustrated, an analog GNSS signal 411 is received as an input and then amplified by Low Noise Amplifier (LNA) 531. The amplified analog GNSS signal 411 is then received at mixer 532 where it is mixed with a reference frequency 431 to create an intermediate frequency. The reference frequency is produced by frequency synthesizer 533, and is a harmonic of a stable reference frequency 431 that it receives as an input. The output of mixer 532 is filtered by band pass filter 534 at the intermediate frequency to exclude other output produced by mixer 532. A second amplifier, LNA 535, then further amplifies the filtered intermediate frequency signal to provide gain control prior to sampling for analog-to-digital conversion by analog-to-digital convertor 536. Analog-to-digital convertor 536 outputs a digitized version of the intermediate frequency signal which is then coupled to the soft GNSS receiver 333 (either directly in an integrated embodiment or through serialization and transmission in other embodiments in which the RF hardware component 310 and the communication device 330A are not integrated).

Figure 6:
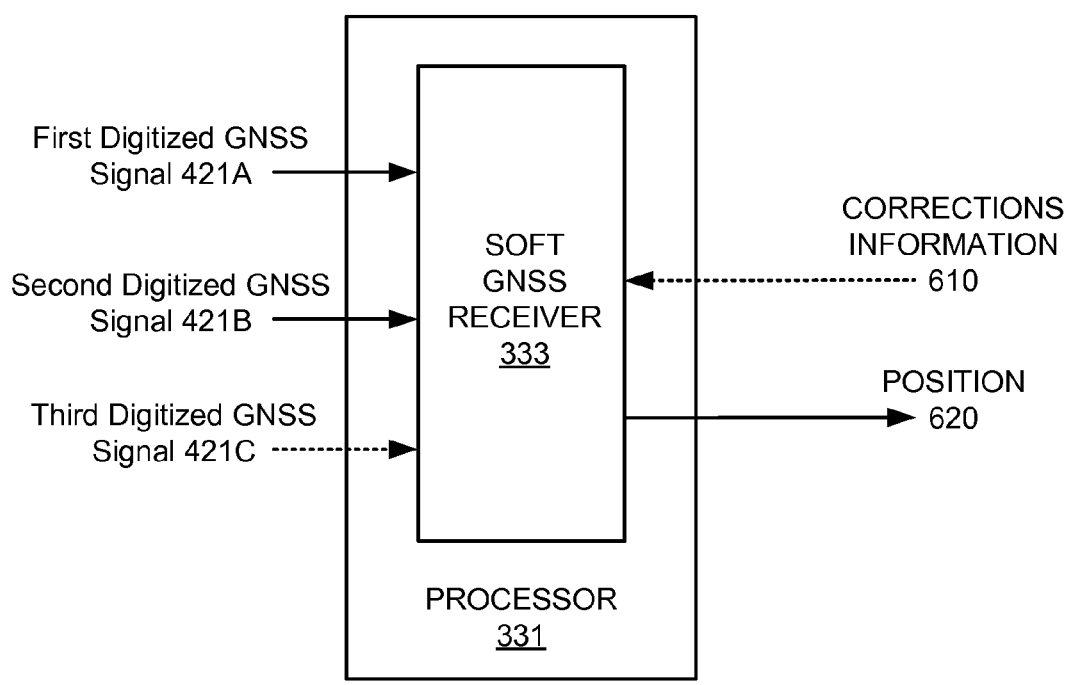
FIG. 6 is a block diagram of a software defined GNSS receiver, according to various embodiments.

FIG. 6 is a block diagram of a software defined GNSS receiver 333, according to various embodiments. Software defined GNSS receiver 333 is also referred to herein as a "soft GNSS receiver." Software defined GNSS receivers are a type of software defined radio in which correlating, dispreading, and other functions of a GNSS receiver are accomplished digitally by a program running on a processor. Software defined GNSS receivers and their implementation are well-known by those of skill in the art. As illustrated in FIG. 6, software defined GNSS receiver receives digitized GNSS signals (421A, 421B, and in some embodiments 421C) as inputs. Soft GNSS receiver 333 generates first information such as pseudorange, code, carrier phase, and/or Doppler shift information from the first digitized GNSS signal 421A. In some embodiments, the first information may be associated with L2C and/or L5 signals from GPS satellites. Soft GNSS receiver 333 generates second information such as pseudorange, code, carrier phase, and/or Doppler shift information from the second digitized GNSS signal 421B. In some embodiments, the second information may be associated with L1 signals from GPS satellites that at least include the GPS satellites that provide the L2C and/or L5 information and may include additional GPS satellites. In some embodiments when third digitized GNSS signal 421 is received, soft GNSS receiver 333 generates third information such as pseudorange, code, carrier phase, and/or Doppler shift information from the third digitized GNSS signal 421A. In some embodiments, the third information may be associated with L5 GNSS signals or L1 GNSS signals or SBAS signals. Soft GNSS receiver 333 may also receive one or more corrections 610 (e.g., one or more of WAAS, DGPS, PPP, RTX, RTK, SBAS and VRS) as digital inputs that are received over-the-air via transceiver 336 of communication device 330A. Soft GNSS receiver 333 operates to determine a position based at least on a combination of the first information and the second information, but may also utilize the third information and/or corrections 610 when determining the position.

Figure 7A:
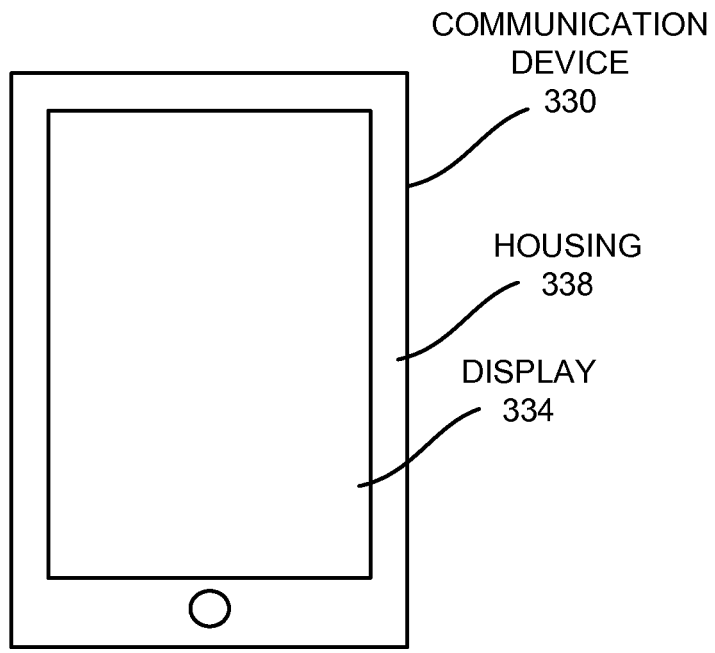
FIG. 7A is a front view of a communication device, according to various embodiments.

FIG. 7A is a front view of a communication device 330A, according to various embodiments. Communication device 330A includes display 334 and housing 338.

Figure 7B:
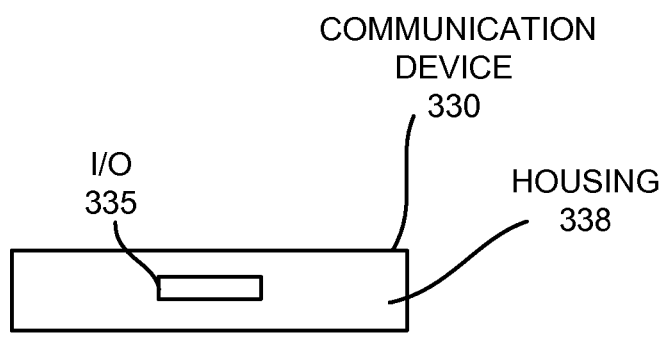
FIG. 7B is a bottom side view of a communication device, according to various embodiments.

FIG. 7B is a bottom side view of a communication device 330A, according to various embodiments. In one embodiment an I/O 335 is included in some portion of housing 338. Here it has been depicted on a bottom side edge; however, in other embodiments, female I/O 335 may be located in other portions of housing 338.

Figure 8A:
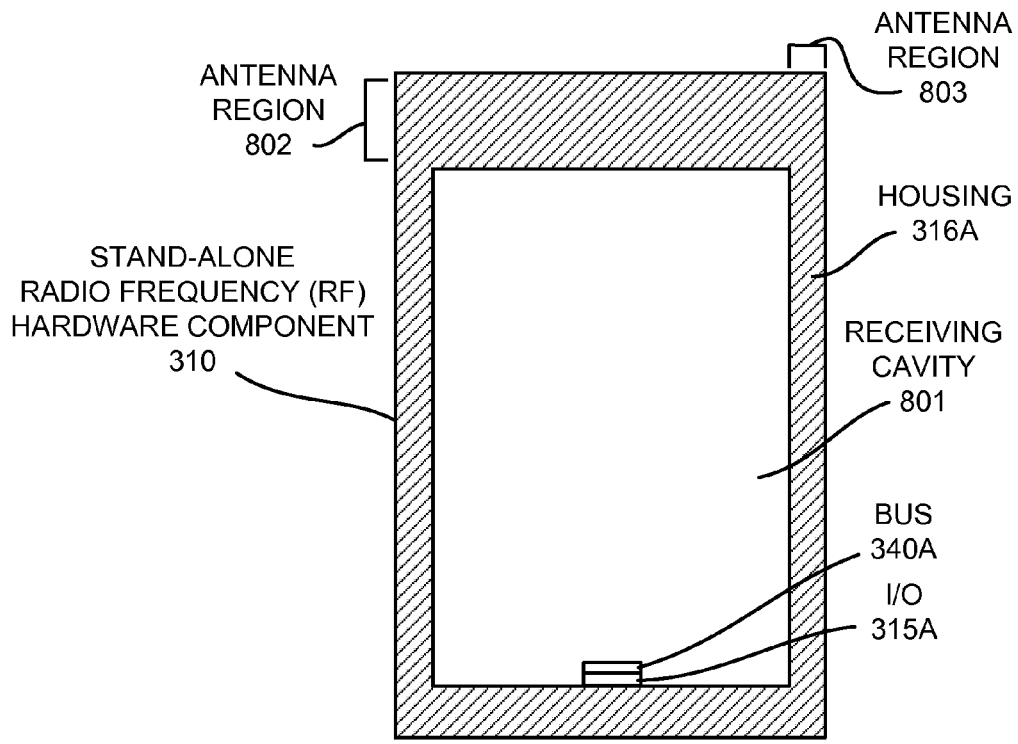
FIG. 8A is a front view of the outside of radio frequency hardware component, according to various embodiments.

FIG. 8A is a front view of the outside of a GNSS receiver system 300-1 in accordance with various embodiments. In FIG. 8A, GNSS receiver system 300-1 comprises a radio frequency hardware component 310, according to various embodiments. As depicted in FIG. 8A, radio frequency hardware component 310 is a stand-alone component which can operate as a sleeve or protective shell that the housing 338 of a separate communication device can be nestled within or otherwise conveniently and removably affixed by virtue of design. For example, as illustrated, housing 316A includes a receiving cavity 801 and a male I/O 315A which also includes a bus 340A. Antennas such as antennas 311, 312, and in some embodiments 318 may be embedded anywhere within housing 338, but in some embodiments are located upper edge antenna region 802 or a side edge antenna region 803.

Figure 8B:
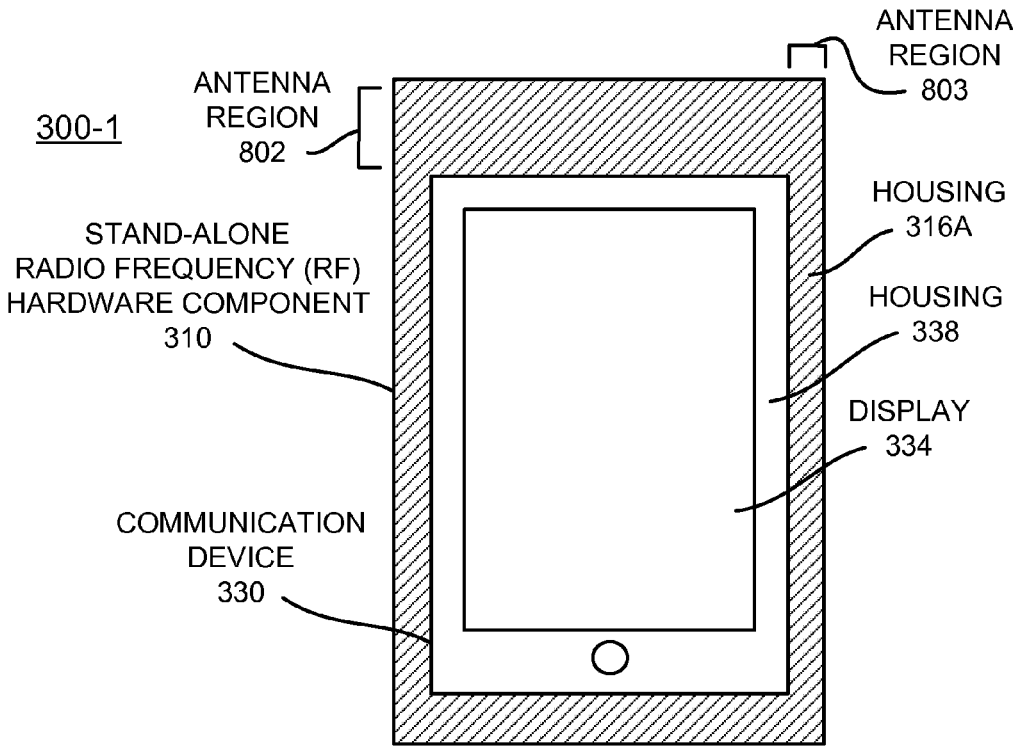
FIG. 8B is a front view of the outside of radio frequency hardware component coupled with a communication device to form a GNSS receiver, according to various embodiments.

FIG. 8B is a front view of a GNSS receiver system 300-1 in accordance with various embodiments in which radio frequency hardware component 310 is coupled with a communication device 330A to form GNSS receiver 300-1, according to various embodiments. Communication device 330A resides snugly within receiving cavity 801. As part of the coupling, bus 340A and I/O 315A have been inserted into the female I/O 335 of communication device 330A, thus engaging a removable communicative coupling between RF hardware component 310 and communication device 330A.

It should be appreciated that an anticipated variation of this is a form factor which externally affixes (by virtue of design), housing-to-housing, to communication device 330A without enveloping it.

Figure 9A:
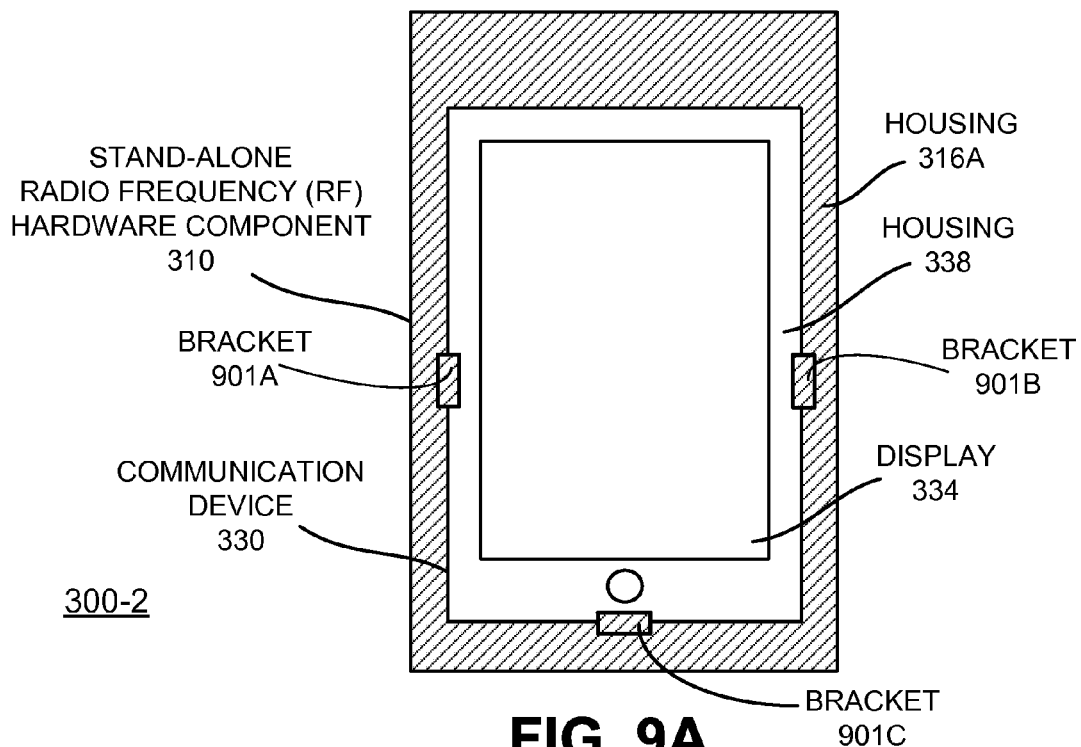
FIG. 9A is a front view of a GNSS receiver system in which a radio frequency hardware component is coupled with a communication device in accordance with one embodiment.

FIG. 9A is a front view of a GNSS receiver system 300-2 in accordance with various embodiments. In FIG. 9A, GNSS receiver system 300-2 comprises a radio frequency hardware component 310 that is coupled with a communication device 330A. In FIG. 9A, radio frequency component 310 further comprises brackets 901A, 901*b*, and 901C into which communication device 330A is inserted. Brackets 901A, 901*b*, and 901C then exert mechanical force which holds communication device 330 firmly against housing 316A. It is noted that in accordance with various embodiments, additional brackets, or bracket designs, may be used to couple communication device 330 securely to housing 316A of radio frequency hardware component 310. Additionally, other features, such as a partial receiving cavity 801 (not shown) may be configured such that communication device 330 is partially nestled within housing 316A. It is noted that in accordance with at least one embodiment, male I/O 315A is disposed within bracket 901C such that when communication device 330 is inserted into brackets 901A, 901*b*, and 901C it is also communicatively coupled with radio frequency hardware component 310 via bus 340A. In another embodiment, communication device 330 communicates wireless via wireless communication system 351 which wirelessly communicates with wireless communication system 350 of radio frequency hardware component 310 as shown in FIG. 3E.

Figure 9B:
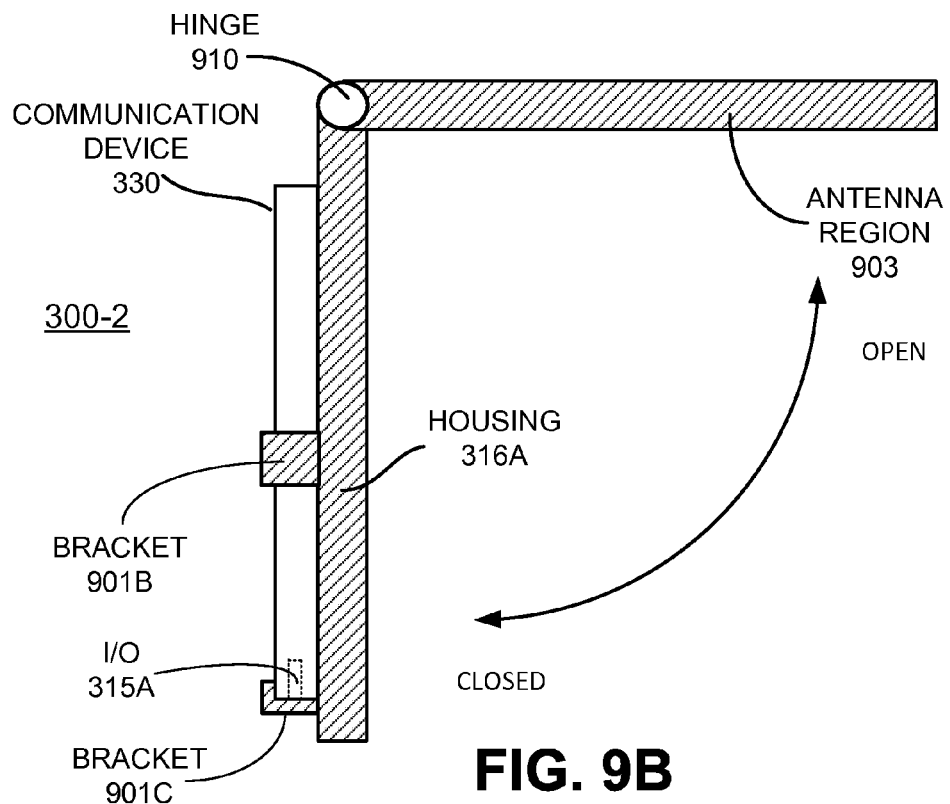
FIG. 9B is a side view of a GNSS receiver system in which a radio frequency hardware component is coupled with a communication device in accordance with one embodiment.

FIG. 9B is a side view GNSS receiver system 300-2 as described above in FIG. 9A. As shown in FIG. 9B, communication device 330 is inserted into brackets 901B and 901C which hold communication device 330 firmly against housing 316A. In FIG. 9B, radio frequency hardware component 310 further comprises antenna housing 903 which is coupled with housing 316A via a hinge 910 and can rotate freely from a close position in which antenna housing 903 lies along housing 316A to an open position. As shown in FIG. 9B, antenna housing 903 is disposed ninety degrees or more from housing 316A. It is noted that it is not necessary to rotate antenna housing 903 to the position shown in FIG. 9B in order to receive and process GNSS satellite signals. Thus, in accordance with various embodiments, GNSS receiver system 300-2 is still operable if a user rotates antenna housing 903 to a position of less than ninety degrees, or if the user does not rotate antenna housing 903 at all away from housing 316A. In accordance with various embodiments, antenna housing 903 comprises a housing for antenna 232A and 232B of GNSS receiver 200 of FIG. 2 and can comprise additional components of GNSS receiver 200 and/or radio frequency hardware components 310A, 310B, 310C, and 310D including antennas 311, 312, and 318. In accordance with at least one embodiment, all of the components of GNSS receiver 200 and radio frequency hardware components 310A, 310B, 310C, and 310D are disposed with antenna housing 903. In operation, a user rotates antenna housing 903 from a closed position along housing 316A to an open position as shown in FIG. 9B. This is advantageous because in the open position shown in FIG. 9B, antennas 232A and 232B and/or 311, 312, and 318 can be oriented such that the surfaces of antenna 232A and 232B and/or 311, 312, and 318 are perpendicular to the surface of the Earth. This improves antenna gain and thus enhances the performance of GNSS receiver system 300-2. Additionally, in accordance with various embodiments, upon detecting that antenna housing 903 has been rotated from a closed position to the open position shown in FIG. 9B, processor 331 of communication device 330 is configured to automatically initiate various actions such as, but not limited to, automatically powering up communication device 330 and/or radio frequency hardware component 310, automatically establishing communications with wireless network 130, and automatically processing received GNSS signals.

Figure 10A:
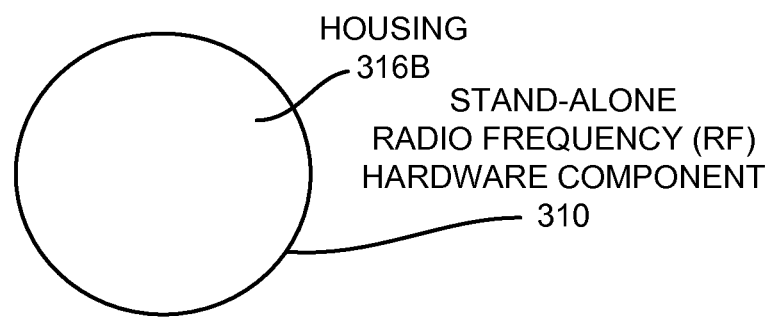
FIG. 10A is a front view of the outside of radio frequency hardware component, according to various embodiments.

FIG. 10A is a front view of the outside of radio frequency hardware component 310, according to various embodiments. In this embodiment, RF hardware component 310 is disposed within a housing 316B. Housing 316B is illustrated as being puck shaped, but may have other shapes which do not include a cavity into which communication device 330A can be inserted and/or do not externally affix (by virtue of design), housing-to-housing, to communication device 330A.

Figure 10B:
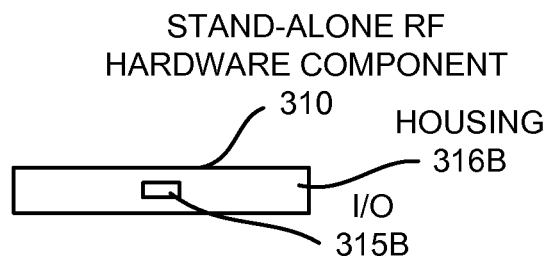
FIG. 10B is a side view of the outside of radio frequency hardware component, according to various embodiments.

FIG. 10B is a side view of the outside of radio frequency hardware component, according to various embodiments. In one embodiment an I/O 315 is included in some portion of housing 338. Here it has been depicted on a side edge; however, in other embodiments, I/O 315 may be located in other portions of housing 316B. All though depicted as a female I/O, I/O 315B may be a male I/O and may be integrated with a bus in some embodiments.

Figure 11A:
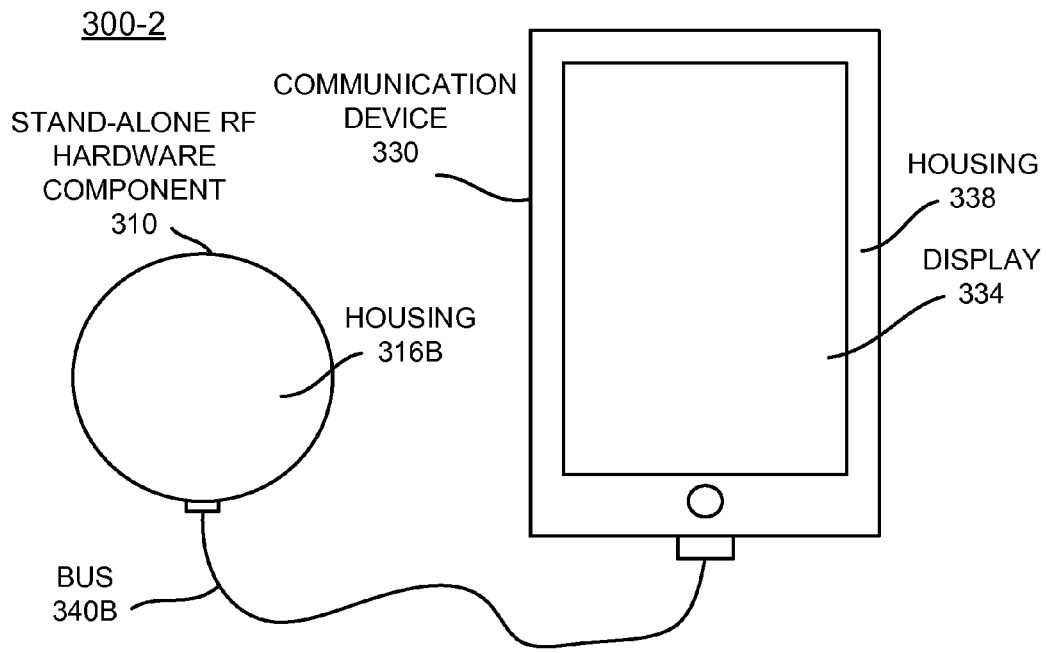
FIG. 11A is a front view of the outside of radio frequency hardware component coupled with a communication device to form a GNSS receiver, according to various embodiments.

FIG. 11A is a front view of the outside of radio frequency hardware component 310 that is coupled with a communication device to form GNSS receiver 300-2, according to various embodiments. Bus 340B couples I/O 315B to I/O 335 of communication device 330A, thus engaging a removable communicative coupling between RF hardware component 310 and communication device 330A.

Figure 11B:
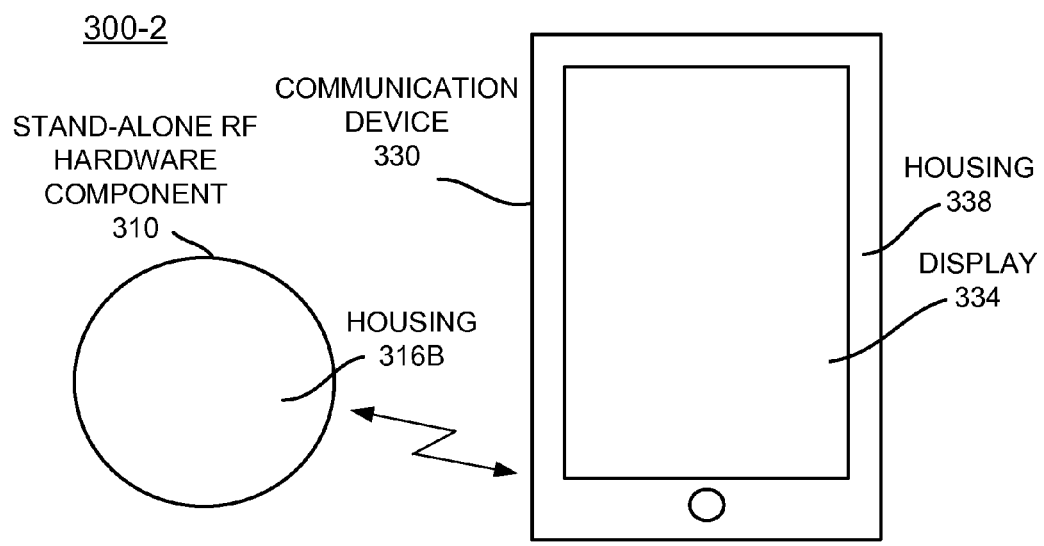
FIG. 11B is a front view of the outside of radio frequency hardware component wirelessly coupled with a communication device to form a GNSS receiver, according to various embodiments.

Referring now to FIG. 11B, FIG. 11B is a front view of the outside of radio frequency hardware component 310 that is wirelessly coupled with a communication device to form GNSS receiver 300-2, according to various embodiments. For example, wireless communication system 350 of RF hardware component 310 wirelessly communicates with wireless communication system 351 of communication device 330.

FIG. 12 is a flowchart of a method 1200 for capturing ionospheric data. In operation 1201 of FIG. 12, a plurality of phase-coherent signals transmitted by at least one Global Navigation Satellite System (GNSS) satellite are received via a mobile multi-frequency GNSS receiver. In accordance with various embodiments, RF hardware component 310 and GNSS antennas 232A and 232B are multi-frequency GNSS antennas configured to receive satellite navigation signals over a plurality of radio frequencies. In accordance with various embodiments, RF hardware component 310 is coupled with communication device 330 which comprises a handheld wireless communication device such as a cellular telephone.

In operation 1202 of FIG. 12, derive respective code phase data and carrier phase data for each of said plurality of phase-coherent signals using a software defined GNSS receiver operating on a processor of a first communication device of the multi-frequency GNSS receiver. As described above, in various embodiments a software defined GNSS receiver 333 is implemented upon a device (e.g., vehicle navigation system 170 of FIG. 1B, vehicle controller 181 of FIG. 1C, communication device 330 of FIGS. 3A-3E, and computer system 1300 of FIG. 13. In accordance with various embodiments, software defined GNSS receiver 333 is configured to derive respective code phase data from the L1 and L2C, and/or L5, signals transmitted by the GNSS satellite 101. From this respective code phase and carrier phase data, software defined GNSS receiver 333 will derive a code-minus-code sample in which the measured code phase of the received L2C or L5 signal is subtracted from the measured code phase of the received L1 signal from that same GNSS satellite 101. Similarly, software defined GNSS receiver 333 will derive a carrier-minus-carrier sample in which the measured carrier phase of the received L2C signal or L5 signal is subtracted from the measured carrier phase of the received L1 signal from that same GNSS satellite 101. In accordance with various embodiments, this ionospheric sample 140 (e.g., code-minus-code and carrier-minus-carrier calculations) is sent along and appended with the position fix, GNSS time-stamp, and satellite identification of the GNSS satellite 101 from which the code phase and carrier phase data was derived.

In operation 1203 of FIG. 12, the respective code phase data and carrier phase data for each of the plurality of phase-coherent signals are stored in a data storage device. In accordance with various embodiments, the respective code phase data and carrier phase data is appended with a respective appended GNSS time-stamp and position fix. As described above, the mobile multi-frequency GNSS receiver (e.g., RF hardware component 310 and GNSS receiver 200) comprise discreet components of a mobile platform (e.g., GNSS receiver system 300 and vehicle navigation system 170 respectively). In accordance with various embodiments, the mobile platform is selected from the group consisting of: a motor vehicle, a passenger vehicle, a sports utility vehicle (SUV), a truck, a delivery vehicle, a long-haul truck-trailer, an unmanned aerial vehicle (UAV), an unmanned vehicle, a passenger airplane, a transport airplane, an ocean-going ship, a river boat, a passenger train, a freight train, and a motorcycle.

In operation 1204 of FIG. 12, an ionospheric sample based upon the respective code phase data and carrier phase data of the plurality of phase-coherent signals is wirelessly transmitted to a second location. In accordance with various embodiments, the ionospheric sample is sent wirelessly (e.g., via a cellular telephone such as communication device 330 or wireless communication device 1303 of vehicle navigation system 170). It is noted that cellular telephones such as communication device 330, as well as wireless communication device 1303, are configured with one or more wireless communication transceivers including, but not limited to, cellular and WiFi transceivers which are used to convey ionospheric sample 140 in accordance with various embodiments. In accordance with various embodiments, the mobile platform uses a cellular transceiver coupled therewith to transmit ionospheric sample 140 to a second location. In accordance with other embodiments, the mobile platform uses a WiFi communication transceiver to convey ionospheric sample 140. As described above, communication device 330 and vehicle navigation system 170 are configured to determine when a wireless communication link is available for wirelessly transmitting ionospheric sample 140. More specifically, GNSS processor 254 and internal GNSS receiver chipset 337 are configured to determine when a communication link is available for wirelessly transmitting ionospheric sample 140 in accordance with various embodiments. In accordance with various embodiments, in response to determining that a wireless communication link is available for wirelessly transmitting ionospheric sample 140, GNSS processor 254 and internal GNSS receiver chipset 337 enable the transmission of ionospheric sample 140 to a second location. In accordance with various embodiments, data is appended to the ionospheric sample indicating that the mobile multi-frequency GNSS receiver was moving when the phase-coherent signals were received. In accordance with various embodiments, when it is determined that the mobile multi-frequency GNSS receiver is located in a high multi-path reception area, processing of said phase-coherent signals to derive said respective code phase data and carrier phase data for each of said plurality of phase-coherent signals is suspended. Alternatively, when it is determined that the mobile multi-frequency GNSS receiver is located in a high multi-path reception area, transmission of the ionospheric sample and/or the respective code phase data and carrier phase data for each of the plurality of phase-coherent signals is suspended or prevented.

Example Computer System

Figure 13:
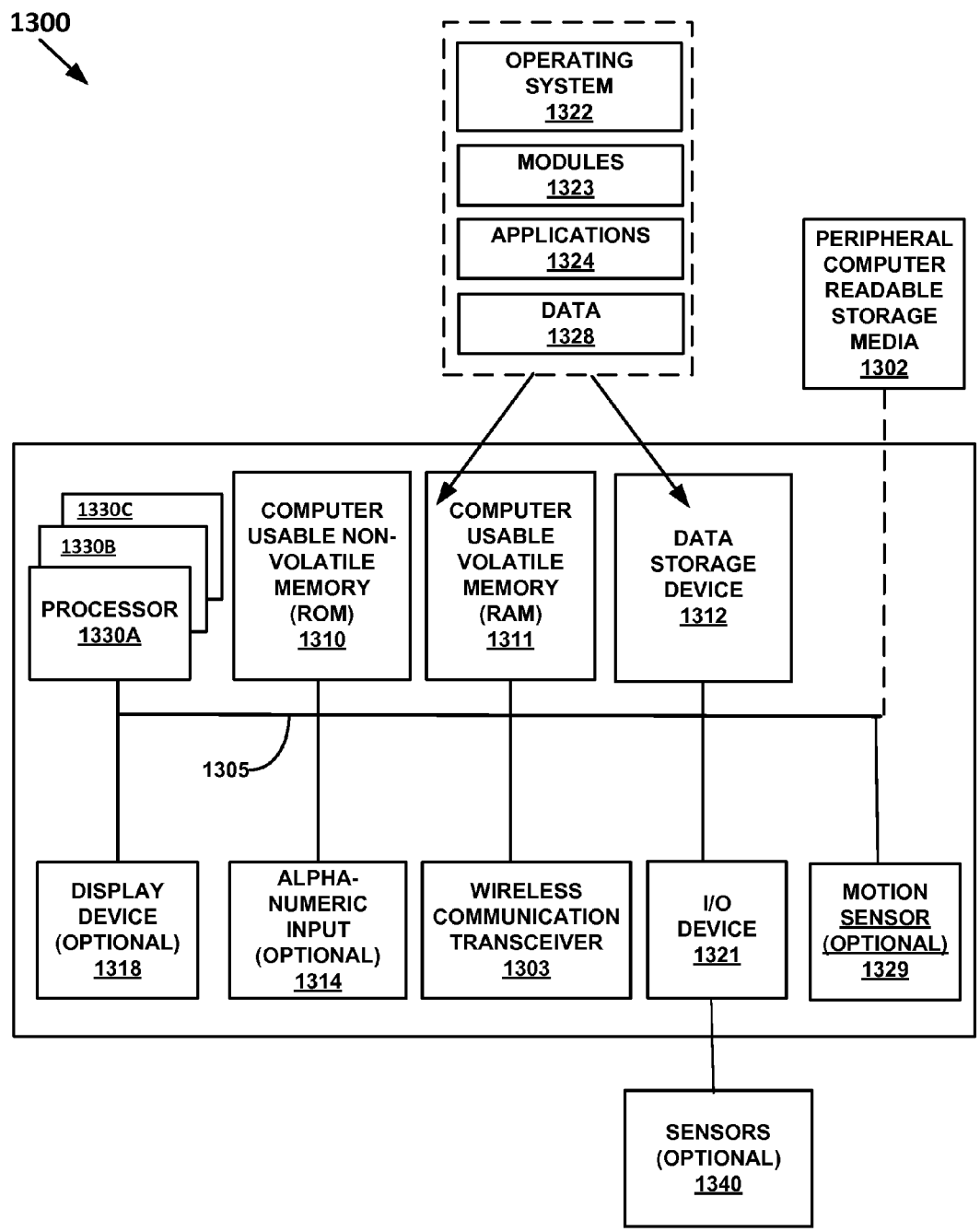
FIG. 13 is a block diagram of an example computer system used in accordance with various embodiments.

With reference now to FIG. 13, all or portions of some embodiments described herein are composed of computer-readable and computer-executable instructions that reside, for example, in non-transitory computer-usable/computer-readable storage media of a computer system. That is, FIG. 13 illustrates one example of a type of computer (e.g., vehicle navigation system 170 of FIG. 1B, vehicle controller 181 of FIG. 1C, a cellular telephone such as communication device 330A of FIGS. 3A, 3B, and 3E, etc.) that can be used in accordance with or to implement various embodiments which are discussed herein. It is appreciated that computer system 1300 of FIG. 13 is only an example and that embodiments as described herein can operate on or within a number of different computer systems including, but not limited to, embedded computer systems, server devices, various intermediate devices/nodes, vehicular navigation systems (e.g., vehicle navigation system 170 of FIG. 1B), handheld computer systems, telematics boxes, and the like. Computer system 1300 of FIG. 13 is well adapted to having peripheral computer-readable storage media 1302 such as, for example, a floppy disk, a compact disc, digital versatile disc, universal serial bus "thumb" drive, removable memory card, and the like coupled thereto. In accordance with at least one embodiment, computer system 1300 is implemented as a vehicle navigation/vehicle control system, also referred to as a "telemetry box" in some instances, as may be found in mobile machines such as automobiles, agricultural equipment, construction equipment, or even autonomously operated vehicles. A commercial example is the DCM-300 offered by Trimble Navigation Limited, of Sunnyvale, Calif.

Computer system 1300 of FIG. 13 includes an address/data bus 1305 for communicating information, and a processor 1330A coupled to bus 1305 for processing information and instructions. As depicted in FIG. 13, computer system 1300 is also well suited to a multi-processor environment in which a plurality of processors 1330A, 1330B, and 1330C are present. Conversely, computer system 1300 is also well suited to having a single processor such as, for example, processor 1330A. Processors 1330A, 1330B, and 1330C may be any of various types of microprocessors. Computer system 1300 also includes data storage features such as a computer usable volatile memory 1311, e.g., random access memory (RAM), coupled to bus 1305 for storing information and instructions for processors 1330A, 1330B, and 1330C. Computer system 1300 also includes computer usable non-volatile memory 1310, e.g., read only memory (ROM), coupled to bus 1305 for storing static information and instructions for processors 1330A, 1330B, and 1330C. Also present in computer system 1300 is an optional data storage unit 1312 (e.g., a magnetic or optical disk and disk drive) coupled to bus 1305 for storing information and instructions. Computer system 1300 also includes an optional alphanumeric input device 1314 including alphanumeric and function keys coupled to bus 1305 for communicating information and command selections to processor 1330A or processors 1330A, 1330B, and 1330C. In one embodiment, computer system 1300 also includes an optional display device 1318 coupled to bus 1305 for displaying information. It is noted that in accordance with various embodiments, operations related to convergence selection may be implemented by processor(s) 1330A, 1330B, and 1330C and that short convergence algorithm 111 and long convergence algorithm 112 can be stored in data storage unit 1312, data 1328, and/or peripheral computer-readable storage media 1302.

In accordance with various embodiments, processors 1330A, 1330B, and 1330C are configured to derive the ionospheric sample 140. In accordance with one embodiment, processors 1330A, 1330B, and 1330C use the unprocessed code phase and carrier phase measurements of the L1, L2C, and L5 signals 102 sent from GNSS satellite 101 as the ionospheric sample 140. Alternatively, processors 1330A, 1330B, and 1330C subtract the carrier phase estimate of one of signals 102 from the carrier phase estimate of another of signals 102 from GNSS satellite 101. As an example, processors 1330A, 1330B, and 1330C will subtract a carrier phase estimate of the L1 signals from GNSS satellite 101 from a carrier phase estimate of the L2C and/or L5 signals from GNSS satellite 101 which is then sent as ionospheric sample 140. Alternatively, processors 1330A, 1330B, and 1330C will subtract a carrier phase estimate of the L2C and/or L5 signals from GNSS satellite 101 from a carrier phase estimate of the L1 signals from GNSS satellite 101 which is then sent as ionospheric sample 140. Similarly, processors 1330A, 1330B, and 1330C can subtract a code phase estimate of the L1 signals from GNSS satellite 101 from a code phase estimate of the L2C and/or L5 signals from GNSS satellite 101 which is then sent as ionospheric sample 140, or subtract a code phase estimate of the L2C and/or L5 signals from GNSS satellite 101 from a code phase estimate of the L1 signals from GNSS satellite 101 which is then sent as ionospheric sample 140. It is noted that ionospheric sample 140 can include any combination of the above discussed sets of data as ionospheric sample 140. For example, processors 1330A, 1330B, and 1330C may send the difference derived from subtracting the code phase and carrier phase estimates of the L1 signal from the L2C and/or signals, as well as optionally sending the unprocessed code phase and carrier phase measurements of the L1, L2C, and L5 signals as ionospheric sample 140. It is noted that the operations described above with reference to processors 1330A, 1330B, and 1330C can be performed by a single processor of computer system 1300 (e.g., processor 1330A) in accordance with various embodiments.

Referring still to FIG. 13, optional display device 1318 of FIG. 13 may be a liquid crystal device, cathode ray tube, plasma display device or other display device suitable for creating graphic images and alphanumeric characters recognizable to a user. A commercial example is the TMX-2050 offered by Trimble Navigation Limited, of Sunnyvale, Calif. In accordance with various embodiments, display device 1318 comprises a touch-screen apparatus and alpha-numeric input is performed by detecting a user's input via touch gestures. Computer system 1300 is also well suited to using other control means such as, for example, voice commands. Computer system 1300 also includes an I/O device 1321 for coupling computer system 1300 with external entities. For example, in one embodiment, I/O device 1321 is a modem for enabling wired or wireless communications between computer system 1300 and an external network such as, but not limited to, the Internet.

Referring still to FIG. 13, various other components are depicted for computer system 1300. Specifically, when present, an operating system 1322, applications 1324, modules 1323, and data 1328 are shown as typically residing in one or some combination of computer usable volatile memory 1311 (e.g., RAM), computer usable non-volatile memory 1310 (e.g., ROM), and data storage unit 1312. In some embodiments, all or portions of various embodiments (e.g., vehicle navigation system 170, vehicle control system 181, software defined GNSS receiver 333, etc.) described herein are stored, for example, as an application 1324 and/or module 1323 in memory locations within RAM 1311, computer-readable storage media within data storage unit 1312, peripheral computer-readable storage media 1302, and/or other tangible computer readable storage media. In the embodiment of FIG. 13, computer system 1300 further comprises an optional wireless communication transceiver 1319 coupled with bus 1305.

In accordance with various embodiments, wireless communication transceiver 1319 comprises a cellular transceiver coupled with bus 1305 for communicating via cellular network (not shown). Examples of cellular networks used by wireless communication transceiver 1319 include, but are not limited to Global System for Mobile Communications (GSM) cellular networks, General Packet Radio Service (GPRS) cellular networks, Code Division Multiple Access (CDMA) cellular networks, and Enhanced Data rates for GSM Evolution (EDGE) cellular networks. In accordance with other embodiments, wireless communication transceiver 1319 is a radio-frequency transceiver compliant with, but not limited to, Wi-Fi, WiMAX, implementations of the Institute of Electrical and Electronics Engineers (IEEE) 802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard) including Bluetooth Low Energy (BLE) implementations, implementations of the IEEE 1902.1 (RuBee) specification, implementations of IEEE 802.15 (ZigBee) standard, etc. It is noted that computer system 1300 may utilize multiple wireless communication transceivers 1319 operable in separate and distinct wireless communication networks.

In FIG. 13, computer system 1300 further comprises an input/output (I/O) device(s) 1321 which is coupled with bus 1305. In accordance with various embodiments, I/O device 1321 comprises one or more interfaces with various networked devices. Examples of networks with which I/O device 1321 is configured to be coupled with include, but are not limited to, controller area network (CAN) buses used to report data within a vehicle, Ethernet port(s), universal serial bus (USB) ports, and/or special purpose interfaces such as direct connections to various components such as optional sensors 1340 (a battery to determine if it has been disconnected, door position switches, seat sensors, ignition switches, fuel pumps, alarms, warning devices, motion sensors for detecting motion of computer system 1300, etc.). Also shown in FIG. 13 is an optional motion sensor 1329 coupled with bus 1305 to detect motion of computer system 1300. As an example, many handheld mobile devices (e.g., cellular telephones, notepads, laptop computers, etc) are equipped with motion sensors such as accelerometers to detect when the device is in motion, or the orientation of the device with respect to the Earth's gravitational axis. In accordance with various embodiments, data from sensor 1340 and/or motion sensor 1329 can be used as an aid in filtering when data (e.g., code phase data, carrier phase data, or derivations thereof) is collected or processed by computer system 1300. In some embodiments, a motion tag may be appended to respective code phase data and carrier phase data for each of said plurality of phase-coherent signals when it is stored in a data storage device or later when it is transmitted. In one embodiment, a motion tag indicate or specifies whether a GNSS receiver was in motion or stationary when signals were received that resulted in the respective code and carrier phase data. Additionally or alternatively, a motion tag may describe a velocity of the motion (if any) and/or specify whether or not the GNSS receiver was moving at or faster than a predetermined velocity threshold (e.g., at or faster than 20 cm/second, 1 meters/sec, 10 meters/sec, etc.) when signals were received that resulted in the respective code and carrier phase data. Such a motion tag data can be used as a filter to remove data that may be more susceptible to multi-path interference. This is because, in general, a moving GNSS receiver is less susceptible to multi-path interference than a stationary GNSS receiver. Also shown in FIG. 13 is a GNSS receiver 200 coupled with bus 1305. GNSS receiver 200 is described in greater detail with reference to the description of FIG. 2 above. It is noted that while GNSS receiver 200 is shown as a component of computer system 1300, various implementations utilize a GNSS receiver 200 which is separate from computer system 1300.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method for capturing ionospheric data, said method comprising:

receiving, via a mobile multi-frequency GNSS receiver, a plurality of phase-coherent signals transmitted by at least one Global Navigation Satellite System (GNSS) satellite;

deriving respective code phase data and carrier phase data for each of said plurality of phase-coherent signals using a software defined GNSS receiver operating on a processor of a first communication device of said multi-frequency GNSS receiver;

storing said respective code phase data and carrier phase data for each of said plurality of phase-coherent signals in a data storage device;

appending a GNSS time-stamp with said respective code phase data and carrier phase data of each of said plurality of phase-coherent signals specifying when said phase-coherent signals were received;

appending a satellite identification with said respective code phase data and carrier phase data of each of said plurality of phase-coherent signals identifying a GNSS satellite from which said phase-coherent signals were received;

appending a position fix with said respective code phase data and carrier phase data of each of said plurality of phase-coherent signals specifying said position fix at which said phase-coherent signals were received; and wirelessly transmitting to a second location an ionospheric sample based upon said respective code phase data and carrier phase data of said plurality of phase-coherent signals.

2. The method of claim 1 further comprising:
using a cellular communication transceiver coupled with said mobile multi-frequency GNSS receiver and said data storage device to wirelessly transmit said ionospheric sample.

3. The method of claim 1 wherein said mobile multi-frequency GNSS receiver and said data storage device comprise discreet components of a mobile platform, said method further comprising:
using a wireless communication system coupled with said mobile platform to wirelessly transmit said ionospheric sample.

4. The method of claim 3 wherein said wireless communication system comprises a cellular communication transceiver coupled with said mobile platform, said method further comprising:
using the cellular communication transceiver to wirelessly transmit said ionospheric sample.

5. The method of claim 1 further comprising:
using a Wi-Fi communication transceiver to wirelessly transmit said ionospheric sample.

6. The method of claim 1 further comprising:
determining by a GNSS processor coupled with said mobile multi-frequency GNSS receiver when a wireless communication link is available for wirelessly transmitting said ionospheric sample; and
enabling, by said GNSS processor, transmission of said ionospheric sample in response to said determining.

7. The method of claim 1, wherein said wirelessly transmitting to said second location said ionospheric sample based upon said respective code phase data and carrier phase data of said plurality of phase-coherent signals comprises:
wirelessly transmitting unprocessed code phase and carrier phase measurements from said at least one GNSS satellite as said ionospheric sample.

8. The method of claim 1, wherein said wirelessly transmitting to said second location said ionospheric sample based upon said respective code phase data and carrier phase data of said plurality of phase-coherent signals comprises:
wirelessly transmitting a difference of subtracting a carrier phase estimate of one of said plurality of phase-coherent signals from a carrier phase estimate of another of said plurality of phase-coherent signals as said ionospheric sample.

9. The method of claim 1, wherein said wirelessly transmitting to said second location said ionospheric sample based upon said respective code phase data and carrier phase data of said plurality of phase-coherent signals comprises:
wirelessly transmitting a difference of subtracting a code phase estimate of one of said plurality of phase-coherent signals from a code phase estimate of another of said plurality of phase-coherent signals as said ionospheric sample.

10. The method of claim 1 further comprising:
appending data with said ionospheric sample indicating whether said mobile multifrequency GNSS receiver was moving when said plurality of phase-coherent signals were received.

11. The method of claim 1 further comprising:
determining that said mobile multi-frequency GNSS receiver is located in a high multi-path reception area when said phase-coherent signals are received; and
suspending processing of said phase-coherent signals to derive said respective code phase data and carrier phase data for each of said plurality of phase-coherent signals.

12. The method of claim 1 further comprising:
determining that said mobile multi-frequency GNSS receiver is located in a high multi-path reception area when said phase-coherent signals are received; and
preventing said wireless transmission of said ionospheric sample to said second location.

13. A system for capturing ionospheric data comprising:
a mobile multi-frequency Global Navigation Satellite System (GNSS) receiver configured for receiving a plurality of phase-coherent signals transmitted by at least one Global Navigation Satellite System (GNSS) satellite, said multi-frequency GNSS receiver comprising:
a software defined GNSS receiver operating on a processor of a first communication device of said multi-frequency GNSS receiver configured to derive respective code phase data and carrier phase data for each of said plurality of phase-coherent signals;
a data storage device configured for storing said respective code phase data and carrier phase data for each of said plurality of phase-coherent signals;
a GNSS processor coupled with said mobile multi-frequency GNSS receiver and configured to append a GNSS time-stamp with said respective code phase data and carrier phase data of each of said plurality of phase-coherent signals specifying when said phase-coherent signals were received, append a satellite identification with said respective code phase data and carrier phase data of each of said plurality of phase-coherent signals identifying a GNSS satellite from which said phase-coherent signals were received, and append a position fix with said respective code phase data and carrier phase data of each of said plurality of phase-coherent signals specifying said position fix at which said phase-coherent signals were received; and
a wireless transmitter configured for wirelessly transmitting an ionospheric sample based upon said respective code phase data and carrier phase data of said plurality of phase-coherent signals to a second location.

14. The system of claim 13 further comprising:
a cellular communication transceiver coupled with said mobile multi-frequency GNSS receiver and said data storage device and configured to wirelessly transmit said ionospheric sample.

15. The system of claim 13 wherein said mobile multi-frequency GNSS receiver and said data storage device comprise discreet components of a mobile platform, said system further comprising:
a wireless communication system coupled with said mobile platform to wirelessly transmit said ionospheric sample.

16. The system of claim 15 wherein said wireless communication system comprises a cellular communication transceiver coupled with said mobile platform and configured to wirelessly transmit said ionospheric sample.

17. The system of claim 15 wherein said mobile platform is selected from the group consisting of: a motor vehicle, a passenger vehicle, a sports utility vehicle (SUV), a truck, a delivery vehicle, a long-haul truck-trailer, an unmanned aerial vehicle (UAV), an unmanned vehicle, a passenger airplane, a transport airplane, an ocean-going ship, a river boat, a passenger train, a freight train, and a motorcycle.

18. The system of claim 13 further comprising:
a Wi-Fi communication transceiver communicatively coupled with said data storage device and configured to wirelessly transmit said ionospheric sample.

19. The system of claim 13 wherein:
said GNSS processor is further configured to determine when a wireless communication link is available for wirelessly transmitting said ionospheric sample and for enabling transmission of said ionospheric sample in response to said determining.

20. The system of claim 13, further comprising a processor configured to derive said ionospheric sample, said ionospheric sample comprising unprocessed code phase and carrier phase measurements from said at least one GNSS satellite.

21. The system of claim 13, further comprising a processor configured to derive said ionospheric sample, said ionospheric sample comprising a difference of subtracting a carrier phase estimate of one of said plurality of phase-coherent signals from a carrier phase estimate of another of said plurality of phase-coherent signals.

22. The system of claim 13, further comprising a processor configured to derive said ionospheric sample, said ionospheric sample comprising a difference of subtracting a code phase estimate of one of said plurality of phase-coherent signals from a code phase estimate of another of said plurality of phase-coherent signals.

23. A non-transitory computer readable storage medium having computer readable instructions stored thereon for causing a computer system to perform a method for capturing ionospheric data, said method comprising:
receiving, via a mobile multi-frequency GNSS receiver, a plurality of phase-coherent signals transmitted by at least one Global Navigation Satellite System (GNSS) satellite;
deriving respective code phase data and carrier phase data for each of said plurality of phase-coherent signals using a software defined GNSS receiver operating on a processor of a first communication device of said multi-frequency GNSS receiver;
storing said respective code phase data and carrier phase data for each of said plurality of phase-coherent signals in a data storage device;
appending a GNSS time-stamp with said respective code phase data and carrier phase data of each of said plurality of phase-coherent signals specifying when said phase-coherent signals were received;
appending a satellite identification with said respective code phase data and carrier phase data of each of said plurality of phase-coherent signals identifying a GNSS satellite from which said phase-coherent signals were received;
appending a position fix with said respective code phase data and carrier phase data of each of said plurality of phase-coherent signals specifying said position fix at which said phase-coherent signals were received; and
wirelessly transmitting to a second location an ionospheric sample based upon said respective code phase data and carrier phase data of said plurality of phase-coherent signals.

24. The non-transitory computer readable storage medium of claim 23 wherein said method further comprises:
using a cellular communication transceiver coupled with said multi-frequency GNSS receiver and said data storage device to wirelessly transmit said ionospheric sample.

25. The non-transitory computer readable storage medium of claim 23 wherein said mobile multi-frequency GNSS receiver and said data storage device comprise discreet components of a mobile platform, said method further comprising:
using a wireless communication system coupled with said mobile platform to wirelessly transmit said ionospheric sample.

26. The non-transitory computer readable storage medium of claim 25 wherein said wireless communication system comprises a cellular communication transceiver coupled with said mobile platform, said method further comprising:
using the cellular communication transceiver to wirelessly transmit said ionospheric sample.

27. The non-transitory computer readable storage medium of claim 23 wherein said method further comprises:
using a Wi-Fi communication transceiver to wirelessly transmit said ionospheric sample.

28. The non-transitory computer readable storage medium of claim 23 wherein said method further comprises:
determining by a GNSS processor coupled with said mobile multi-frequency GNSS receiver when a wireless communication link is available for wirelessly transmitting said ionospheric sample; and
enabling, by said GNSS processor, transmission of said ionospheric sample in response to said determining.

29. The non-transitory computer readable storage medium of claim 23, wherein said wirelessly transmitting to said second location said ionospheric sample based upon said respective code phase data and carrier phase data of said plurality of phase-coherent signals comprises:
wirelessly transmitting unprocessed code phase and carrier phase measurements from said at least one GNSS satellite as said ionospheric sample.

30. The non-transitory computer readable storage medium of claim 23, wherein said wirelessly transmitting to said second location said ionospheric sample based upon said respective code phase data and carrier phase data of said plurality of phase-coherent signals comprises:
wirelessly transmitting a difference of subtracting a carrier phase estimate of one of said plurality of phase-coherent signals from a carrier phase estimate of another of said plurality of phase-coherent signals as said ionospheric sample.

31. The non-transitory computer readable storage medium of claim 23, wherein said wirelessly transmitting to said second location said ionospheric sample based upon said respective code phase data and carrier phase data of said plurality of phase-coherent signals comprises:
wirelessly transmitting a difference of subtracting a code phase estimate of one of said plurality of phase-coherent signals from a code phase estimate of another of said plurality of phase-coherent signals as said ionospheric sample.

* * * * *